(12) United States Patent
Ribbich et al.

(10) Patent No.: US 10,907,844 B2
(45) Date of Patent: Feb. 2, 2021

(54) MULTI-FUNCTION HOME CONTROL SYSTEM WITH CONTROL SYSTEM HUB AND REMOTE SENSORS

(71) Applicant: Johnson Controls Technology Company, Plymouth, MI (US)

(72) Inventors: Joseph R. Ribbich, Waukesha, WI (US); John Peter Cipolla, Inverness, IL (US); Sudhi Sinha, Milwaukee, WI (US); Youngchoon Park, Brookfield, WI (US); Michael L. Ribbich, Oconomowoc, WI (US); Charles J. Gaidish, South Milwaukee, WI (US); Donald R. Albinger, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 90 days.

(21) Appl. No.: 15/146,134

(22) Filed: May 4, 2016

(65) Prior Publication Data
US 2016/0327921 A1  Nov. 10, 2016

Related U.S. Application Data

(60) Provisional application No. 62/156,868, filed on May 4, 2015, provisional application No. 62/247,672, filed
(Continued)

(51) Int. Cl.
*F24F 11/30* (2018.01)
*G05D 23/19* (2006.01)
(Continued)

(52) U.S. Cl.
CPC ............. *F24F 11/30* (2018.01); *F24F 11/50* (2018.01); *F24F 11/62* (2018.01); *F24F 11/70* (2018.01);
(Continued)

(58) Field of Classification Search
CPC ........ F24F 11/30; F24F 2110/10; F24F 11/52; F24F 11/0012; F24F 2011/0091;
(Continued)

(56) References Cited

U.S. PATENT DOCUMENTS

| 4,107,464 A | 8/1978 | Lynch et al. |
| 4,873,649 A | 10/1989 | Grald et al. |

(Continued)

FOREIGN PATENT DOCUMENTS

| CA | 2466854 C | 4/2008 |
| CA | 2633121 C | 8/2011 |

(Continued)

OTHER PUBLICATIONS

Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
(Continued)

*Primary Examiner* — Ryan A Jarrett
(74) *Attorney, Agent, or Firm* — Foley & Lardner LLP

(57) ABSTRACT

A home control system includes a thermostat configured to measure environmental conditions in a first room of a building and control heating, ventilation, and air condition (HVAC) equipment within the building. The thermostat includes a central control hub configured to communicate with a plurality of remote sensor units via a data communications interface. The thermostat further includes a processing circuit configured to monitor and control non-HVAC equipment within the building. The system further includes a first remote sensor unit of the plurality of remote sensor units. The first remote sensor unit is configured to measure environmental conditions in a second room of the building and wirelessly communicate information associated with the measured environmental conditions to the central control
(Continued)

hub. The thermostat is further configured to control both the HVAC equipment and the non-HVAC equipment within the building based on the information received from the remote sensor unit.

20 Claims, 38 Drawing Sheets

Related U.S. Application Data on Oct. 28, 2015, provisional application No. 62/260,141, filed on Nov. 25, 2015, provisional application No. 62/274,750, filed on Jan. 4, 2016, provisional application No. 62/275,199, filed on Jan. 5, 2016, provisional application No. 62/275,711, filed on Jan. 6, 2016, provisional application No. 62/275,202, filed on Jan. 5, 2016, provisional application No. 62/275,204, filed on Jan. 5, 2016.

(51) Int. Cl.
| H05B 47/11 | (2020.01) |
| H05B 47/12 | (2020.01) |
| H05B 47/105 | (2020.01) |
| G06F 3/041 | (2006.01) |
| G05B 15/02 | (2006.01) |
| F24F 11/62 | (2018.01) |
| F24F 11/50 | (2018.01) |
| F24F 11/70 | (2018.01) |
| F24F 11/52 | (2018.01) |
| F24F 110/10 | (2018.01) |
| F24F 140/00 | (2018.01) |
| F24F 11/63 | (2018.01) |

(52) U.S. Cl.
CPC ......... *G05B 15/02* (2013.01); *G05D 23/1902* (2013.01); *G06F 3/041* (2013.01); *G06F 3/0412* (2013.01); *H05B 47/105* (2020.01); *H05B 47/11* (2020.01); *H05B 47/12* (2020.01); *F24F 11/52* (2018.01); *F24F 11/63* (2018.01); *F24F 2110/10* (2018.01); *F24F 2140/00* (2018.01)

(58) Field of Classification Search
CPC ............ G05D 23/1902; H05B 37/0236; H05B 37/0218; H05B 37/0227; G05B 15/02; G06F 3/0412; G06F 3/041
See application file for complete search history.

(56) References Cited

U.S. PATENT DOCUMENTS

| 4,942,613 | A | 7/1990 | Lynch |
| 6,121,885 | A | 9/2000 | Masone et al. |
| 6,260,765 | B1 | 7/2001 | Natale et al. |
| 6,478,233 | B1 | 11/2002 | Shah |
| 6,810,307 | B1 | 10/2004 | Addy |
| 6,851,621 | B1 | 2/2005 | Wacker et al. |
| 6,874,691 | B1 | 4/2005 | Hildebrand et al. |
| 6,888,441 | B2 | 5/2005 | Carey |
| 6,912,429 | B1 | 6/2005 | Bilger |
| 7,028,912 | B1 | 4/2006 | Rosen |
| 7,159,789 | B2 | 1/2007 | Schwendinger et al. |
| 7,159,790 | B2 | 1/2007 | Schwendinger et al. |
| 7,225,054 | B2 | 5/2007 | Amundson et al. |
| 7,261,243 | B2 | 8/2007 | Butler et al. |
| 7,317,970 | B2 | 1/2008 | Pienta et al. |
| 7,383,158 | B2 | 6/2008 | Krocker et al. |
| RE40,437 | E | 7/2008 | Rosen |
| 7,469,550 | B2 | 12/2008 | Chapman et al. |
| 7,584,897 | B2 | 9/2009 | Schultz et al. |
| 7,592,713 | B2 | 9/2009 | Bryan et al. |
| 7,614,567 | B2 | 11/2009 | Chapman et al. |
| 7,633,743 | B2 | 12/2009 | Barton et al. |
| 7,638,739 | B2 | 12/2009 | Rhodes et al. |
| 7,645,158 | B2 | 1/2010 | Mulhouse et al. |
| 7,726,581 | B2 | 6/2010 | Naujok et al. |
| 7,731,096 | B2 | 6/2010 | Lorenz et al. |
| 7,774,102 | B2 | 8/2010 | Butler et al. |
| 7,775,452 | B2 | 8/2010 | Shah et al. |
| 7,784,704 | B2 | 8/2010 | Harter |
| 7,832,652 | B2 | 11/2010 | Barton et al. |
| 7,861,941 | B2 | 1/2011 | Schultz et al. |
| 7,867,646 | B2 | 1/2011 | Rhodes |
| 7,904,209 | B2 | 3/2011 | Podgorny et al. |
| 7,904,830 | B2 | 3/2011 | Hoglund et al. |
| 7,938,336 | B2 | 5/2011 | Rhodes et al. |
| 7,992,794 | B2 | 8/2011 | Leen et al. |
| 8,010,237 | B2 | 8/2011 | Cheung et al. |
| 8,078,326 | B2 | 12/2011 | Harrod et al. |
| 8,089,032 | B2 | 1/2012 | Beland et al. |
| 8,099,195 | B2 | 1/2012 | Imes et al. |
| 8,108,076 | B2 | 1/2012 | Imes et al. |
| 8,190,296 | B2 | 5/2012 | Alhilo |
| 8,209,059 | B2 | 6/2012 | Stockton |
| 8,276,829 | B2 | 10/2012 | Stoner et al. |
| 8,280,556 | B2 | 10/2012 | Besore et al. |
| 8,289,226 | B2 | 10/2012 | Takach et al. |
| 8,321,058 | B2 | 11/2012 | Zhou et al. |
| 8,412,382 | B2 | 4/2013 | Imes et al. |
| 8,456,293 | B1 | 6/2013 | Trundle et al. |
| 8,498,749 | B2 | 7/2013 | Imes et al. |
| 8,511,576 | B2 | 8/2013 | Warren et al. |
| 8,511,577 | B2 | 8/2013 | Warren et al. |
| 8,523,083 | B2 | 9/2013 | Warren et al. |
| 8,538,588 | B2 | 9/2013 | Kasper |
| 8,544,285 | B2 | 10/2013 | Stefanski et al. |
| 8,558,179 | B2 | 10/2013 | Filson et al. |
| 8,560,127 | B2 | 10/2013 | Leen et al. |
| 8,560,128 | B2 | 10/2013 | Ruff et al. |
| 8,594,850 | B1 | 11/2013 | Gourlay et al. |
| 8,596,550 | B2 | 12/2013 | Steinberg et al. |
| 8,600,564 | B2 | 12/2013 | Imes et al. |
| 8,606,409 | B2 | 12/2013 | Amundson et al. |
| 8,620,841 | B1 | 12/2013 | Filson et al. |
| 8,630,742 | B1 | 1/2014 | Stefanski et al. |
| 8,644,009 | B2 | 2/2014 | Rylski et al. |
| 8,671,702 | B1 | 3/2014 | Shotey et al. |
| 8,695,887 | B2 | 4/2014 | Helt et al. |
| 8,708,242 | B2 | 4/2014 | Conner et al. |
| 8,712,590 | B2 | 4/2014 | Steinberg |
| 8,718,826 | B2 | 5/2014 | Ramachandran et al. |
| 8,727,611 | B2 | 5/2014 | Huppi et al. |
| 8,746,583 | B2 | 6/2014 | Simon et al. |
| 8,752,771 | B2 | 6/2014 | Warren et al. |
| 8,770,490 | B2 | 7/2014 | Drew |
| 8,770,491 | B2 | 7/2014 | Warren et al. |
| 8,788,100 | B2 | 7/2014 | Grohman et al. |
| 8,802,981 | B2 | 8/2014 | Wallaert et al. |
| 8,830,267 | B2 | 9/2014 | Brackney |
| 8,944,338 | B2 | 2/2015 | Warren et al. |
| 8,961,005 | B2 | 2/2015 | Huppi et al. |
| 8,998,102 | B2 | 4/2015 | Fadell et al. |
| 9,014,860 | B2 | 4/2015 | Moore et al. |
| RE45,574 | E | 6/2015 | Harter |
| 9,077,055 | B2 | 7/2015 | Yau |
| 9,080,782 | B1 * | 7/2015 | Sheikh ............... F24F 11/00 |
| 9,086,703 | B2 | 7/2015 | Warren et al. |
| 9,092,039 | B2 | 7/2015 | Fadell et al. |
| 9,116,529 | B2 | 8/2015 | Warren et al. |
| 9,121,623 | B2 | 9/2015 | Filson et al. |
| 9,127,853 | B2 | 9/2015 | Filson et al. |
| 9,134,710 | B2 | 9/2015 | Cheung et al. |
| 9,146,041 | B2 | 9/2015 | Novotny et al. |
| 9,194,597 | B2 | 11/2015 | Steinberg et al. |
| 9,194,598 | B2 | 11/2015 | Fadell et al. |
| 9,234,669 | B2 | 1/2016 | Filson et al. |
| 9,244,445 | B2 | 1/2016 | Finch et al. |
| 9,261,287 | B2 | 2/2016 | Warren et al. |
| 9,268,344 | B2 | 2/2016 | Warren et al. |

(56) References Cited

U.S. PATENT DOCUMENTS

| | | |
|---|---|---|
| 9,285,802 B2 | 3/2016 | Arensmeier |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,319,234 B2 | 4/2016 | Davis et al. |
| 9,353,965 B1 | 5/2016 | Goyal et al. |
| 9,589,459 B2 | 3/2017 | Davis et al. |
| 9,696,701 B2 | 7/2017 | Vasylyev |
| 9,762,408 B2 | 9/2017 | Davis et al. |
| 9,857,238 B2 | 1/2018 | Malhotra et al. |
| 9,887,887 B2 | 2/2018 | Hunter et al. |
| D814,321 S | 4/2018 | Abdala et al. |
| 2001/0015281 A1 | 8/2001 | Schiedegger et al. |
| 2002/0123843 A1 | 9/2002 | Hood |
| 2003/0034898 A1 | 2/2003 | Shamoon et al. |
| 2003/0136853 A1 | 7/2003 | Morey |
| 2004/0074978 A1 | 4/2004 | Rosen |
| 2004/0125940 A1 | 7/2004 | Turcan et al. |
| 2004/0249479 A1 | 12/2004 | Shorrock |
| 2005/0083168 A1 | 4/2005 | Breitenbach |
| 2005/0119794 A1 | 6/2005 | Amundson et al. |
| 2005/0156049 A1 | 7/2005 | Van Ostrand et al. |
| 2005/0270735 A1 | 12/2005 | Chen |
| 2006/0038025 A1 | 2/2006 | Lee |
| 2006/0192022 A1 | 8/2006 | Barton et al. |
| 2006/0226970 A1 | 10/2006 | Saga et al. |
| 2006/0265489 A1 | 11/2006 | Moore |
| 2007/0198099 A9 | 8/2007 | Shah |
| 2007/0228183 A1 | 10/2007 | Kennedy et al. |
| 2007/0241203 A1 | 10/2007 | Wagner et al. |
| 2008/0015740 A1* | 1/2008 | Osann, Jr. ............... G05B 15/02 700/276 |
| 2008/0054084 A1 | 3/2008 | Olson |
| 2008/0120446 A1 | 5/2008 | Butler et al. |
| 2008/0161978 A1 | 7/2008 | Shah |
| 2008/0182506 A1* | 7/2008 | Jackson ................. F24F 11/30 454/354 |
| 2008/0221714 A1 | 9/2008 | Schoettle |
| 2008/0227430 A1 | 9/2008 | Polk |
| 2008/0280637 A1 | 11/2008 | Shaffer et al. |
| 2009/0122329 A1 | 5/2009 | Hegemier et al. |
| 2009/0140065 A1 | 6/2009 | Juntunen et al. |
| 2009/0143918 A1 | 6/2009 | Amundson et al. |
| 2009/0144015 A1 | 6/2009 | Bedard |
| 2009/0276096 A1 | 11/2009 | Proffitt et al. |
| 2010/0070092 A1 | 3/2010 | Winter et al. |
| 2010/0106334 A1 | 4/2010 | Grohman et al. |
| 2010/0145536 A1* | 6/2010 | Masters ................... H02J 3/14 700/292 |
| 2010/0190479 A1 | 7/2010 | Scott et al. |
| 2011/0046798 A1 | 2/2011 | Imes et al. |
| 2011/0087988 A1 | 4/2011 | Ray et al. |
| 2011/0128378 A1 | 6/2011 | Raji |
| 2011/0209097 A1 | 8/2011 | Hinckley et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0029713 A1 | 2/2012 | Spicer et al. |
| 2012/0046859 A1 | 2/2012 | Imes et al. |
| 2012/0095601 A1* | 4/2012 | Abraham ................. E06B 9/68 700/278 |
| 2012/0101637 A1 | 4/2012 | Imes et al. |
| 2012/0123594 A1 | 5/2012 | Finch et al. |
| 2012/0126020 A1 | 5/2012 | Filson et al. |
| 2012/0126021 A1 | 5/2012 | Warren et al. |
| 2012/0165993 A1 | 6/2012 | Whitehouse |
| 2012/0179727 A1 | 7/2012 | Esser |
| 2012/0191257 A1 | 7/2012 | Corcoran et al. |
| 2012/0239207 A1 | 9/2012 | Fadell et al. |
| 2012/0252430 A1 | 10/2012 | Imes et al. |
| 2012/0259469 A1 | 10/2012 | Ward et al. |
| 2012/0259470 A1 | 10/2012 | Nijhawan et al. |
| 2012/0310418 A1 | 12/2012 | Harrod et al. |
| 2012/0310708 A1 | 12/2012 | Curtis et al. |
| 2012/0315848 A1 | 12/2012 | Smith et al. |
| 2012/0316687 A1 | 12/2012 | Chen et al. |
| 2013/0057381 A1 | 3/2013 | Kandhasamy |
| 2013/0087628 A1 | 4/2013 | Nelson et al. |
| 2013/0099008 A1 | 4/2013 | Aljabari et al. |
| 2013/0099009 A1 | 4/2013 | Filson et al. |
| 2013/0158721 A1 | 6/2013 | Somasundaram et al. |
| 2013/0163300 A1 | 6/2013 | Zhao et al. |
| 2013/0190932 A1 | 7/2013 | Schuman |
| 2013/0190940 A1 | 7/2013 | Sloop et al. |
| 2013/0204442 A1 | 8/2013 | Modi et al. |
| 2013/0211600 A1 | 8/2013 | Dean-Hendricks et al. |
| 2013/0221117 A1 | 8/2013 | Warren et al. |
| 2013/0245838 A1 | 9/2013 | Zywicki et al. |
| 2013/0261807 A1 | 10/2013 | Zywicki et al. |
| 2013/0268125 A1 | 10/2013 | Matsuoka |
| 2013/0268129 A1 | 10/2013 | Fadell et al. |
| 2013/0271670 A1 | 10/2013 | Sakata et al. |
| 2013/0292481 A1 | 11/2013 | Filson et al. |
| 2013/0332000 A1 | 12/2013 | Imes et al. |
| 2013/0338837 A1 | 12/2013 | Hublou et al. |
| 2013/0338839 A1 | 12/2013 | Rogers et al. |
| 2014/0039692 A1 | 2/2014 | Leen et al. |
| 2014/0070919 A1 | 3/2014 | Jackson et al. |
| 2014/0117103 A1 | 5/2014 | Rossi et al. |
| 2014/0129034 A1 | 5/2014 | Stefanski et al. |
| 2014/0149270 A1 | 5/2014 | Lombard et al. |
| 2014/0152631 A1 | 6/2014 | Moore et al. |
| 2014/0156087 A1 | 6/2014 | Amundson |
| 2014/0207292 A1 | 7/2014 | Ramagem et al. |
| 2014/0217185 A1 | 8/2014 | Bicknell |
| 2014/0217186 A1 | 8/2014 | Kramer et al. |
| 2014/0231530 A1 | 8/2014 | Warren et al. |
| 2014/0244047 A1 | 8/2014 | Oh et al. |
| 2014/0250397 A1 | 9/2014 | Kannan et al. |
| 2014/0262484 A1 | 9/2014 | Khoury et al. |
| 2014/0263679 A1 | 9/2014 | Conner et al. |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312131 A1 | 10/2014 | Tousignant et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0319236 A1 | 10/2014 | Novotny et al. |
| 2014/0320282 A1 | 10/2014 | Zhang |
| 2014/0321011 A1 | 10/2014 | Bisson et al. |
| 2014/0324232 A1 | 10/2014 | Modi et al. |
| 2014/0358295 A1 | 12/2014 | Warren et al. |
| 2014/0367475 A1 | 12/2014 | Fadell et al. |
| 2014/0376405 A1 | 12/2014 | Erickson et al. |
| 2014/0376747 A1* | 12/2014 | Mullet ................. G08C 23/00 381/110 |
| 2015/0001361 A1 | 1/2015 | Gagne et al. |
| 2015/0025693 A1 | 1/2015 | Wu et al. |
| 2015/0039137 A1 | 2/2015 | Perry et al. |
| 2015/0045976 A1* | 2/2015 | Li ............................ H02J 4/00 700/295 |
| 2015/0046162 A1 | 2/2015 | Aley-Raz et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0081568 A1 | 3/2015 | Land |
| 2015/0082225 A1 | 3/2015 | Shearer |
| 2015/0088442 A1 | 3/2015 | Farrar et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0144706 A1 | 5/2015 | Robideau et al. |
| 2015/0145653 A1 | 5/2015 | Katingari et al. |
| 2015/0153057 A1 | 6/2015 | Matsuoka et al. |
| 2015/0159893 A1 | 6/2015 | Daubman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0163945 A1 | 6/2015 | Barton et al. |

(56) References Cited

U.S. PATENT DOCUMENTS

| | | | |
|---|---|---|---|
| 2015/0176854 A1 | 6/2015 | Butler et al. |
| 2015/0198346 A1 | 7/2015 | Vedpathak |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204569 A1 | 7/2015 | Lorenz et al. |
| 2015/0204570 A1 | 7/2015 | Adamik et al. |
| 2015/0219357 A1 | 8/2015 | Stefanski et al. |
| 2015/0233594 A1 | 8/2015 | Abe et al. |
| 2015/0233596 A1 | 8/2015 | Warren et al. |
| 2015/0234369 A1 | 8/2015 | Wen et al. |
| 2015/0245189 A1 | 8/2015 | Nalluri et al. |
| 2015/0248118 A1 | 9/2015 | Li et al. |
| 2015/0267935 A1 | 9/2015 | Devenish et al. |
| 2015/0276237 A1 | 10/2015 | Daniels et al. |
| 2015/0276238 A1 | 10/2015 | Matsuoka et al. |
| 2015/0276254 A1 | 10/2015 | Nemcek et al. |
| 2015/0277492 A1 | 10/2015 | Chau et al. |
| 2015/0280935 A1 | 10/2015 | Poplawski et al. |
| 2015/0292764 A1 | 10/2015 | Land et al. |
| 2015/0293541 A1 | 10/2015 | Fadell et al. |
| 2015/0300672 A1 | 10/2015 | Fadell et al. |
| 2015/0316902 A1 | 11/2015 | Wenzel et al. |
| 2015/0327375 A1 | 11/2015 | Bick et al. |
| 2015/0330658 A1 | 11/2015 | Filson et al. |
| 2015/0330660 A1 | 11/2015 | Filson et al. |
| 2015/0338117 A1 | 11/2015 | Henneberger et al. |
| 2015/0345818 A1 | 12/2015 | Oh et al. |
| 2015/0355371 A1 | 12/2015 | Ableitner et al. |
| 2015/0362208 A1 | 12/2015 | Novotny et al. |
| 2015/0362926 A1 | 12/2015 | Yarde et al. |
| 2015/0370270 A1 | 12/2015 | Pan et al. |
| 2015/0370272 A1 | 12/2015 | Reddy et al. |
| 2016/0018122 A1 | 1/2016 | Frank et al. |
| 2016/0020590 A1 | 1/2016 | Roosli et al. |
| 2016/0036227 A1 | 2/2016 | Schultz et al. |
| 2016/0040903 A1 | 2/2016 | Emmons et al. |
| 2016/0054792 A1 | 2/2016 | Poupyrev |
| 2016/0054988 A1 | 2/2016 | Desire |
| 2016/0061471 A1 | 3/2016 | Eicher et al. |
| 2016/0061474 A1 | 3/2016 | Cheung et al. |
| 2016/0069583 A1 | 3/2016 | Fadell et al. |
| 2016/0107820 A1 | 4/2016 | Macvittie et al. |
| 2016/0116181 A1* | 4/2016 | Aultman | F24F 11/30 |
| | | | 700/276 |
| 2016/0138819 A1 | 5/2016 | Vega |
| 2016/0171289 A1 | 6/2016 | Lee et al. |
| 2016/0180663 A1 | 6/2016 | McMahan et al. |
| 2016/0223216 A1 | 8/2016 | Buda et al. |
| 2016/0249437 A1* | 8/2016 | Sun | H05B 37/0227 |
| 2016/0330084 A1 | 11/2016 | Hunter et al. |
| 2016/0377306 A1 | 12/2016 | Drees et al. |
| 2017/0041454 A1 | 2/2017 | Nicholls et al. |
| 2017/0059197 A1 | 3/2017 | Goyal et al. |
| 2017/0102162 A1 | 4/2017 | Drees et al. |
| 2017/0102433 A1 | 4/2017 | Wenzel et al. |
| 2017/0102723 A1 | 4/2017 | Smith et al. |
| 2017/0104337 A1 | 4/2017 | Drees |
| 2017/0104344 A1 | 4/2017 | Wenzel et al. |
| 2017/0131825 A1 | 5/2017 | Moore et al. |
| 2017/0192402 A1 | 7/2017 | Karp et al. |
| 2017/0263111 A1 | 9/2017 | Deluliis et al. |
| 2017/0292731 A1 | 10/2017 | Matsuoka et al. |
| 2018/0023833 A1 | 1/2018 | Matsuoka et al. |
| 2018/0087795 A1 | 3/2018 | Okita et al. |

FOREIGN PATENT DOCUMENTS

| | | |
|---|---|---|
| CA | 2818356 | 5/2012 |
| CA | 2818696 A1 | 5/2012 |
| CA | 2853041 | 4/2013 |
| CA | 2812567 | 5/2014 |
| CN | 102119507 | 7/2011 |
| CN | 102377182 | 3/2012 |
| CN | 104020726 | 9/2014 |
| CN | 104303125 | 1/2015 |
| CN | 105378589 | 3/2016 |
| DE | 10 2004 005 962 | 8/2005 |
| EP | 2283279 A2 | 2/2011 |
| EP | 2988188 A2 | 2/2016 |
| GB | 2519441 A | 4/2015 |
| JP | H09-126523 A | 5/1997 |
| JP | H10-276483 A | 10/1998 |
| JP | 2007-218499 A | 8/2007 |
| JP | 2011-014516 A | 1/2011 |
| WO | WO 2006/041599 A9 | 7/2006 |
| WO | WO 2009/058127 A1 | 5/2009 |
| WO | WO 2009/036764 A3 | 1/2010 |
| WO | WO-2010/059143 A1 | 5/2010 |
| WO | WO 2012/042232 | 4/2012 |
| WO | WO-2012/068507 A3 | 5/2012 |
| WO | WO 2013/052389 A1 | 4/2013 |
| WO | WO-2013/058934 | 4/2013 |
| WO | WO 2013/058968 A1 | 4/2013 |
| WO | WO 2013/153480 A3 | 12/2013 |
| WO | WO-2013/058932 | 4/2014 |
| WO | WO 2014/051635 A1 | 4/2014 |
| WO | WO 2014/055059 A1 | 4/2014 |
| WO | WO 2013/052901 A3 | 5/2014 |
| WO | WO-2014/152301 A2 | 9/2014 |
| WO | WO-2015/012449 | 1/2015 |
| WO | WO-2015/039178 A1 | 3/2015 |
| WO | WO 2015/057698 A1 | 4/2015 |
| WO | WO 2015/099721 A1 | 7/2015 |
| WO | WO 2015/127566 A1 | 9/2015 |
| WO | WO 2017/044903 A1 | 3/2017 |

OTHER PUBLICATIONS

International Search Report and Written Opinion for PCT Application No. PCT/US2016/030835, dated Sep. 7, 2016, 13 pages.
International Search Report and Written Opinion for PCT Application No. PCT/US2016/030836, dated Sep. 7, 2016, 11 pages.
International Search Report and Written Opinion for PCT Application No. PCT/US2016/030837, dated Sep. 7, 2016, 13 pages.
Written Opinion for Singapore Application No. 11201708996V, dated Dec. 27, 2017, 6 pages.
Written Opinion for Singapore Application No. 11201708997W, dated Jan. 10, 2018, 9 pages.
Office Action for U.S. Appl. No. 15/146,749, dated Mar. 19, 2018, 11 pages.
Office Action for U.S. Appl. No. 15/336,792, dated Mar. 29, 2018, 12 pages.
Written Opinion for Singapore Application No. 11201709002Y, dated Feb. 7, 2018, 5 pages.
International Search Report and Written Opinion for PCT Application No. PCT/US2016/030827 dated Sep. 7, 2016, 13 pages.
U.S. Appl. No. 15/179,894, filed Jun. 10, 2016, Johnson Controls Technology Company.
U.S. Appl. No. 15/207,431, filed Jul. 11, 2016, Johnson Controls Technology Company.
Search Report and Written Opinion for International Application No. PCT/US2016/051176, dated Feb. 16, 2017, 20 pages.
Search Report for International Application No. PCT/US2016/030835, dated Sep. 7, 2016, 13 pages.
Search Report for International Application No. PCT/US2016/030836, dated Sep. 7, 2016, 11 pages.
Search Report for International Application No. PCT/US2016/030837, dated Sep. 7, 2016, 13 pages.
Search Report for International Application No. PCT/US2017/030890, dated Jun. 21, 2017, 13 pages.
Office Action for U.S. Appl. No. 15/336,789, dated Aug. 10, 2017, 14 pages.
Office Action for U.S. Appl. No. 15/260,294, dated Feb. 16, 2018, 19 pages.
Office Action for U.S. Appl. No. 15/260,297, dated Feb. 9, 2018, 17 pages.

(56) References Cited

OTHER PUBLICATIONS

Office Action for U.S. Appl. No. 15/260,301, dated Feb. 9, 2018, 9 pages.
Office Action for U.S. Appl. No. 15/336,789, dated Feb. 22, 2018, 15 pages.
Office Action for U.S. Appl. No. 15/336,791, dated Mar. 2, 2018, 13 pages.
Notice of Allowance for U.S. Appl. No. 15/146,649, dated Feb. 27, 2018, 7 pages.
Notice of Allowance for U.S. Appl. No. 15/146,763, dated Oct. 4, 2017, 8 pages.
Office Action for U.S. Appl. No. 15/146,649, dated Oct. 6, 2017, 6 pages.
Office Action for U.S. Appl. No. 15/146,749, dated Oct. 4, 2017, 9 pages.
Office Action for U.S. Appl. No. 15/336,792, dated Oct. 10, 2017, 12 pages.
U.S. Appl. No. 15/247,777, filed Aug. 25, 2016 Johnson Controls Technology Company.
U.S. Appl. No. 15/247,784, filed Aug. 25, 2016, Johnson Controls Technology Company.
U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, filed Aug. 25, 2016, Johnson Controls Technology Company.
U.S. Appl. No. 15/247,881, filed Aug. 25, 2016, Johnson Controls Technology Company.
U.S. Appl. No. 15/247,883, filed Aug. 25, 2016, Johnson Controls Technology Company.
U.S. Appl. No. 15/247,885, filed Aug. 25, 2016, Johnson Controls Technology Company.
U.S. Appl. No. 15/247,886, filed Aug. 25, 2016, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,245, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 8, 2015, Johnson Controls Technology Company.
International Search Report and Written Opinion for PCT Application No. PCT/US2016/030291, dated Sep. 7, 2016, 11 pages.
International Search Report and Written Opinion for PCT Application No. PCT/US2016/030829, dated Sep. 7, 2016, 15 pages.
Cuevas et al., Integrating Gesture-Based Identification in Context-Aware Applications: A System Approach, 2014, 8 pages.
Hayashi et al: "Wave to Me: Human Factors in Computing Systems", ACM, 2 Penn Plaza, Suite 701 New York, NY 10121-0701 USA, Apr. 26, 2014, pp. 3453-3462.
Search Report for International Application No. PCT/US2017/054915, dated Jan. 16, 2018, 14 pages.
First Examination Report for New Zealand Application No. 737432, dated Jun. 11, 2018, 6 pages.
First Examination Report for New Zealand Application No. 737663, dated Jun. 11, 2018, 3 pages.
Notice of Allowance for U.S. Appl. No. 15/338,215, dated May 21, 2018, 8 pages.
Office Action for U.S. Appl. No. 15/260,293, dated Jun. 1, 2018, 23 pages.
Office Action for U.S. Appl. No. 15/338,215, dated Nov. 15, 2017, 11 pages.
Office Action for U.S. Appl. No. 15/360,976, dated Jul. 2, 2018, 8 pages.
Examination Report for Australian Application No. 2016257459, dated May 4, 2018, 3 pages.
Office Action for U.S. Appl. No. 15/336,793, dated May 23, 2018, 18 pages.
Office Action for U.S. Appl. No. 15/260,295, dated Apr. 18, 2018, 16 pages.
Office Action on CN 201780040652.X, dated Jul. 8, 2020, 33 pages with English language translation.
Office Action on EP 16723885.6, dated Sep. 17, 2018, 7 pages.
Office Action on JP 2017-557196, dated Jan. 29, 2019, 11 pages, with English translation.
Office Action on NZ 737432, dated Jan. 31, 2019, 5 pages.
Second Written Opinion for Singapore Application No. 11201708997W, dated Dec. 6, 2018, 6 pages.

\* cited by examiner

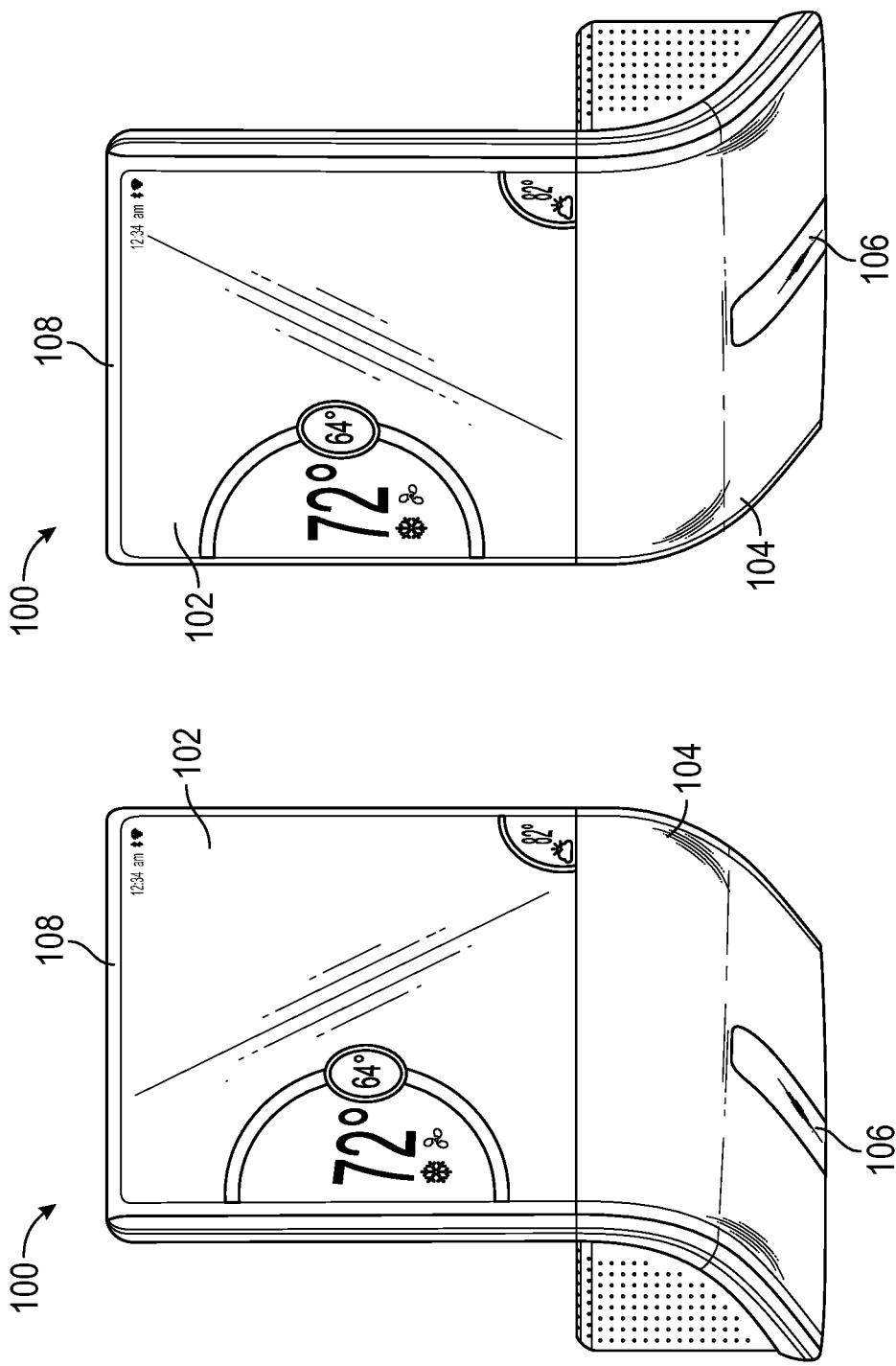

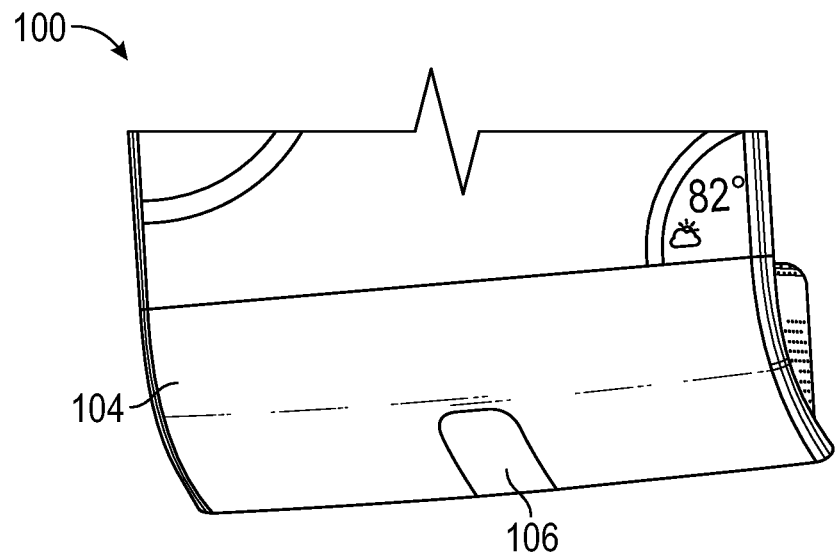
FIG. 5
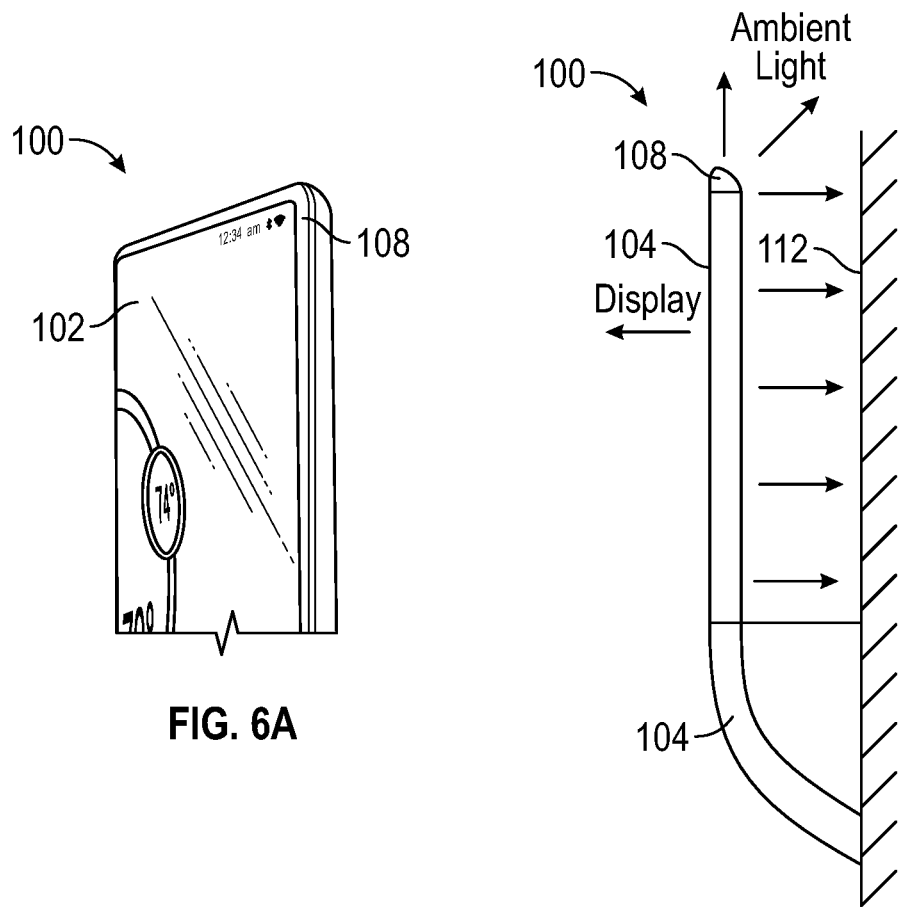
FIG. 6A
FIG. 6B

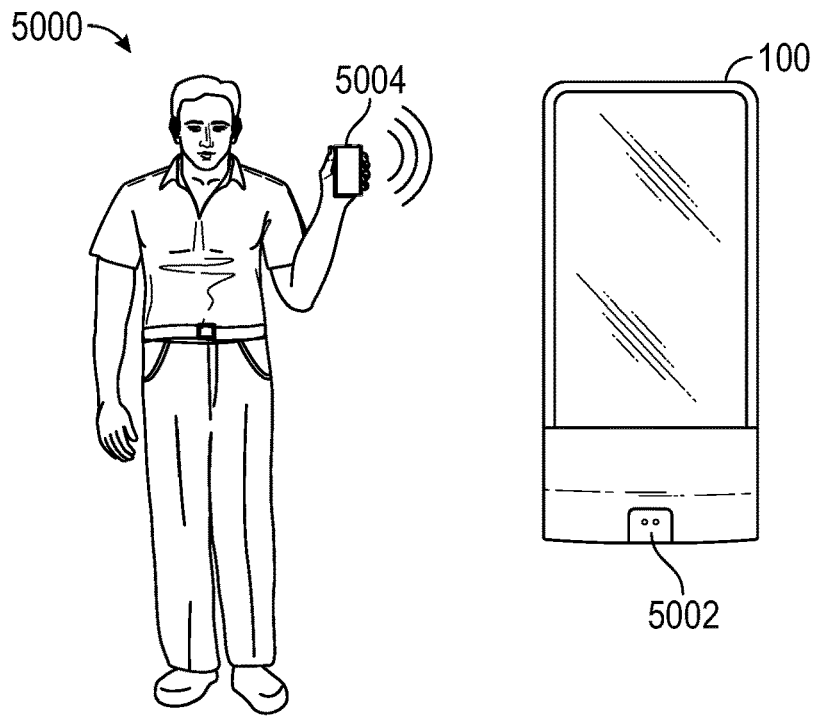
FIG. 26A
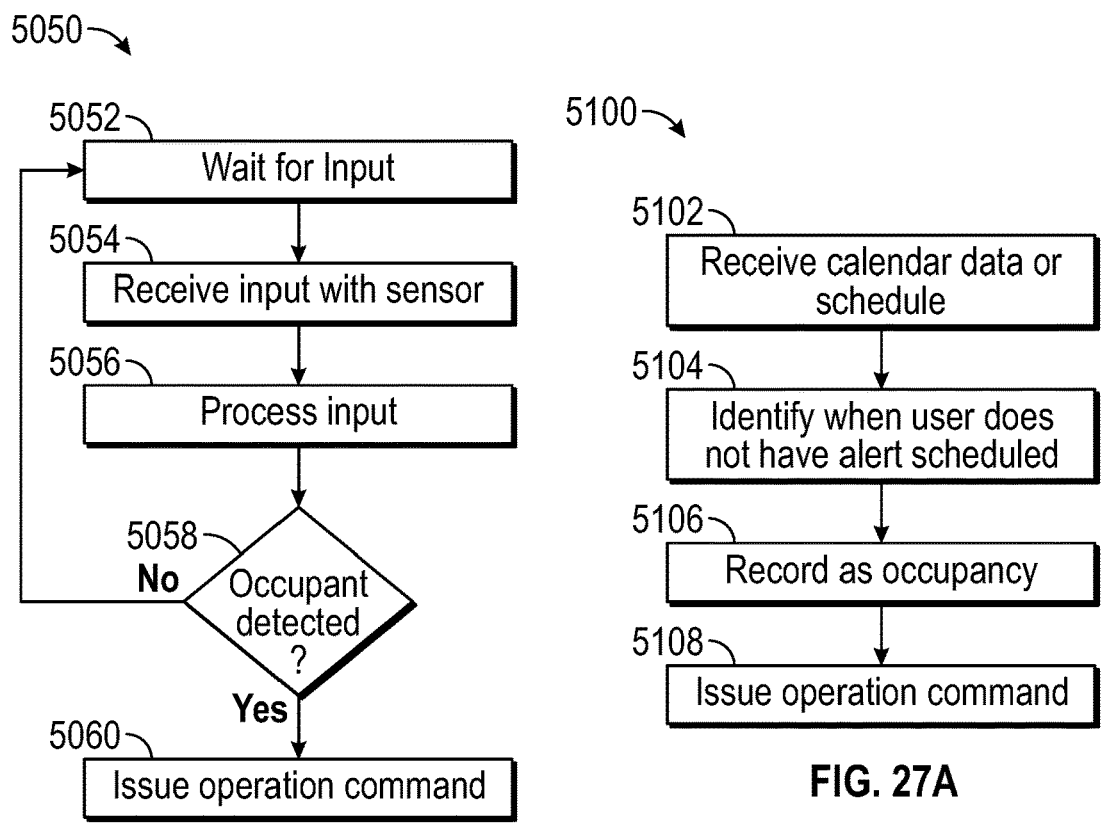
FIG. 26B
FIG. 27A

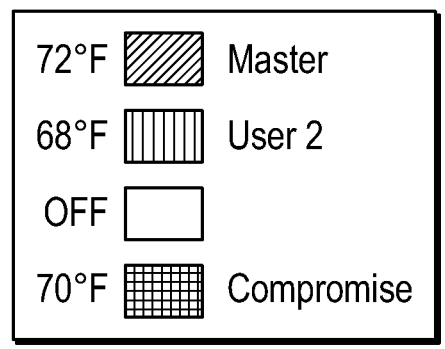
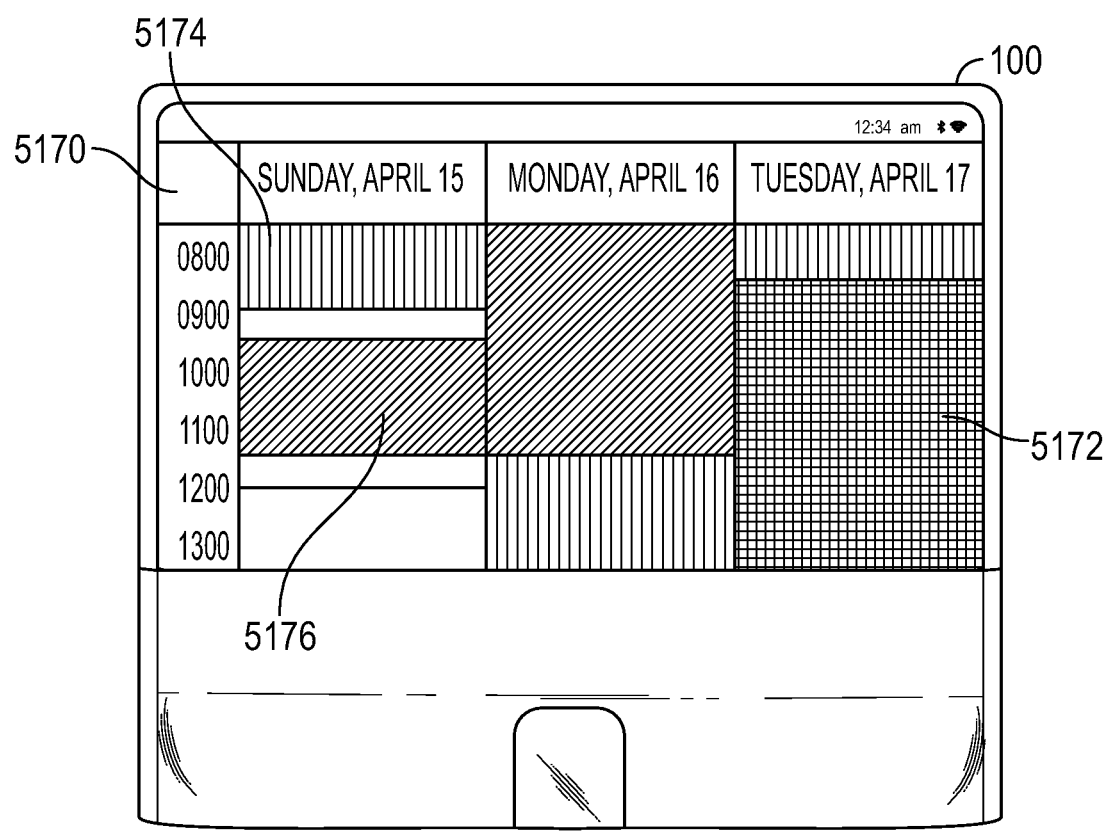
FIG. 27C

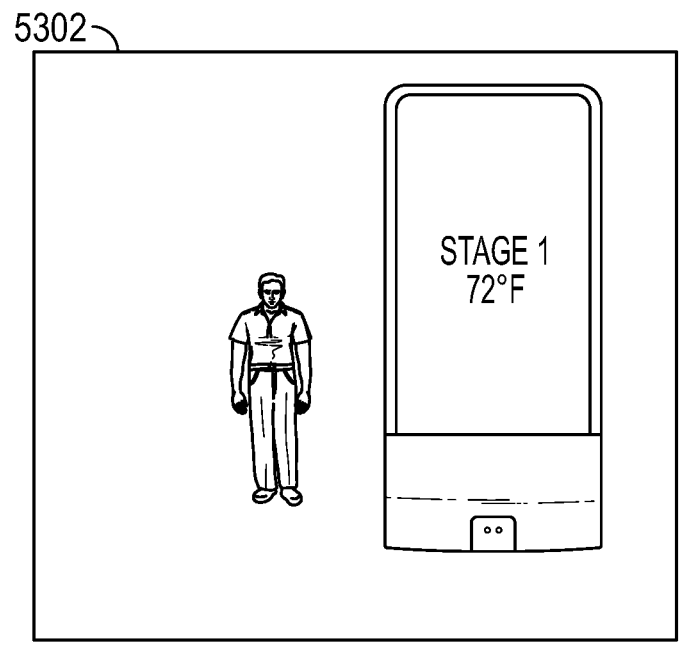
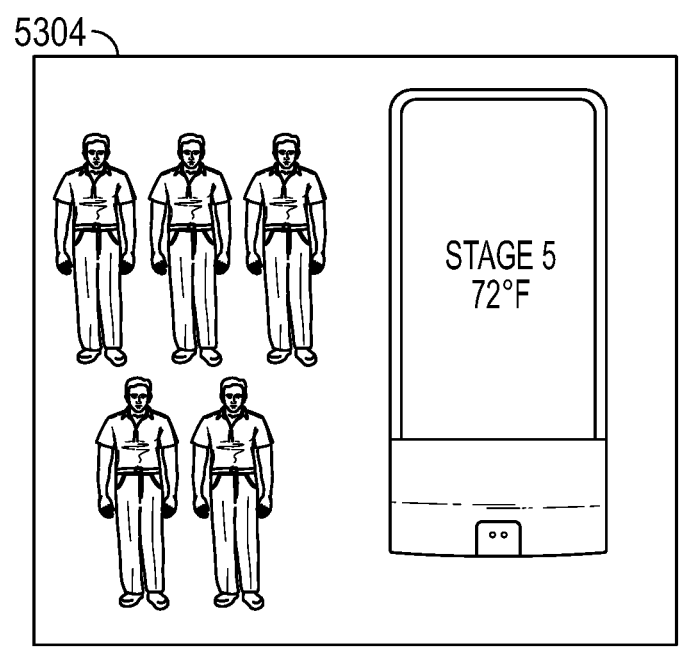
FIG. 29

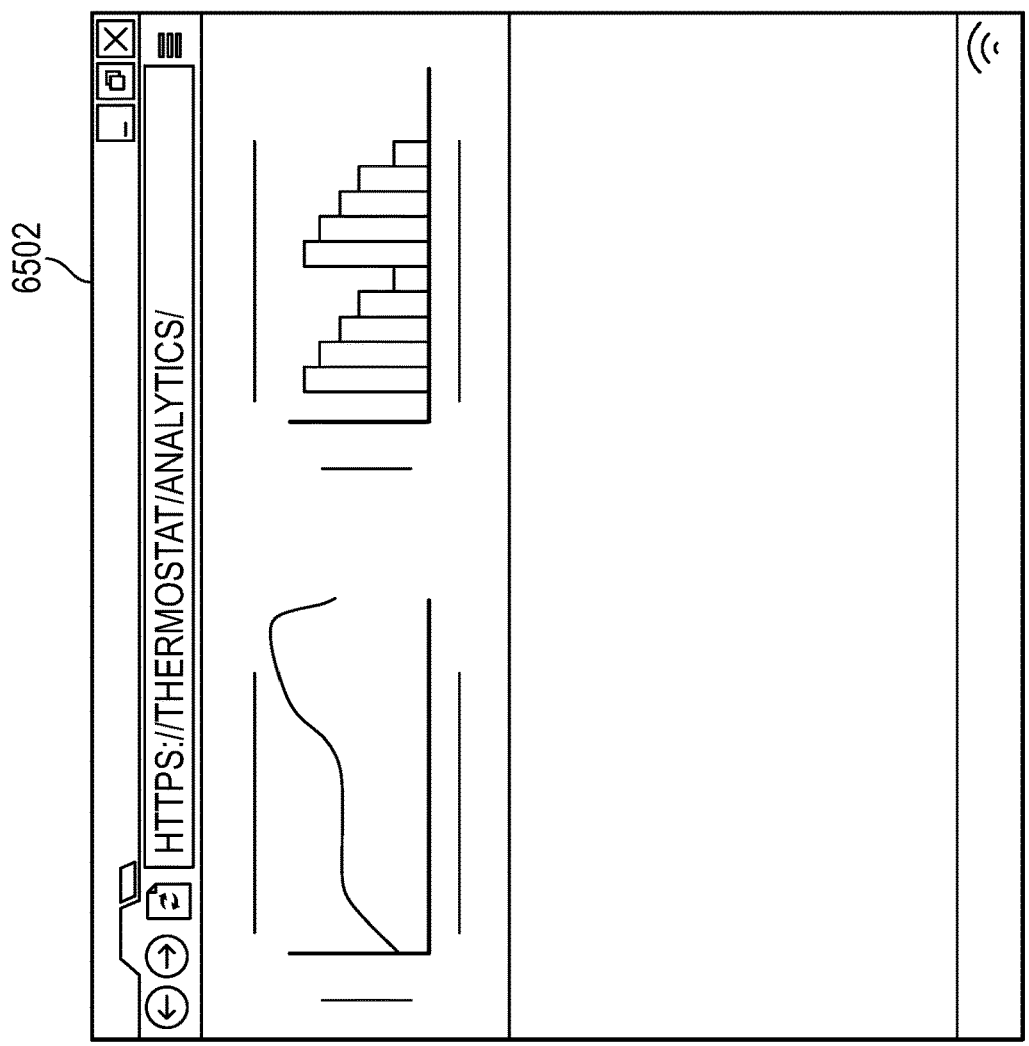
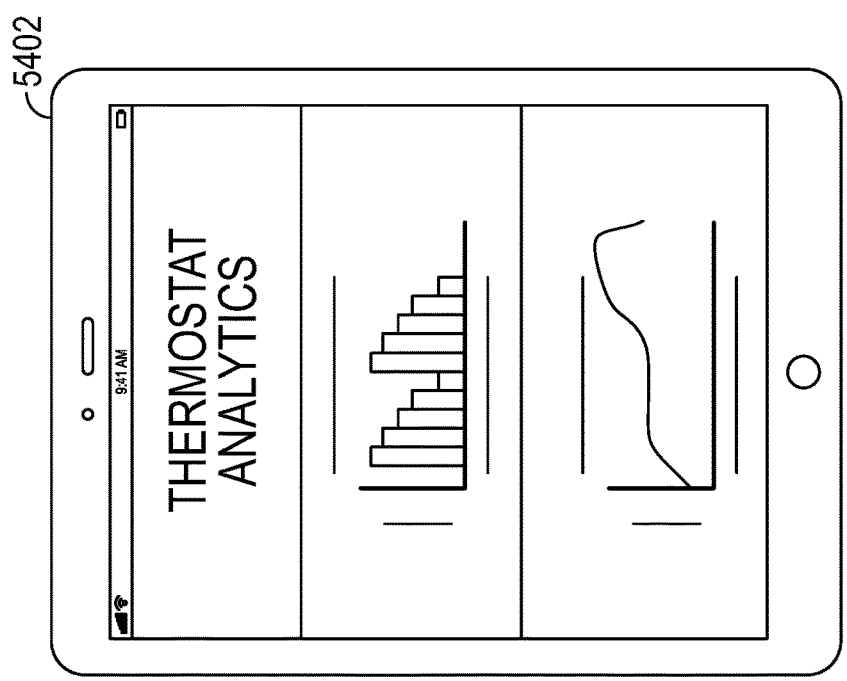
FIG. 32

MULTI-FUNCTION HOME CONTROL SYSTEM WITH CONTROL SYSTEM HUB AND REMOTE SENSORS

CROSS-REFERENCE TO RELATED PATENT APPLICATIONS

The present application claims the benefit of U.S. Provisional Application No. 62/156,868, filed May 4, 2015, U.S. Provisional Application No. 62/247,672, filed Oct. 28, 2015, U.S. Provisional Application No. 62/260,141 filed Nov. 25, 2015, U.S. Provisional Application No. 62/274,750, filed Jan. 4, 2016, U.S. Provisional Application No. 62/275,199, filed Jan. 5, 2016, U.S. Provisional Application No. 62/275,202, filed Jan. 5, 2016, U.S. Provisional Application No. 62/275,204, filed Jan. 5, 2016, and U.S. Provisional Application No. 62/275,711, filed Jan. 6, 2016, all of which are incorporated herein by reference in their entireties.

BACKGROUND

The present disclosure relates generally to thermostats and more particularly to the control of a building or space's heating, ventilating, and air conditioning (HVAC) system through the use of a multi-function thermostat.

A thermostat is, in general, a component of an HVAC control system. Traditional thermostats sense the temperature or other parameters (e.g., humidity) of a system and control components of the HVAC system in order to maintain a set point for the temperature or other parameter. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes display for presenting information to a user and one or more user interface elements for receiving input from a user. To control the temperature of a building or space, a user adjusts the set point via the thermostat's user interface.

SUMMARY

One implementation of the present disclosure is a home control system. The home control system includes a thermostat configured to measure environmental conditions in a first room of a building and control heating, ventilation, and air condition (HVAC) equipment within the building. The thermostat includes a central control hub configured to communicate with a plurality of remote sensor units via a data communications interface. The thermostat further includes a processing circuit configured to monitor and control non-HVAC equipment within the building. The system further includes a first remote sensor unit of the plurality of remote sensor units. The first remote sensor unit is configured to measure environmental conditions in a second room of the building and wirelessly communicate information associated with the measured environmental conditions to the central control hub. The thermostat is further configured to control both the HVAC equipment and the non-HVAC equipment within the building based on the information received from the remote sensor unit.

In some embodiments of the home control system, the first remote sensor unit of the home control system includes a microphone configured to receive a voice command. The first remote sensor unit is configured to communicate the voice command to the central control hub. The thermostat is further configured to control both the HVAC equipment and the non-HVAC equipment based on the voice command. In some embodiments of the home control system, the non-HVAC equipment includes a lighting system. The thermostat is configured to operate the lighting system based on the voice command received from the first remote sensor unit. In some embodiments, the thermostat is configured to control a light in a third room of the building based on a command received by the first remote sensor unit in the second room of the building. In some embodiments, the non-HVAC equipment includes a blind control system. The thermostat is configured to operate the blind control system based on the voice command received from the first remote sensor unit.

In some embodiments of the home control system, the first remote sensor unit of the home control system includes an occupancy sensor configured to detect presence of a user within the second room. The first remote sensor unit is configured to communicate occupancy information to the central control hub. The thermostat is further configured to control both the HVAC equipment and the non-HVAC equipment based on the occupancy information.

In some embodiments of the home control system, the home control system further includes a second remote sensor unit located within a third room of the building. The first remote sensor unit and the second remote sensor unit are configured to communicate temperature information associated with the second room and the third room, respectively, to the central control hub. The thermostat is configured to calculate an average temperature from temperature information of the first room, temperature information of the second room, and temperature information of the third room. The thermostat is also configured to control the HVAC equipment based on the calculated average temperature.

In some embodiments of the home control system, the home control system includes a second remote sensor unit configured to monitor building equipment and communicate status information for the building equipment to central control hub. The thermostat is configured to modify operation of the building equipment based on the status information for the building equipment. In some embodiments of the home control system, the first remote sensor unit comprises at least one of a proximity sensor, an ambient light sensor, a vibration sensor, or a motion sensor.

In some embodiments of the home control system, the non-HVAC system includes a home automation system. In some embodiments, the home automation system includes at least one of a security system, a sprinkler system, or a home entertainment system.

In some embodiments of the home control system, the first remote sensor unit includes an electrical outlet and a power relay configured to selectively provide power to the electrical outlet. The first remote sensor unit is configured to operate the power relay in accordance with a command from the thermostat.

In some embodiments of the home control system, the first remote sensor unit includes an electrical outlet and a power relay configured to selectively provide power to the electrical outlet. The first remote sensor unit is configured to operate the power relay based on the measured environmental conditions of the second room without a command from the thermostat.

In some embodiments of the home control system, the thermostat is configured to control both the HVAC equipment and the non-HVAC equipment within the building based on a combination of information received from the plurality of remote sensor units.

Another implementation is a home control method that includes measuring, by a thermostat, environmental conditions in a first room of a building. The method also includes receiving, at the thermostat, information regarding measured environmental conditions from a first remote sensor unit in a second room of the building. The method further includes controlling, by the thermostat, both heating, ventilation, and air condition (HVAC) equipment and non-HVAC equipment within the building based on the information received from the first remote sensor unit and the measured environmental conditions in the first room.

In some embodiments of the home control method, the first remote sensor unit comprises a microphone configured to receive a voice command. The method further includes receiving a voice command at the thermostat from the first remote sensor unit. The controlling both the HVAC equipment and the non-HVAC equipment includes controlling both the HVAC equipment and the non-HVAC equipment based on the voice command.

In some embodiments of the home control method, the non-HVAC equipment includes a lighting system. The controlling both the HVAC equipment and the non-HVAC equipment includes operating the lighting system based on the voice command received from the first remote sensor unit.

Some embodiments of the home control method also include receiving, at the thermostat, information associated with measured environmental conditions from a second remote sensor unit in a third room of the building. The controlling both the HVAC equipment and the non-HVAC equipment includes controlling both the HVAC equipment and the non-HVAC equipment based on a combination of the information associated with the measured environmental conditions received from the first remote sensor unit and the information associated with the measured environmental conditions received from the second remote sensor unit.

In some embodiments of the home control method, the first remote sensor unit includes an electrical outlet and a power relay configured to selectively provide power to the electrical outlet. The method also includes sending a command from the thermostat to the first remote sensor unit to operate the power relay based on the information received from the first remote sensor unit. In some embodiments of the home control method, the non-HVAC system includes at least one of a security system, a sprinkler system, or a home entertainment system.

Another implementation is a home control system. The home control system includes a user control device and a sensor unit. The user control device is located within a first room of a home and includes a first set of sensors configured to measure environmental conditions within the first room. The sensor unit is located within an electrical box recessed into a mounting surface in a second room of the home and includes a second set of sensors configured to measure environmental conditions within the second room. The user control device is configured to use measurement signals from the first and second sets of sensors to generate a control signal for home equipment that operate to affect the environmental conditions within the first and second rooms.

In some embodiments, the system includes a plurality of sensor units located within other electrical boxes in other rooms of the home. Each sensor unit may include a set of sensors configured to measure environmental conditions within one of the other rooms. The user control device may be configured to use measurement signals from the plurality of sensor units to generate a control signal for home equipment that operate to affect the environmental conditions within the other rooms.

In some embodiments, the user control device is configured to receive temperature measurements from the plurality of sensor units indicating temperatures in multiple different rooms of the home, calculate an average temperature using the temperature measurements, and generate a control signal for home HVAC equipment based on the average temperature. In some embodiments, the user control device is configured to operate home HVAC equipment to maintain each of the temperatures in the multiple different rooms within a predetermined range of temperature values.

In some embodiments, the electrical box is recessed into a wall of the second room and the sensor unit receives power from a power line extending through the wall. In some embodiments, the electrical box includes a power outlet configured to receive an electric plug of a power-consuming device within the second room. In some embodiments, the electrical box includes a power switch configured to control power to a power-consuming device within the second room. In some embodiments, the sensor unit includes a face plate covering the electrical box. The face plate may include an electronic display.

In some embodiments, the system includes a power relay located within the electrical box and operable to control power to a power-consuming device within the second room. In some embodiments, the sensor unit is configured to operate the power relay based on input from the plurality of sensors. In some embodiments, the sensor unit is configured to operate the power relay based on input from the user control device. In some embodiments, the sensor unit includes a microphone configured to receive voice commands from a user within the home and a power relay controller configured to operate the power relay in response to the microphone receiving a voice command.

In some embodiments, the sensor unit includes a microphone configured to receive a voice command from a user within the second room of the home. The sensor unit may be configured to send the voice command to the user control device. The user control device may be configured to operate the home equipment based on the voice command received from the sensor unit.

In some embodiments, the system includes another sensor unit located within another electrical box in another room of the home. The user control device may be configured to generate a control signal for the other sensor unit based on the voice command. The other sensor unit may be configured to operate a power relay located within the other electrical box in response to receiving the control signal from the user control device.

Another implementation of the present disclosure is a sensor unit assembly. The sensor unit assembly includes an electrical box recessed into a mounting surface within a building zone, a power relay located within the electrical box and operable to control power to a power-consuming device within the building zone, and a sensor unit located within the electrical box. The sensor unit includes a plurality of sensors and is configured to operate the power relay based on input from the plurality of sensors.

In some embodiments, the sensor unit includes a data communications interface configured to communicate with a user control device located in a different building zone. The sensor unit may be configured to operate the power relay based on input from the user control device.

In some embodiments, the sensor unit includes a microphone configured to receive voice commands from a user within the building zone and a power relay controller configured to operate the power relay in response to the microphone receiving a voice command.

In some embodiments, the electrical box includes a power outlet configured to receive an electric plug of a power-consuming device within the building zone. In some embodiments, the electrical box includes a power switch configured to control power to a power-consuming device within the building zone. In some embodiments, the assembly includes a face plate covering the electrical box. The face plate may include an electronic display.

In some embodiments, the assembly includes a power relay located within the electrical box and operable to control power to a power-consuming device within the building zone. In some embodiments, the sensor unit is configured to operate the power relay based on input from the plurality of sensors. In some embodiments, the sensor unit includes a microphone configured to receive voice commands from a user within the home and a power relay controller configured to operate the power relay in response to the microphone receiving a voice command.

Another implementation of the present disclosure is a multi-function user control device for monitoring and controlling building equipment. The user control device includes a touch-sensitive display and a housing coupled to the touch-sensitive display. The housing is configured to attach to a mounting surface. The touch-sensitive display is transparent or translucent such that the mounting surface is visible through the touch-sensitive display.

Another implementation of the present disclosure is a multi-function user control device for monitoring and controlling building equipment. The user control device includes a touch-sensitive display and a housing coupled to the touch-sensitive display. The housing is configured to attach to a mounting surface. The user control device further includes a processing circuit contained within the housing and configured to monitor and control the building equipment. The user control device further includes a data communications interface contained within the housing and sensors located outside the housing. The sensors are configured to send measurements to the processing circuit via the data communications interface.

In some embodiments, the housing is located at least partially within a first electrical gang box within the mounting surface and the sensors are located at least partially within a second electrical gang box within the mounting surface. In some embodiments, the sensors are distributed throughout a building monitored and controlled by the user control device. In some embodiments, the sensors include a radon sensor.

Another implementation of the present disclosure is a multi-function user control device for monitoring and controlling building equipment. The user control device includes a touch-sensitive display, a cellular transceiver configured to communicate with a cellular network, a WiFi transceiver configured to communicate with mobile devices, and a processing circuit coupled to the touch-sensitive display, the cellular transceiver, and the WiFi transceiver. The processing circuit is configured to monitor and control the building equipment and to bridge communications between the cellular network and the mobile devices via the cellular transceiver and the WiFi transceiver. In some embodiments, the processing circuit is configured to operate the user control device as a WiFi hotspot to communicate directly with the mobile devices via the WiFi transceiver.

Another implementation of the present disclosure is a multi-function user control device for monitoring and controlling building equipment. The user control device includes a housing configured to attach to a mounting surface, a microphone coupled to the housing, and a processing circuit contained within the housing. The processing circuit is configured to monitor and control the building equipment, monitor an input from the microphone for voice commands and control the building equipment in response to the voice commands.

In some embodiments, controlling the building equipment includes generating a control signal for the building equipment and providing the control to the building equipment. In some embodiments, the control signal causes the building equipment to activate, deactivate, operate at a different level, or change to a different an operating state.

Another implementation of the present disclosure is a multi-function user control device for monitoring and controlling building equipment using wireless communication. The user control device provides an interface for environment control and at least one security device. In some embodiment, the multi-function user control device includes a display for indicating environmental parameters and images or video captured from the security device.

Another implementation of the present disclosure is a multi-function user control device for monitoring and controlling building equipment. The user control device includes a processing circuit configured to monitor and control the building equipment, a data communications interface coupled to the processing circuit, and a sensors configured to send measurements to the processing circuit via the data communications interface.

In some embodiments, the user control device includes a housing containing the processing circuit and the data communications interface. The sensors may be located outside the housing. In some embodiments, the sensors are distributed throughout a building monitored and controlled by the user control device. In some embodiments, the sensors are configured to communicate wirelessly with the processing circuit via the data communications interface.

In some embodiments, the sensors include a humidity sensor located within a wall of the building. In some embodiments, the sensors include at least one of a smoke sensor, a fire sensor, a water leakage sensor, a humidity sensor, an air quality sensor, a vibration sensor, a temperature sensor, a light sensor, a camera, and a microphone.

Another implementation of the present disclosure is a multi-function user control device for monitoring and controlling building equipment. The user control device includes an air quality sensor configured to measure a quality of airflow received at the user control device and a processing circuit coupled to the air quality sensor. The processing circuit is configured to generate air quality metrics based on the measured quality of the airflow and generate a control signal for the building equipment based on the air quality metrics.

BRIEF DESCRIPTION OF THE DRAWINGS

FIGS. 1 and 2 are perspective view schematic drawings illustrating one or more physical features of a multi-function user control device, according to some embodiments.

FIGS. 4 and 5 are partial, perspective view schematic drawings illustrating one or more physical features of a bottom of a multi-function user control device, according to some embodiments.

FIG. 6A is a partial, perspective view schematic drawing illustrating one or more physical features of a top of a multi-function user control device, according to some embodiments.

FIG. 6B is a simplified, side front view schematic drawing illustrating one or more physical features of a multi-function user control device attached to a wall, according to some embodiments.

FIG. 26A is an illustration of the user control device detecting occupancy, according to some embodiments.

FIG. 26B is a flow diagram illustrating operations shown in FIG. 26A, according to some embodiments.

FIG. 27A is a flow diagram illustrating operations in which the user control device uses schedule data to determine occupancy, according to some embodiments.

FIG. 27C is a drawing of a scheduling screen the user control device, through which the process of handling multiple occupancy homes is shown, according to some embodiments.

FIG. 29 is a drawing of operations in which the user control device adjusts compressor staging using occupancy, according to some embodiments.

FIG. 32 is a drawing of analytics which may be provided by the user control device, according to some embodiments.

DETAILED DESCRIPTION

Overview

Figure 3:
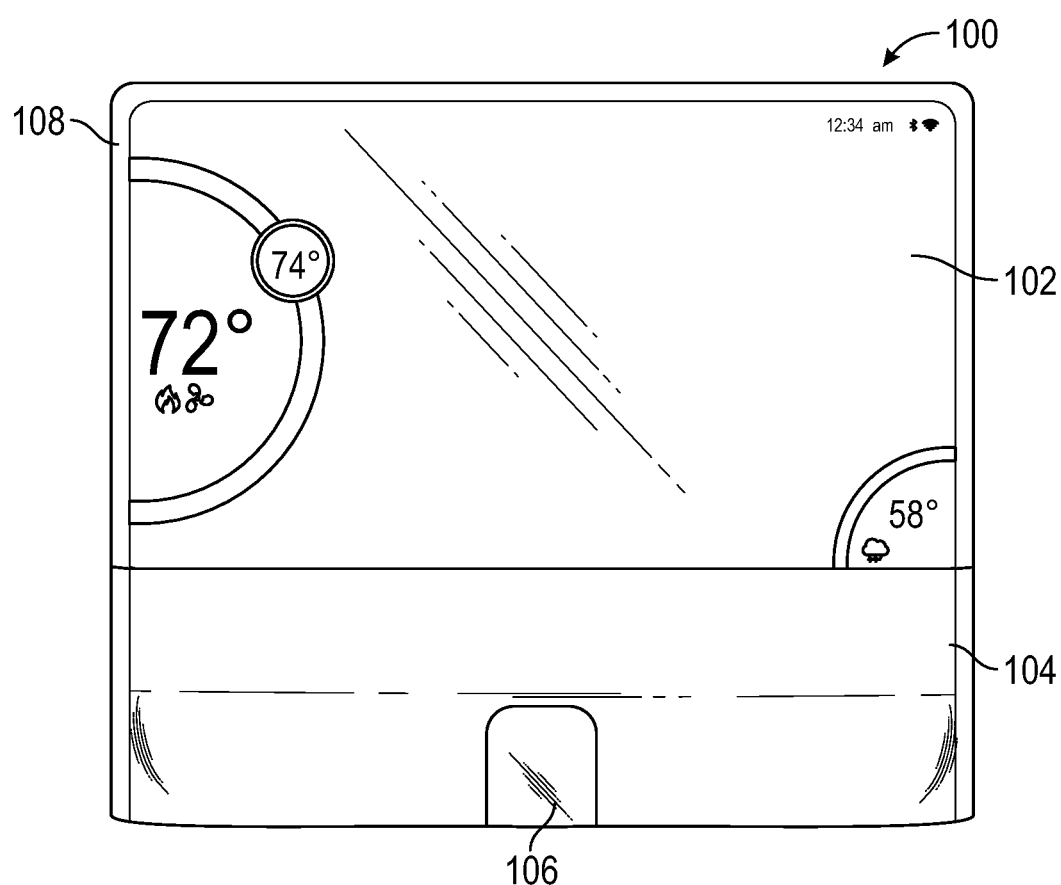
FIG. 3 is a planar front view schematic drawing illustrating one or more physical features of a multi-function user control device, according to some embodiments.
Figure 4:
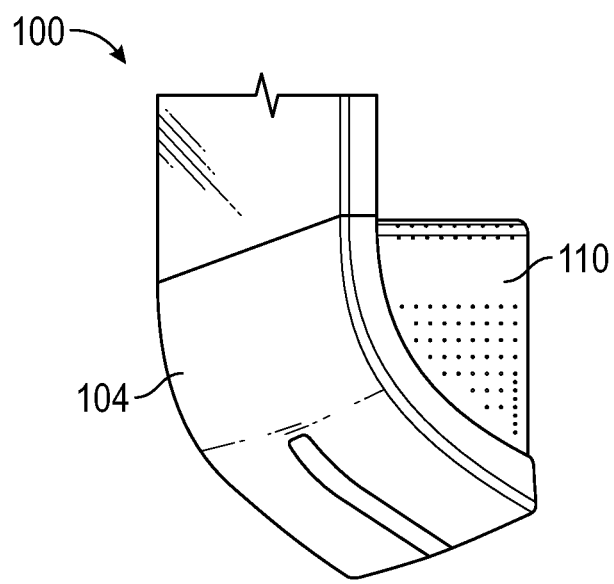

Referring generally to the FIGURES, a multi-function user control device and home control system are shown, according to various exemplary embodiments. The user control device may be implemented as a smart hub and may be connected to any of a variety of sensors, controllable systems, and devices to form a home control system. For example, the user control device may be connected to a home automation system, a building automation system, an HVAC system, a lighting system, a security system, an electrical system, a sprinkler system, a home entertainment system, and/or any other type of system that can be monitored or controlled via a user device. The user control device may be implemented in any of a variety of environments (e.g., a home, a building, a classroom, a hotel, a healthcare facility, a vehicle, etc.) and used to monitor, control, and/or facilitate user interaction with controllable systems or devices in such environments.

For example, the user control device may be installed in a home or building (e.g., mounted on a wall) and may function as a thermostat for the home or building. In an illustrative embodiment, the user control device functions as a thermostat and includes a central control hub that communicates with remote sensors, HVAC equipment, and non-HVAC equipment. The user control device includes a processing circuit that monitors and controls both the HVAC and non-HVAC equipment. A thermostat is an ideal device for use as a central control hub for controlling non-HVAC equipment due, at least in part, to the already existing need for a thermostat in each home to control HVAC components and to the generally central location of thermostats within the home. The use of a thermostat as a central control hub allows for HVAC and additional non-HVAC home automation features to be consolidated into a single device and home control system, thus simplifying the control of systems and devices within the home. The user control device (e.g., the thermostat) can monitor and control the HVAC and non-HVAC equipment based on inputs received from remote sensors. The remote sensors include electronic components that monitor one or more environmental or other conditions and may be distributed throughout various rooms of a building. As an example, the sensors can measure temperature, humidity, an amount of ambient light, damper locations of ductwork, occupancy of a room, position of window blinds, etc.

The user control device can operate non-HVAC equipment to control the environment of a room or building. In some instances, the user control device can open or close blinds during the day to control the amount of sunlight and, therefore, heat let in through windows. In an illustrative embodiment, the user control device communicates with a microphone to receive voice commands. The voice command can be received by the user control device and, based on the command, the user control device can operate the HVAC or non-HVAC equipment. For example, a voice command can be used to cause the blinds to open, the lights to turn on, the thermostat to change a setpoint, etc.

In some embodiments, the user control device is in communication with an occupancy sensor. The occupancy sensor can detect whether a room is occupied by a human, a dog, etc. For example, the occupancy sensor can include a microphone, a sonar sensor, an infrared imaging device, a motion detector, a proximity sensor, an ambient light sensor, a vibration sensor, etc. The user control device can control the HVAC and/or non-HVAC equipment based on which rooms are occupied. For example, a storage room of a house can normally be maintained at a temperature different from the rest of the house (e.g., higher in the summer or colder in the winter). If an occupancy sensor detects that the storage room is occupied, the user control device can increase or decrease the temperature of the room via HVAC equipment, open blinds, turn on lights, etc., to make the room more comfortable for the occupants.

In some embodiments, the user control device can be in communication with remote sensors that are distributed throughout a building. For example, a house can include several rooms that each have a temperature sensor that detects the temperature in the room and one or more HVAC ducts that blow air into the room. Each room can be associated with one or more dampers, valves, etc., to control the amount of air blown into the respective room by the HVAC equipment. Each damper (or valve, etc.) can be controlled by the user control device. In such embodiments, the user control device can monitor the temperature of each room. Each room can have an independent set point. Thus, the user control device can adjust the position of the dampers to control the temperature of each room to maintain the respective setpoint temperatures.

The user control device can be equipped with one or more of a variety of sensors (e.g., temperature, humidity, air quality, proximity, light, vibration, motion, optical, audio, occupancy, power, security, etc.) configured to sense a variable state or condition of the environment in which the user control device is installed. The user control device may include a variety of user interface devices (e.g., a touch-sensitive panel, an electronic display, speakers, haptic feedback, ambient lighting, etc.) configured to facilitate user interaction with the user control device. The user control device may include a data communications interface configured to facilitate communications between the user control device and a building automation system, a home automation system, HVAC equipment, mobile devices (e.g., via WiFi, Bluetooth, NFC, LTE, LAA LTE, etc.), a communications network (e.g., a LAN, WAN, 802.11, the Internet, a cellular network, etc.), and/or any other systems or devices to which the user control device may be connected.

The user control device may be configured to function as a connected smart hub and may provide a variety of features not found in traditional thermostats. For example, the user control device may be configured to receive voice commands from a user and control connected equipment in response to the voice commands. The user control device may be configured to connect to mobile devices (e.g., a user's phone, tablet, laptop, etc.) to allow remote monitoring and control of connected systems. The user control device may be configured to detect the occupancy of a room or space in which the user control device is installed and may perform a variety of occupancy-based control processes. The user control device may monitor the performance of connected equipment (e.g., HVAC equipment) and may perform diagnostics based on data received from the HVAC equipment.

The user control device may receive weather forecasts from a weather service and utility rate information from a utility provider. The user control device may use the weather forecasts in conjunction with the utility rate information to optimize (e.g., minimize) the energy consumption of the home or building. In some embodiments, the user control device generates a utility bill forecast and recommends set point modifications to reduce energy consumption or energy cost. In some embodiments, the user control device receives energy consumption information for other homes/buildings from a remote system and compares the energy consumption of connected HVAC equipment to the energy consumption of the other homes/buildings.

In some embodiments, the user control device receives weather information from a weather service. The user control device may display directions to an emergency area of the building (e.g., a basement) in response to the weather information indicating dangerous weather conditions. These and other features of the user control device are described in greater detail below.

Accordingly, various aspects of a user control device can be used to automate a home, office, commercial building, etc. In some instances, a building can be retrofitted to include various sensor and control devices to automate the building. For example, a user control device can be installed to control the temperature of multiple rooms of a house. Wireless temperature sensors can be installed in each room to be controlled and can communicate the temperature of the respective room to the user control device. Dampers can be installed in the existing ductwork of the house to independently control the airflow to each room. The user control device can wirelessly communicate with the dampers to maintain each room at a respective temperature setpoint. The user control device can replace an existing thermostat to control the existing HVAC equipment.

Based on a user's budget, needs, and/or desires, the user can automate some or all of the rooms of a building and can include various sensors or equipment. Some users may include in their home automation system occupancy detection, and some may include automatic window blind control. In some instances, a user control device can be adapted to virtually any level of automation that a user desires.

Physical Features

Referring now to FIGS. 1-6B, a multi-function user control device 100 is shown, according to some embodiments. The user control device 100 can be a thermostat that includes a central control hub functionality. For example, the user control device 100 can be communicatively coupled to HVAC equipment to control the ambient atmosphere (e.g., temperature, humidity, etc.) of one or more rooms. The user control device can also be communicatively coupled to non-HVAC equipment or systems such as, for example, lighting systems, blind control systems, security systems, entertainment devices or systems, refrigeration systems, etc. The user control device 100 can further be communicatively coupled to one or more remote sensors, remote servers, or other information sources that may provide data for use by the user control device 100 to automate various systems or devices within a building. The user control device 100 can be configured to communicate information to a user (e.g., status of equipment, temperature of a room, etc.) and to receive inputs from a user to change settings, set up new equipment, etc.

User control device 100 can be mounted on a wall or other suitable mounting location (e.g., a vertical wall within a home or building, a ceiling, a floor, a surface of an object within a building space, a ledge, a dashboard, furniture, a vehicle seat or other vehicle surface, etc.). In an illustrative embodiment, the user control device 100 can be mounted in a location that allows the user control device 100 to communicate wirelessly with one or more remote sensors or devices. In some embodiments, user control device 100 is mounted on a wall in front of an electrical gang box and receives electrical connections and/or data connections through the gang box. In other embodiments, user control device 100 is attached to a wall without requiring a gang box. User control device 100 is shown to include a touch-sensitive display 102, a housing 104, a sensor window 106, and an ambient lighting frame 108. In some embodiments, the multi-function user control device 100 is detachable from the wall and can be carried by a user.

Touch-sensitive display 102 may be a touchscreen or other type of electronic display configured to present information to a user in a visual format (e.g., as text, graphics, etc.) and receive input from a user (e.g., via a touch-sensitive panel). In an illustrative embodiment, the touch-sensitive display 102 can be used to display status information (e.g., current temperature, heating/cooling settings, errors, etc.) and can be used to set up communications between the user control device 100 and remote sensors or equipment. For example, touch-sensitive display 102 may include a touch-sensitive panel layered on top of an electronic visual display. A user can provide input to user control device 100 through simple or multi-touch gestures by touching display 102 with one or more fingers and/or a stylus/pen. Touch-sensitive display 102 can use any of a variety of touch-sensing technologies such as resistive sensing, surface acoustic wave, capacitive sensing (e.g., surface capacitance, projected capacitance, mutual capacitance, self-capacitance, etc.), infrared grid, infrared acrylic projection, optical imaging, dispersive signal technology, acoustic pulse recognition, or other touch-sensitive technologies known in the art. Many of these technologies allow for multi-touch responsiveness of display 102 allowing registration of touch in two or even more locations at once. In some embodiments, multi-touch responsiveness can be used to conveniently allow a user to monitor the status of remote sensors. For example, a user can use a two-finger swiping motion and the display 102 can, in response, display the current temperature of another room (e.g., sensed by a remote sensor).

In some embodiments, touch-sensitive display 102 includes a transparent or translucent display screen. The display screen may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. Touch-sensitive display 102 may be configured to present visual media (e.g., text, graphics, etc.) without requiring a backlight. Advantageously, touch-sensitive display 102 may be transparent or translucent to allow the surface behind display 102 to be seen through display 102. For example, if user control device 100 is mounted on a wall, the wall may be visible through display 102. This allows user control device 100 to blend in to the surface upon which user control device 100 is mounted.

Touch-sensitive display 102 provides a variety of information to a user either when prompted by the user, or when pushed to the user, without prompting, by another system (e.g., a security system, a weather monitoring system, etc.) or remote sensors (e.g., a smoke detector, a fire detector, a malfunctioning sensor, etc.). Touch-sensitive display 102 may have a generally vertical orientation (as shown in FIGS. 1-6B) or a generally horizontal orientation. The size of display 102 may be varied depending on the space in which the user control device 100 is installed and the functionality desired for user control device 100.

Housing 104 may be attached to touch-sensitive display 102 along one or more edges or surfaces of display 102. Housing 104 provides a structure to mount user control device 100 to a wall or other surface. Housing 104 may be formed from a variety of materials (e.g., polymers, metals, composite materials, laminates, etc.) and may have a variety of different appearances or finishes. In some embodiments, touch sensitive display 102 is detachable from housing 104 for use in a portable fashion. Housing 104 can include a charging circuit for the touch sensitive display.

In some embodiments, housing 104 contains one or more sensors. For example, housing 104 may contain a temperature sensor, a humidity sensor, a motion sensor, an air quality sensor (e.g., carbon monoxide, carbon dioxide, allergens, smoke, etc.), a proximity sensor (e.g., NFC, RFID, Bluetooth, etc.), a camera, a microphone, a light sensor, a vibration sensor, or any other type of sensor configured to measure a variable state or condition of the environment in which user control device 100 is installed. In some embodiments, the proximity sensor is used to turn on display 102 when the user is close to user control device 100 and turn off display 102 when the user is not close to user control device 100, leading to less power usage and longer screen life. Some internal sensors such as a camera, light sensor, or optical sensor may be configured to monitor the room or space through a sensor window 106 (shown in FIG. 5). Other internal sensors such as a temperature sensor, humidity sensor, and air quality sensor may receive airflow from the room or space via holes 110 in housing 104 (shown in FIG. 4).

In other embodiments, the sensors may be located external to housing 104 and may provide input to user control device 100 via a data communications link. For example, one or more sensors may be installed in a gang box behind user control device 100, installed a separate gang box mounted within the same wall to which user control device 100 is mounted, or otherwise located throughout the room or space monitored or controlled by user control device 100 (e.g., in a wall, in a ceiling panel, in an open volume of the room or space, in a duct providing airflow to the room or space or receiving airflow from the room or space, etc.). In some embodiments, user control device 100 is installed in front of one gang box and the sensors are installed in a separate gang box. Advantageously, this allows user control device 100 to monitor the input from a variety of sensors positioned at disparate locations. For example, a humidity sensor may be positioned in a wall and configured to measure the humidity within the wall (e.g., to detect water leakage or burst pipes).

Housing 104 may contain a variety of electronic components configured to perform control functions (e.g., a circuit board, memory, a processor, etc.), facilitate communications with remote sensors or equipment (e.g., a WiFi transceiver, a cellular transceiver, a communications interface, etc.), and provide a visual display via display 102 (e.g., a video card or module, etc.). In some embodiments, all of the electronics other than touch-sensitive display 102 are contained within housing 104. In other embodiments, the sensors are located within housing 104 and the remaining electronics are located elsewhere (e.g., in a circuit board perpendicular display 102 inside of the wall, in a gang box, part of a separate system in communication with user control device 100). In some embodiments, the circuit board is perpendicular to touch-sensitive display 102 and disposed in its own housing or bracket. The circuit board may be connected to the remaining electronics within housing 104 or elsewhere via a wiring harness or connector.

In some embodiments, housing 104 is a modular housing configured to house any of a variety of interchangeable modules or components. For example, housing 104 may include any of the features of the modular thermostat described in U.S. Provisional Application No. 62/260,141 filed Nov. 25, 2015, the entirety of which is incorporated by reference herein. The modular features of housing 104 provide a user with an unparalleled ability to upgrade, repair, or replace individual components of user control device 100 without replacing the entire device 100. In some embodiments, user control device 100 includes a plurality of modular boards, each of which provides user control device 100 with different capabilities. For example, user control device 100 may include a motherboard, a networking board, an occupancy detection board, a humidity board, a near field communications (NFC) board, a temperature board, an energy harvesting board, a battery board, and/or any other type of modular board. One or more boards can be interchanged such that the user control device 100 is compatible with various sensors and/or equipment of a system. For example, a user may implement a building automation system that includes an HVAC system, automatic window blinds, automatic lighting controls, and entertainment devices (e.g., music players or television). The boards of the user control device 100 can be selected to be compatible and communicative with the sensors, motors, actuators, etc., of the HVAC system as well as the window blinds, the lighting, and the entertainment devices.

Various modular components of user control device 100 may be added or removed based on the desired functionality of user control device 100. For example, the humidity board may be configured to measure the humidity of the room or space and may include an integrated humidity sensor. The NFC board may be configured to provide communications between user control device 100 and an external device through NFC. The temperature board may be configured to measure the temperature of the room or space and may include an integrated temperature sensor. The energy harvesting board may be configured to interact with an energy harvesting apparatus. The networking board may be configured to allow user control device 100 to communicate with other devices through the internet, Bluetooth, WiFi, or other suitable communications platform. The occupancy detection board may be configured to monitor the occupancy of the room or space (e.g., determine the number of people in the space) and adjust the control signals provided by user control device 100 accordingly. The battery board may include a battery configured to provide power to user control device 100 as a primary means of power or as backup power in the event of a power outage.

As future technologies develop, other modular boards will be made available for use with user control device 100. User control device 100 may be used with any combination of the listed modular boards or any other modular board to provide additional functionality. For example, user control device 100 may include only the temperature board and the networking board in some embodiments, whereas user control device may include an additional NFC board in other embodiments. The modular boards may each be independently installed and/or upgraded to provide user control device with any combination of desired functionality.

In some embodiments, user control device 100 includes an ambient lighting frame 108. Ambient lighting frame 108 may be configured to emit ambient light from an edge or perimeter of display 102. For example, ambient lighting frame 108 may be positioned along the sides and top of display 102 (as shown in FIGS. 1-3) and/or along any other surface or edge of display 102. Ambient lighting frame 108 may be configured to emit ambient lighting toward the wall or surface upon which user control device 100 is mounted. For example, FIG. 6B shows user control device 100 mounted to a wall 112. Display 102 may emit light in a direction substantially perpendicular to the front surface of display 102 in a direction away from wall 112 (i.e., to the left in FIG. 6B). Ambient lighting frame 108 may emit ambient light in an opposite direction toward wall 112 (i.e., toward the right in FIG. 6B) and/or in a direction substantially coplanar with display 102 (i.e., upward in FIG. 6B).

Advantageously, ambient lighting frame 108 allows user control device 100 to illuminate wall 112 with ambient lighting from frame 108 in addition to presenting visual media (e.g., graphics, text, etc.) via display 102. For example, user control device 100 may emit yellow ambient lighting toward wall 112 to indicate that severe weather is approaching. A variety of colors of ambient light may be emitted from ambient lighting frame 108 to indicate various conditions (e.g., yellow for alerts or warnings, red for emergencies, etc.). In some embodiments, user control device 100 includes other forms of ambient lighting (e.g., LEDs integrated with housing 104) in addition to or in place of ambient lighting frame 108. In an illustrative embodiment, the amount of light emitted by the ambient lighting frame 108 corresponds to a level of ambient light in the room in which the user control device 100 is located. For example, the user control device 100 remotely controls the lighting of the room based on user input. When the user indicates that the lights should be turned on, the light emitted by the ambient lighting frame 108 can be increased to be commensurate with the lights of the room turning on. Similarly, when the user indicates that the lights of the room are to be turned off, the light emitted by the ambient lighting frame 108 can be reduced or turned off. In alternative embodiments, the amount or type of light emitted by the ambient lighting frame 108 can correspond to the status or measurements of one or more remote sensors or equipment.

Connected Smart Control Hub

Figure 7A:
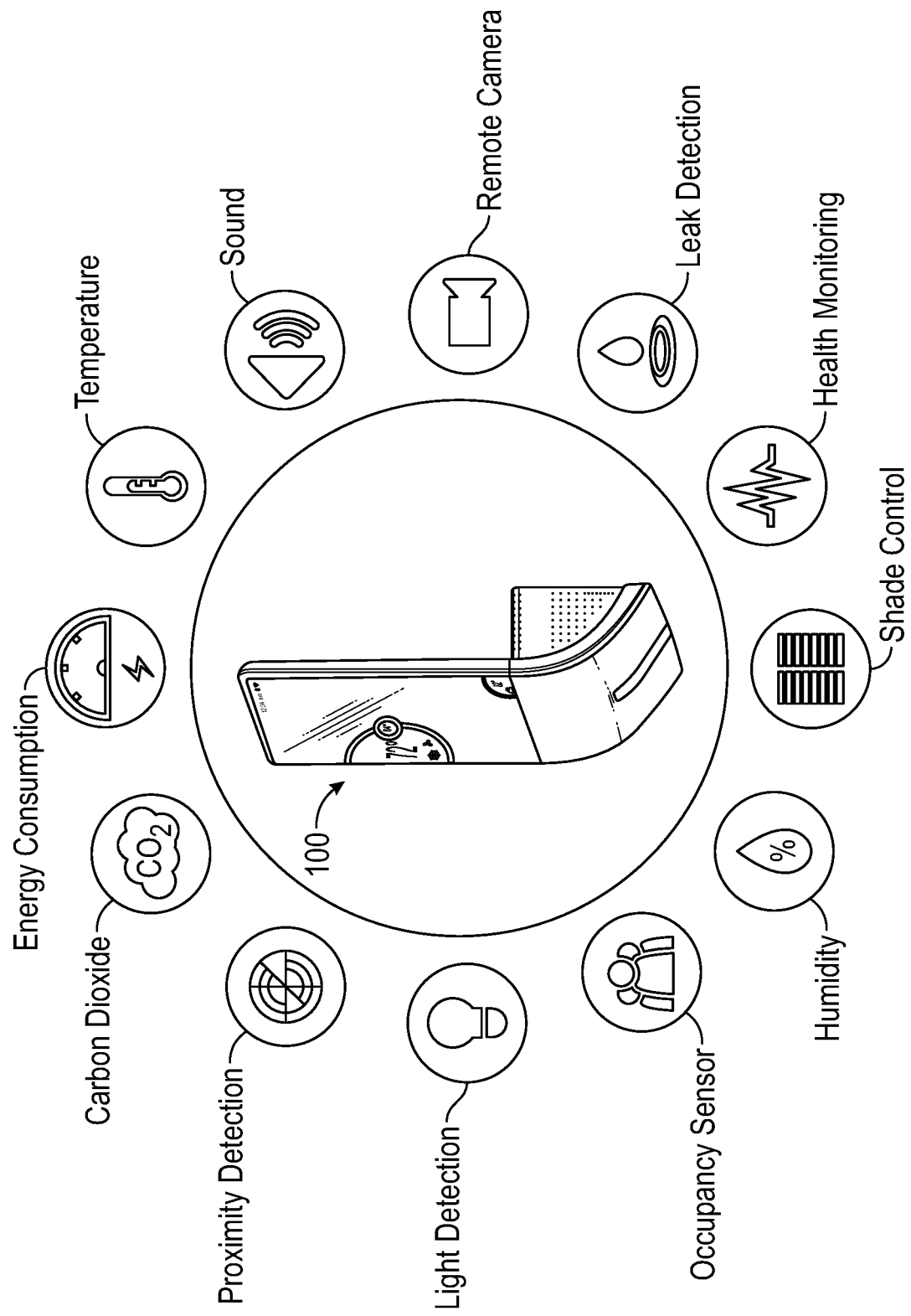
FIG. 7A is a schematic drawing illustrating the user control device as a connected smart hub in communication with various sensors, home automation devices, and building automation devices, according to some embodiments.

Referring now to FIG. 7A, user control device 100 is shown as a connected smart control hub or private area network (PAN), according to some embodiments. User control device 100 may include a variety of sensors which may be integrated into the user control device 100 or may be remote from the user control device 100. The sensors may be configured to communicate with a variety of external systems or devices. For example, user control device 100 may include a temperature sensor, a sound sensor, a humidity sensor, a light sensor, a proximity sensor, a carbon dioxide sensor, an occupancy sensor, or any of a variety of other sensors. Alternatively, user control device 100 may receive input from external sensors configured to measure such variables.

User control device 100 may communicate with a remote camera, a shade control system, a leak detection system, an HVAC system, or any of a variety of other external systems or devices which may be used in a home automation system or a building automation system. User control device 100 may provide a variety of monitoring and control interfaces to allow a user to control all of the systems and devices connected to user control device 100. Exemplary user interfaces and features of user control device 100 are described in greater detail below.

Figure 7B:
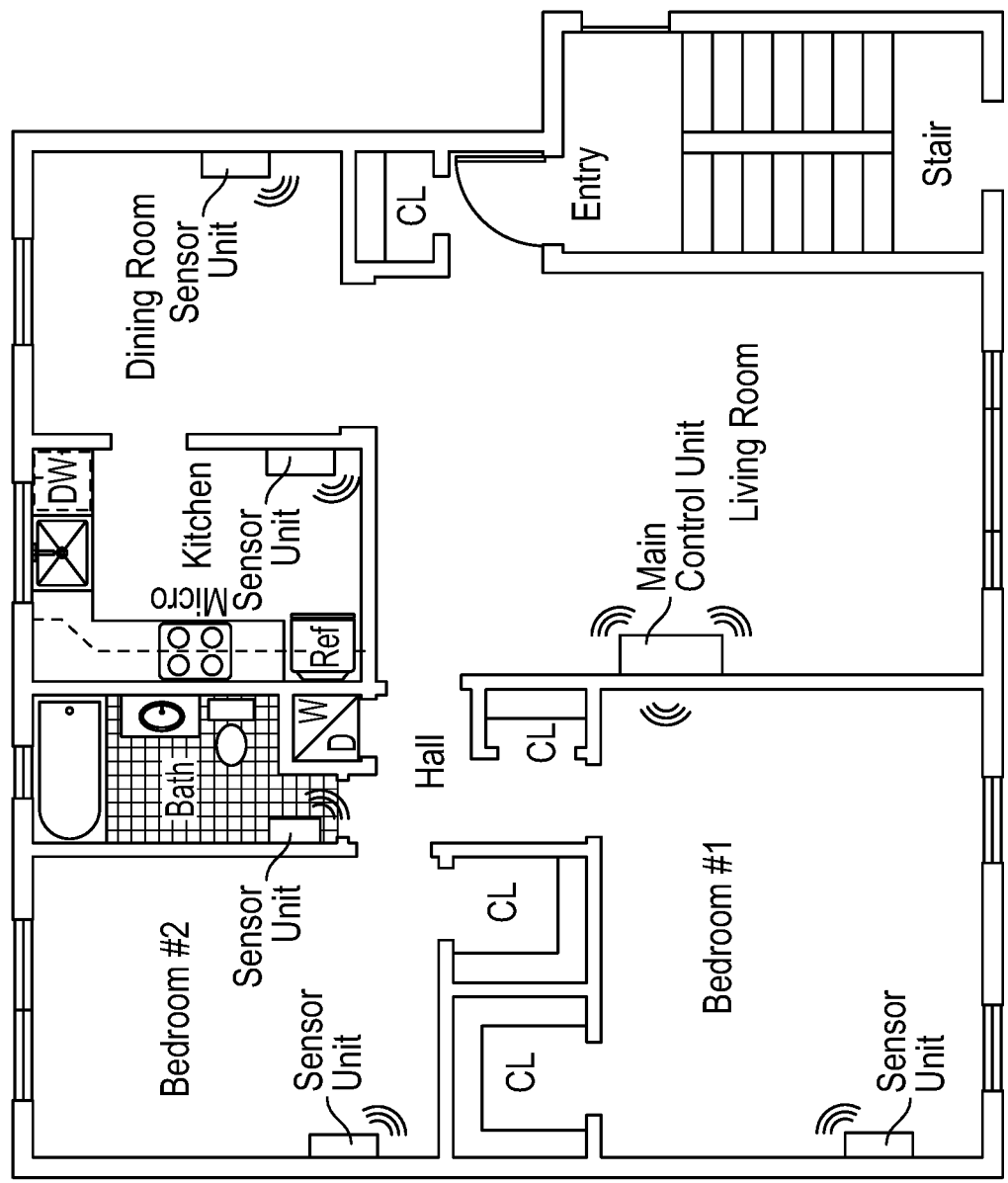
FIG. 7B is a floorplan of a home with a main control unit in one room and sensor units in other rooms, according to some embodiments.

Referring now to FIG. 7B, a floorplan of a home is shown. The home is shown to include several different zones (e.g., rooms or areas) such as a living room, a first bedroom, a second bedroom, a bathroom, a kitchen, and a dining room. A main control unit may be installed in one of the rooms or zones. For example, FIG. 7B shows a main control unit installed in the living room. In some embodiments, the main control unit is the same or similar to user control device 100, as previously described. The main control unit may serve as a central control hub for monitoring environmental conditions and controlling various devices throughout the home.

Sensor units may be installed in various rooms or zones in the home. For example, FIG. 7B shows a sensor unit installed in each of the bedrooms, the bathroom, the kitchen, and the dining room. The sensor units may be configured to measure environmental conditions within each room or zone and to receive user input (e.g., voice commands via a microphone). For example, each sensor unit may include a plurality of sensors (e.g., a temperature sensor, a humidity sensor, a smoke detector, a light sensor, a camera, a motion sensor etc.) configured to measure variables such as temperature, humidity, light, etc. in the room or zone in which the sensor unit is installed. The sensor units may communicate (e.g., wirelessly or via a wired communications link) with the main control unit and/or with each other. In some embodiments, sensors, such as low power door sensors, can communicate with repeaters disposed in the gang boxes or other locations using a low power overhead protocol. The repeaters can provide wired or wireless communication to the main control unit.

Figure 7C:
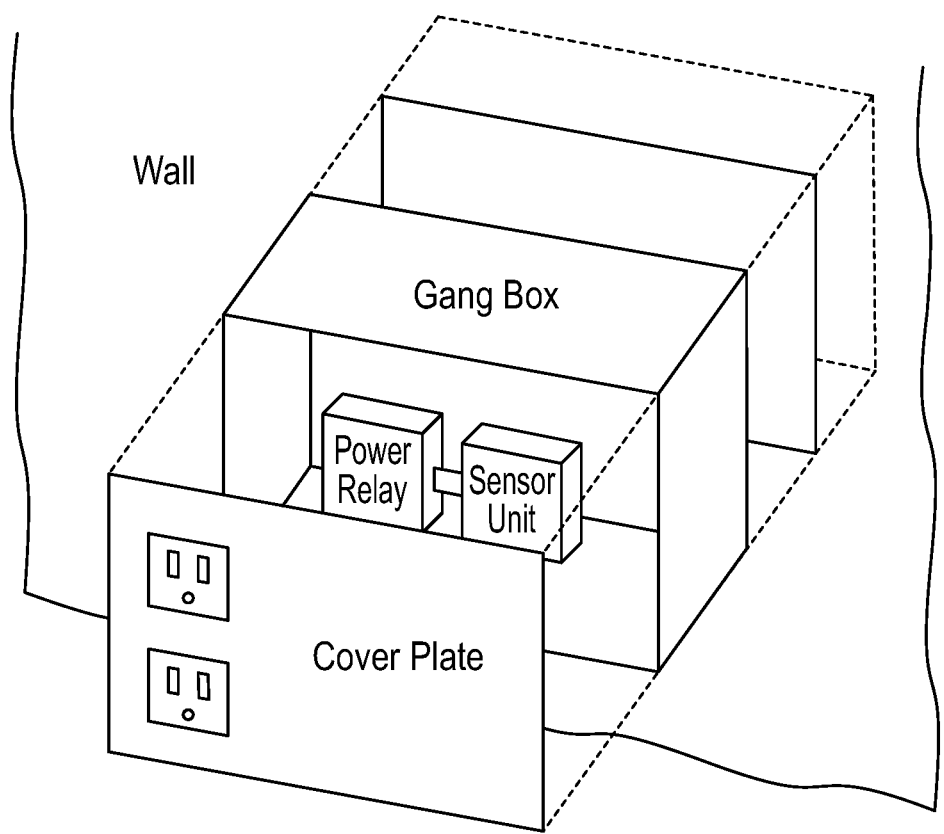
FIG. 7C is an exploded view drawing of a sensor unit assembly installed in an electrical gang box, according to some embodiments.
Figure 7D:
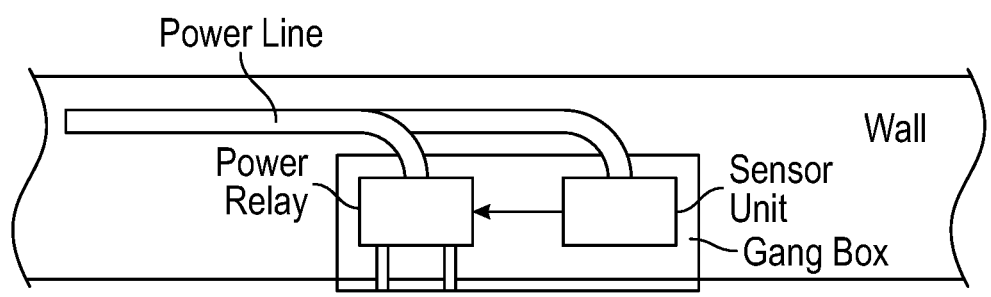
FIG. 7D is a planar, top view of the sensor unit assembly of FIG. 7C in an assembled state and embedded within a wall, according to some embodiments.
Figure 7E:
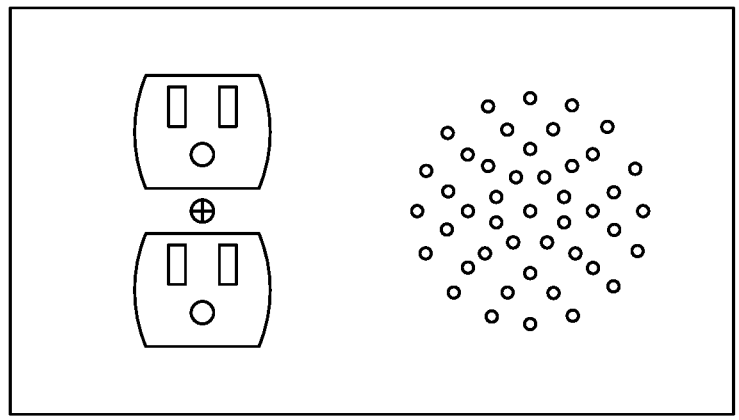
FIG. 7E is a drawing of a cover plate with holes which may be used in the sensor unit assembly of FIG. 7C, according to some embodiments.
Figure 7F:
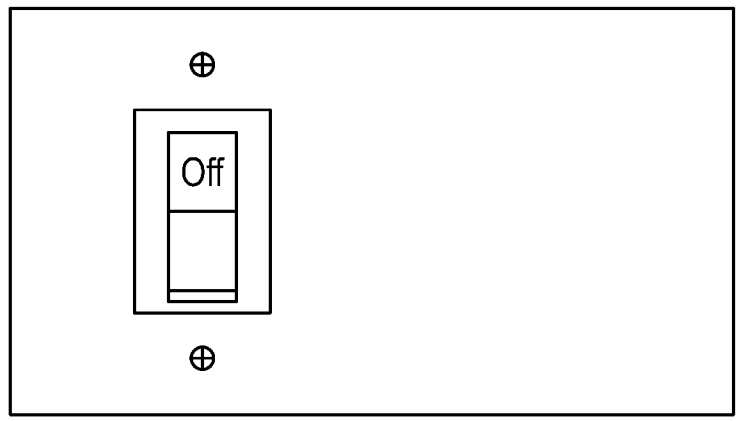
FIG. 7F is a drawing of a cover plate with a light switch which may be used in the sensor unit assembly of FIG. 7C, according to some embodiments.
Figure 7G:
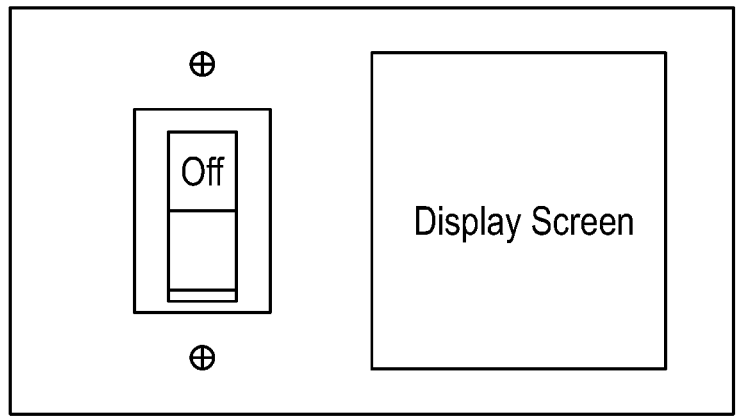
FIG. 7G is a drawing of a cover plate with a light switch and a display screen which may be used in the sensor unit assembly of FIG. 7C, according to some embodiments.

In some embodiments, each sensor unit is installed within an electrical gang box, as shown in FIGS. 7C-7D. The electrical gang box may be a single gang box, a double gang box, triple gang box, etc. The electrical gang box may be recessed into the wall and may be covered by a cover plate. In some embodiments, the gang box is a power outlet gang box and may be covered by a power outlet cover plate (as shown in FIG. 7C). In other embodiments, the gang box may be a power switch gang box and may be covered by a power switch cover plate (as shown in FIG. 7F). In some embodiments, the switch can include a sensor. In some embodiments, the cover plate includes holes or an optical window to allow the sensor unit to better sense conditions within the room or zone in which the sensor unit is installed (as shown in FIG. 7E). In some embodiments, the cover plate includes the sensor. In some embodiments, the cover plate includes a switch on one half of the cover plate and a display screen (e.g., an e-ink display) on the other half of the cover plate (as shown in FIG. 7G). This allows each sensor unit to provide an output via the display screen in addition to sensing conditions within the room or zone.

In some embodiments, each sensor unit includes a microphone configured to detect voice commands from a user. Advantageously, this allows a user to control systems and devices within the home from any room without requiring the user to interact directly with the main control unit. For example, a user in the dining room may provide the voice command "Hey GLASS, turn off the lights in the bathroom." The voice command may be detected by the sensor unit in the dining room and transmitted to the main control unit. In some embodiments, the sensor unit includes voice command module that captures audio data associated with a spoken phrase and provides the audio data to the user control device where the audio data is interpreted to determine a command. The main control unit may act based on the voice command by causing the lights in the bathroom to turn off. In some embodiments, each sensor unit includes a speaker configured to provide audio feedback to a user upon receiving voice commands.

In some embodiments, each sensor unit includes an integrated controller or other electronics configured to control conditions within the room in which the sensor unit is installed. For example, each sensor unit may be connected to a power relay for the room or zone in which the sensor unit is installed. The power relay may be installed within the electrical gang box along with the sensor unit (as shown in FIGS. 7C-7D). Each sensor unit may be configured to operate the power relay to activate or deactivate various power outlets, appliances, or other devices in the room. In some embodiments, the sensor units are configured to act upon voice commands without requiring the main control unit. For example, a sensor unit may operate a connected power relay (e.g., a power relay installed in the electrical gang box with the sensor unit) in response to sensing a voice command at a microphone of the sensor unit.

As shown in FIG. 7D, each sensor unit may be installed in an electrical gang box along with a power relay. The gang box may be recessed into the wall and connected to a power line embedded in the wall. The power line may connect to both the power relay and the sensor unit. Advantageously, this allows the sensor units to be powered by the existing electrical system within the house without requiring batteries. The power relay may be connected between the power supply line and the power outlet. The sensor unit within the electrical gang box may be configured to operate the power relay to control the power supply to the connected power outlet. For example, the sensor unit can activate the connected power relay to provide power to the connected power outlet, and deactivate the connected power relay to cut power to the connected power outlet. In some embodiments, the sensor unit is integrated with an electrical switch or outlet provided in the gang box, thereby providing an easy retrofit for an existing outlet or switch. In some embodiments, the sensor unit includes a battery or capacitive energy storage device that is recharged via power conductors in the gang box. In some embodiments, the battery or capacitive energy storage provides 72 hours of sensor operation after power is no longer supplied by the power conductors in the gang box.

The sensor units may operate the power relays in response to voice commands received at the microphones of the sensor units (e.g., "Hey GLASS, turn off the lights in this room") and/or in response to control signals from the main control unit. In some embodiments, the sensor units operate the power relays based on input signals from various sensors integrated with the sensor units. For example, each sensor unit may include an occupancy sensor configured to detect occupancy within the room or zone in which the sensor unit is installed. If the room remains unoccupied for a predetermined time period, the sensor unit may deactivate the power relay, causing the lights in the room to turn off.

In some embodiments, the main control unit uses input from multiple different sensor units to make control decisions. In some embodiments, the main control unit controls HVAC and non-HVAC equipment based on a combination of information received from multiple sensor units. For example, the main control unit may receive temperature inputs from the various sensor units indicating the temperature of each room. The main control unit may use the sensor inputs to determine an average temperature for the home. In some embodiments, the main control unit operates the home HVAC system to control the average temperature to a temperature set point or within a temperature range. In some embodiments, the HVAC system is controlled on a zone by zone basis and average temperature from a number of sensors in each zone is used to control each zone. In some embodiments, HVAC system is controlled using a maximum sensed temperature among a group of sensed temperatures or a minimum sensed temperature among a group of sensed temperatures. In some embodiments, temperature readings are weighted according to location on a room by room basis with more heavily used rooms having a greater weight for an average calculation. In some embodiments, the temperature readings are weighted based upon location and time (e.g., bedrooms having a greater weight during sleeping hours and kitchen and living areas having a greater weight during waking hours. In some embodiments, the main control unit operates the home HVAC system to ensure that each of the individual temperatures (i.e., the temperatures measured by the various sensor units) is within a comfortable temperature range.

In some embodiments, the main control unit uses input from multiple different sensor units to determine the room in which an occupant is located. For example, the main control unit may use signals from motion sensors or occupancy sensors of the sensor units to determine which rooms are occupied. In some embodiments, the main control unit processes audio inputs from the microphones of the various sensor units to determine which of the sensor units records the loudest volume. The main control unit may determine that the room with the loudest detected volume is the room in which an occupant is located.

In some embodiments, the main control unit uses input from multiple different sensor units to determine a safe evacuation route out of the home. For example, each sensor unit may include sensors configured to detect a fire (e.g., smoke detectors, thermal cameras, etc.) in the room in which the sensor unit is installed. If a fire is detected in the living room, the main control unit may determine that any evacuation route out of the home should avoid the living room. The main control unit may be configured to cause the sensor units in each room to display a safe evacuation route (e.g., via the display screens of the sensor units) which avoids the room with the fire. In some embodiments, the main control unit and/or sensor units announce the evacuation route audibly or display the evacuation routes on a map based upon the locations of the sensed hazards.

Figure 7H:
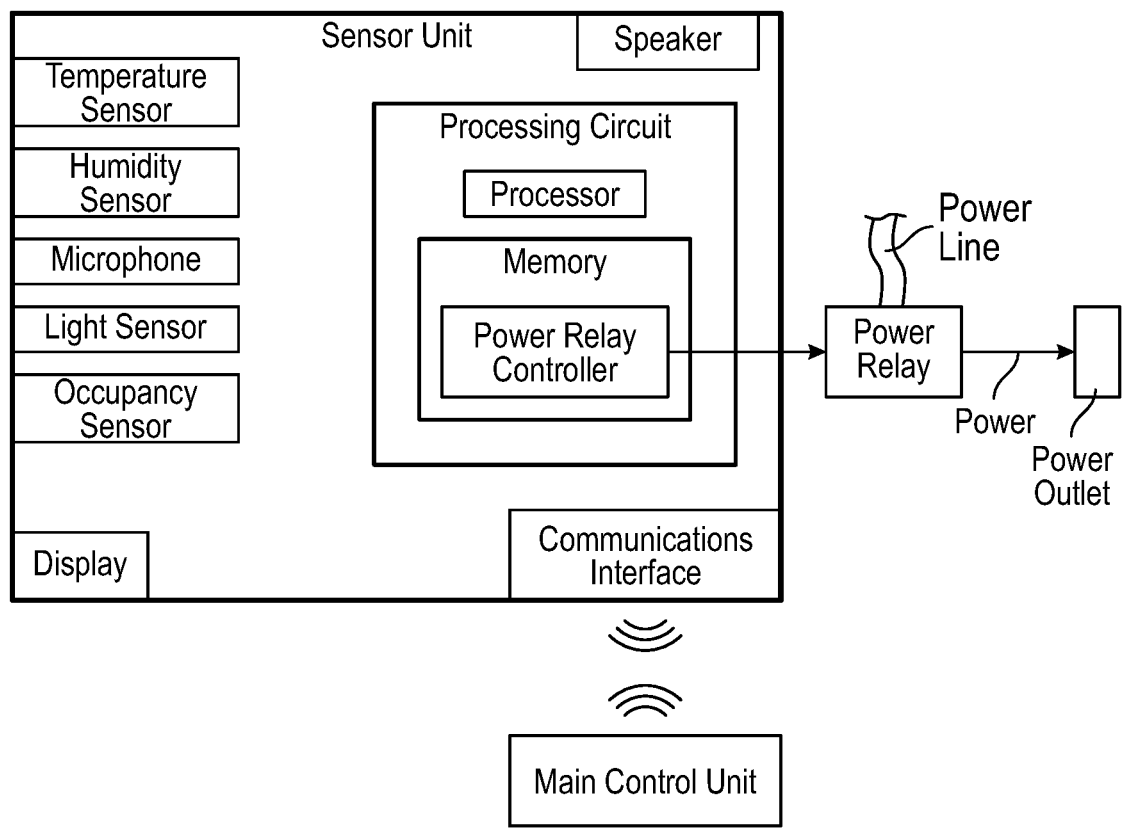
FIG. 7H is a block diagram illustrating the sensor unit of FIG. 7B in greater detail, according to some embodiments.

Referring now to FIG. 7H, a block diagram illustrating the sensor unit in greater detail is shown. The sensor unit is shown to include a variety of sensors including, for example, a temperature sensor, a humidity sensor, a microphone, a light sensor, and an occupancy sensor. However, it should be understood that the particular sensors shown in FIG. 7H are not limiting and that the sensor unit may include any type of sensor in addition to those specifically shown. For example, the sensor unit may include an air quality sensor, an oxygen sensor, a carbon monoxide sensor, a smoke sensor, a camera, a water leakage sensor, an accelerometer, an infrared sensor, a pressure sensor, a motion sensor, and/or any other type of sensor which may be used to sense a variable state or condition within a room or zone of a home or building.

The sensor unit is shown to include a display. In some embodiments, the display is an electronic ink display (e.g., electronic paper). In other embodiments, the display may use any other display technology such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display is a touch-sensitive display (e.g., a touchscreen). In some embodiments, the sensor unit includes a speaker configured to provide audio output to a user.

The sensor unit is shown to include a communications interface and a processing circuit. In an illustrative embodiment, the communications interface of the sensor unit is configured to communicate data with a communications interface of a main control unit. The communications interface may include wired or wireless interfaces (e.g., jacks, antennas, transmitters, receivers, transceivers, wire terminals, etc.) for conducting data communications with various systems, devices, or networks. For example, the communications interface may include an Ethernet card and port for sending and receiving data via an Ethernet-based communications network and/or a WiFi transceiver for communicating via a wireless communications network. The communications interface may be configured to communicate via local area networks or wide area networks (e.g., the Internet, a building WAN, etc.) and may use a variety of communications protocols (e.g., BACnet, IP, LON, Zigbee, Bluetooth, etc.). The sensor unit may use the communications interface to communicate with the main control unit, other sensor units, mobile devices within the home, a home network, or other systems or devices.

The processing circuit is shown to include a processor and memory. The processor may be a general purpose or specific purpose processor, an application specific integrated circuit (ASIC), one or more field programmable gate arrays (FPGAs), a group of processing components, or other suitable processing components. The processor may be configured to execute computer code or instructions stored in memory or received from other computer readable media (e.g., CDROM, network storage, a remote server, etc.). The memory may include one or more devices (e.g., memory units, memory devices, storage devices, etc.) for storing data and/or computer code for completing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities and information structures described in the present disclosure. The memory may be communicably connected to the processor via the processing circuit and may include computer code for executing (e.g., by the processor) one or more processes described herein.

The sensor unit is shown to include a power relay controller. The power relay controller may be configured to operate a power relay which controls the power supply to a power outlet, room lighting, or other powered systems or devices. The power relay controller may operate the power relay based on voice commands detected at the microphone of the sensor unit, control signals received from the main control unit via the communications interface, an occupancy signal from the occupancy sensor, a predetermined power schedule stored in memory, and/or any other criteria which may be used to control power to a connected system or device. In some embodiments, the power relay is installed in the same electrical gang box as the sensor unit, as shown in FIGS. 7C-7D. Advantageously, this allows each sensor unit to operate a local power relay without requiring input from the main control unit.

Figure 8:
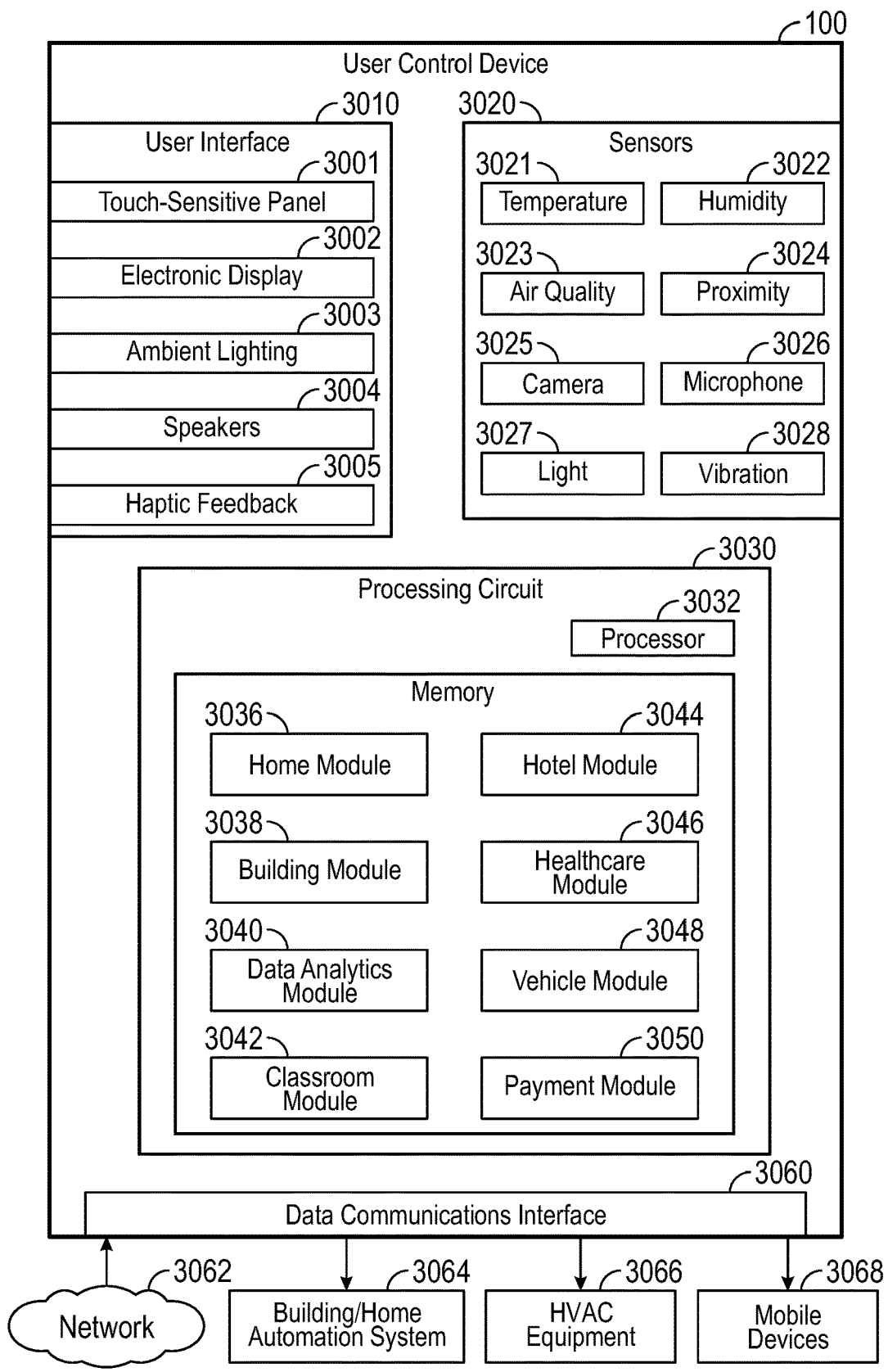
FIG. 8 is a block diagram illustrating the user control device in greater detail, according to some embodiments.

Referring now to FIG. 8, a block diagram illustrating user control device 100 in greater detail is shown, according to some embodiments. User control device 100 is shown to include a variety of user interface devices 3010 and sensors 3020. User interface devices 3010 may be configured to receive input from a user and provide output to a user in various forms. For example, user interface devices 3010 are shown to include a touch-sensitive panel 3001, an electronic display 3002, ambient lighting 3003, speakers 3004, and haptic feedback 3005. In some embodiments, user interface devices 3010 include a microphone configured to receive voice commands from a user, a keyboard or buttons, switches, dials, or any other user-operable input devices. It is contemplated that user interface devices 3010 may include any type of device configured to receive input from a user and/or provide an output to a user in any of a variety of forms (e.g., touch, text, video, graphics, audio, vibration, etc.).

Sensors 3020 may be configured to measure a variable state or condition of the environment in which user control device 100 is installed. For example, sensors 3020 are shown to include a temperature sensor 3021, a humidity sensor 3022, an air quality sensor 3023, a proximity sensor 3024, a camera 3025, a microphone 3026, a light sensor 3027, and a vibration sensor 3028. Air quality sensor 3023 may be configured to measure any of a variety of air quality variables such as oxygen level, carbon dioxide level, carbon monoxide level, allergens, pollutants, smoke, etc. Proximity sensor 3024 may include one or more sensors configured to detect the presence of people or devices proximate to user control device 100. For example, proximity sensor 3024 may include a near-field communications (NFC) sensor, a radio frequency identification (RFID) sensor, a Bluetooth sensor, a capacitive proximity sensor, a biometric sensor, or any other sensor configured to detect the presence of a person or device. Camera 3025 may include a visible light camera, a motion detector camera, an infrared camera, an ultraviolet camera, an optical sensor, or any other type of camera. Light sensor 3027 may be configured to measure ambient light levels. Vibration sensor 3028 may be configured to measure vibrations from earthquakes or other seismic activity at the location of user control device 100.

Still referring to FIG. 8, user control device 100 is shown to include a data communications interface 3060 and a processing circuit 3030. Data communications interface 3060 may include wired or wireless interfaces (e.g., jacks, antennas, transmitters, receivers, transceivers, wire terminals, etc.) for conducting data communications with various systems, devices, or networks. For example, data communications interface 3060 may include an Ethernet card and port for sending and receiving data via an Ethernet-based communications network and/or a WiFi transceiver for communicating via a wireless communications network. Data communications interface 3060 may be configured to communicate via local area networks or wide area networks (e.g., the Internet, a building WAN, etc.) and may use a variety of communications protocols (e.g., BACnet, IP, LON, etc.).

Data communications interface 3060 may include a network interface configured to facilitate electronic data communications between user control device 100 and various external systems or devices (e.g., a communications network 3062, a building automation system (BAS) or home automation system 3064, HVAC equipment 3066, mobile devices 3068, etc.). For example, user control device 100 may receive information from building/home automation system 3064 or HVAC equipment 3066 indicating one or more measured states of the controlled building (e.g., temperature, humidity, electric loads, etc.) and one or more states of the HVAC equipment 3066 (e.g., equipment status, power consumption, equipment availability, etc.). Data communications interface 3060 may receive inputs from building/home automation system 3064 or HVAC equipment 3066 and may provide operating parameters (e.g., on/off decisions, set points, etc.) to building/home automation system 3064 or HVAC equipment 3066. The operating parameters may cause building/home automation system 3064 to activate, deactivate, or adjust a set point for various types of home equipment or building equipment in communication with user control device 100.

Processing circuit 3030 is shown to include a processor 3032 and memory 3034. Processor 3032 may be a general purpose or specific purpose processor, an application specific integrated circuit (ASIC), one or more field programmable gate arrays (FPGAs), a group of processing components, or other suitable processing components. Processor 3032 may be configured to execute computer code or instructions stored in memory 3034 or received from other computer readable media (e.g., CDROM, network storage, a remote server, etc.).

Memory 3034 may include one or more devices (e.g., memory units, memory devices, storage devices, etc.) for storing data and/or computer code for completing and/or facilitating the various processes described in the present disclosure. Memory 3034 may include random access memory (RAM), read-only memory (ROM), hard drive storage, temporary storage, non-volatile memory, flash memory, optical memory, or any other suitable memory for storing software objects and/or computer instructions. Memory 3034 may include database components, object code components, script components, or any other type of information structure for supporting the various activities and information structures described in the present disclosure. Memory 3034 may be communicably connected to processor 3032 via processing circuit 3030 and may include computer code for executing (e.g., by processor 3032) one or more processes described herein. For example, memory 3034 is shown to include a home module 3036, a building module 3038, a data analytics module 3040, a classroom module 3042, a hotel module 3044, a healthcare module 3046, a vehicle module 3048, and a payment module 3050. The functions of each of these modules is described in greater detail below.

Home Control Features

Figure 9A:
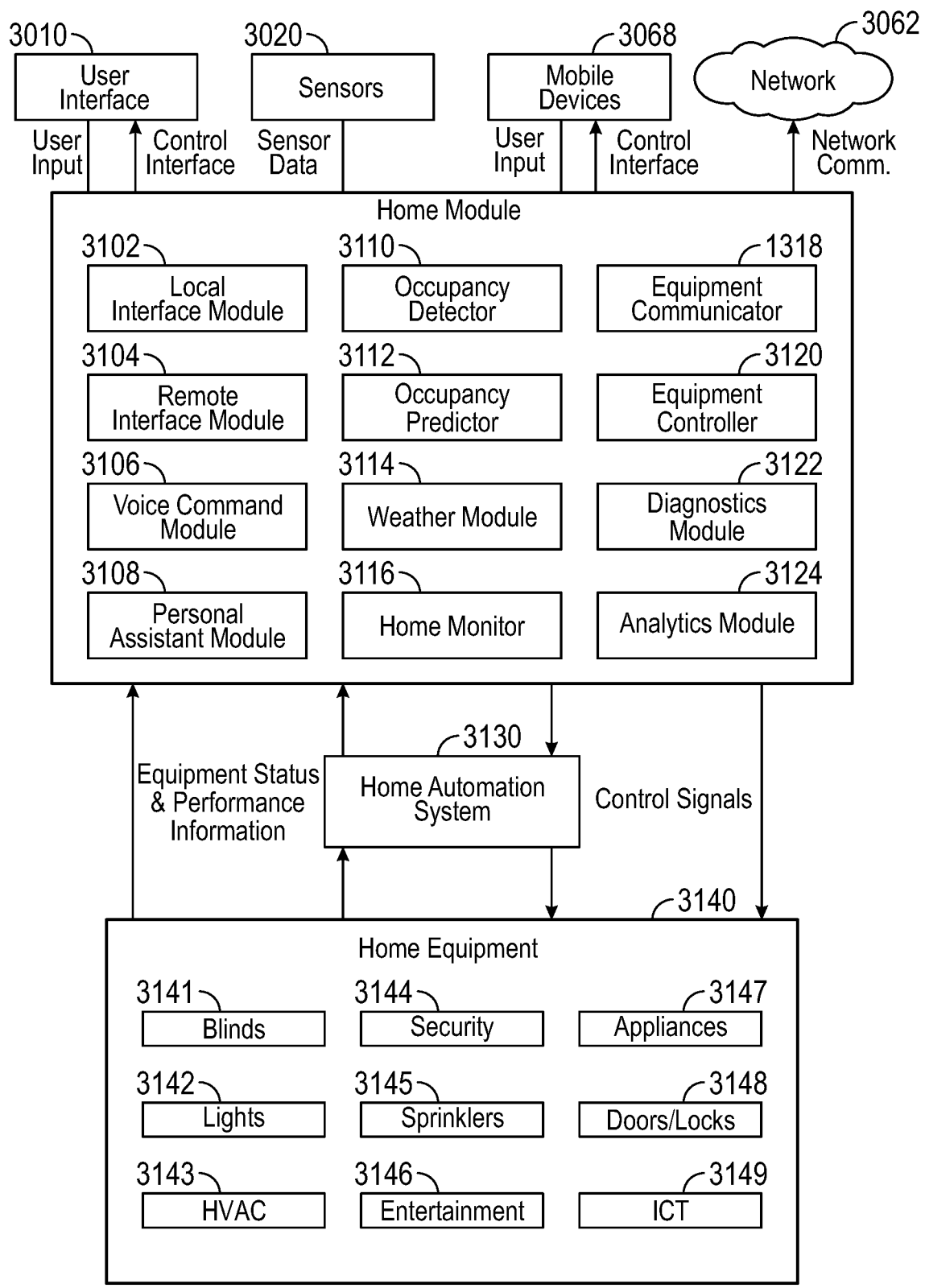
FIG. 9A is a block diagram illustrating a home module of the user control device in greater detail, according to some embodiments.

Referring now to FIG. 9, a block diagram illustrating home module 3036 in greater detail is shown, according to some embodiments. Home module 3036 may be configured to function as a central control hub for a home automation system 3130. Home module 3036 may present various monitoring and control interfaces via user interface 3010 and/or mobile devices 3068 and may receive user input via user interface 3010 and/or mobile devices 3068. Home module 3036 may receive sensor data from sensors 3020 and may engage in network communications via network 3062 (e.g., a LAN, WAN, the Internet, etc.).

Home module 3036 may communicate with home equipment 3040 (e.g., directly or via home automation system 3130) and may receive equipment status and performance information from the home equipment. For example, home module 3036 may receive equipment status and performance information for blinds 3141, lights 3142, HVAC equipment 3143, security equipment 3144, sprinklers 3145, entertainment equipment 3146, appliances 3147, doors/locks 3148, information and communications technology (ICT) equipment 3149, or any other type of equipment which may be installed in a home or used as part of a home automation system. Home module 3036 may use the equipment status and performance information in combination with other types of input (e.g., input from user interface 3010, sensors 3020, mobile devices 3068, network 3062, etc.) to generate control signals for home equipment 3140. Home module may provide the control signals to home equipment 3140 (e.g., directly or via home automation system 3130).

Still referring to FIG. 9, home module 3036 is shown to include a local interface module 3102, a remote interface module 3104, a voice command module 3106, a personal assistant module 3108, an occupancy detector 3110, an occupancy predictor 3112, a weather module 3114, a home monitor 3116, an equipment communicator 3118, an equipment controller 3120, a diagnostics module 3122, and an analytics module 3124. Each of these components of home module 3036 is described in greater detail below.

Local interface module 3102 may be configured to generate a variety of monitoring and control interfaces and present such interfaces via user interface 3010. Local interface module 3102 may receive input from user interface 3010 and use such input to generate control signals for home or building equipment. For example, local interface module 3102 may receive user-specified set points (e.g., temperature set points, energy consumption set points, humidity set points, etc.) via user interface 3010. Local interface module 3102 may use the set points to generate control signals for home or building equipment. An exemplary process which may be performed by local interface module 3102 is described in greater detail with reference to FIGS. 10A-10B.

Remote interface module 3104 may be configured to generate a variety of monitoring and control interfaces and present such interfaces via a remote user interface. For example, remote interface module 3104 may generate a monitoring and control interface for presentation to a user via mobile devices 3068 (e.g., a user's phone or tablet). Remote interface module 3104 may receive input from the user via mobile devices 3068 and use such input to generate control signals for home or building equipment. For example, remote interface module 3104 may receive user-specified set points (e.g., temperature set points, energy consumption set points, humidity set points, etc.) from mobile devices 3068. Remote interface module 3104 may use the set points to generate control signals for home or building equipment. An exemplary process which may be performed by remote interface module 3104 is described in greater detail with reference to FIGS. 11A-11B.

Still referring to FIG. 9, home module 3036 is shown to include a voice command module 3106 and a personal assistant module 3108. Voice command module 3106 may be configured to receive voice commands from a user via microphone 3026 and perform actions indicated by the voice commands. Voice command module 3106 may interpret the voice commands to determine a requested action indicated by the voice commands. For example, a user may request a set point adjustment by speaking the voice command "set temperature to 72 degrees." Voice command module 3106 may determine that the voice command is requesting a temperature adjustment and may automatically change the current temperature set point to the value specified by the voice command.

In some embodiments, voice command module 3106 is configured to listen for a trigger phrase (e.g., a device name, a wake-up phrase, etc.). The trigger phrase may be customizable and can be set to whatever phrase a user desires. Upon hearing the trigger phrase, voice command module 3106 may listen for a voice command. Voice commands may include changes to set points controlled by user control device 100 or other types of data recordation. For example, a voice command may include a request to add an item to a grocery list, a request to turn on lights in a particular room, a request to lock all exterior doors, or a request to perform any other type of action which can be performed or controlled by user control device 100. Voice command module 3106 may interact with personal assistant module 3108 to provide voice-based services.

Personal assistant module 3108 may be configured to assist a user with a variety of tasks and activities. For example, personal assistant module 3108 may be configured to provide information, answer questions, play music, read the news, check sports scores and the weather, and perform other personal assistant tasks. In some embodiments, personal assistant module 3108 listens for a trigger phrase (e.g., "Hey Glass Stat") and detects a spoken command or request after the trigger phrase. In some embodiments, personal assistant module 3108 provides an output via user interface 3010 in response to hearing the trigger phrase to indicate to a user that the trigger phrase was detected. For example, personal assistant module 3108 may illuminate a portion of electronic display 3002, illuminate ambient lighting 3003, play a sound from speakers 3004, etc. In some embodiments, personal assistant module 3108 receives a command or request from a user as a text input via user interface 3010 or via mobile devices 3068.

Personal assistant module 3108 may be configured to interact with home automation system 3130 and/or home equipment 3140 to perform various actions in response to a user command. For example, personal assistant module 3108 may interact with entertainment equipment 3146 to play music in response to a user request (e.g., "Play 'Classic Rock' station on Pandora"). As another example, personal assistant module 3108 may interact with lights 3142 to turn on or off lighting or may interact with doors/locks 3148 to lock or unlock doors in response to a user request (e.g., "Turn off the lights in my bedroom," "Lock all exterior doors," etc.).

Still referring to FIG. 9, home module 3036 is shown to include an occupancy detector 3110 and an occupancy predictor 3112. Occupancy detector 3110 may be configured to determine the occupancy of a room or space based on information from sensors 3020, user interface 3010, mobile devices 3068, network 3062, and/or home equipment 3140. For example, occupancy detector 3110 may use inputs from sensors 3020 to detect heat signatures, motion, sounds, or other indicia of human occupancy. Occupancy detector 3110 may detect separate objects and distinguish between humans and other objects. Occupancy predictor 3112 may process calendar and scheduling data to predict future occupancy of the home, room, or space.

Determining the occupancy of a home allows user control device 100 to make energy efficient operating decisions by reducing conditioning and power consumption when a home is unoccupied. User comfort may be increased when user control device 100 is able to anticipate occupancy and condition the home to user preferences by the time the home is occupied. Occupancy-based operation and control of an HVAC system allows user control device 100 to conserve energy and allow users arrive home to a comfortable environment without requiring any programming effort on the part of the user. Several occupancy-based control functions which may be performed by user control device 100 are described in greater detail with reference to FIGS. 17A-17B, and FIGS. 26A-29.

Still referring to FIG. 9, home module 3036 is shown to include a weather module 3115. Weather module 3114 may be configured to receive weather information and/or weather forecasts from a weather service via network 3062. Weather module 3114 may alert a user when a weather watch or warning concerning a weather phenomenon (e.g., storm, hail, tornado, hurricane, blizzard, etc.). Weather module 3114 may control user interface 3010 to automatically display weather warnings and important news. In some embodiments, weather module 3114 causes user control device 100 to illuminate ambient lighting 3003 to indicate important weather-related news and warnings. Weather module 3114 may cause ambient lighting 3003 to illuminate a first color (e.g., yellow) to indicate relatively less important information (e.g., possible rain today) and a second color (e.g., red) to indicate important weather alerts (e.g., tornado detected). In some embodiments, weather module 3114 causes electronic display 3002 to display directions to the basement in the event of a tornado.

Weather module 3114 may use advanced weather reports (e.g., a weekly weather report) to proactively prepare for upcoming weather changes. For example, weather module 3114 may automatically adjust the operating schedule for sprinklers 3145 to delay sprinkler operation if rain is predicted in the near future. As another example, weather module 3114 may preemptively begin heating or cooling a building zone if a temperature change is predicted in the near future. Exemplary weather-based control functions which may be performed by user control device 100 are described in greater detail with reference to FIGS. 18A-18B.

Still referring to FIG. 9, home module 3036 is shown to include a home monitor 3116. Home monitor 3116 may monitor conditions within a home or other building using information from sensors 3020, user interface 3010, mobile devices 3068, network 3062, and/or home equipment 3140. For example, home monitor 3116 may use data from integrated sensors 3020 within user control device 100 to determine the current temperature, humidity, air quality, lighting, or other attribute of the building zone or other space in which user control device 100 is installed. Home monitor 3116 may use data from remote sensors to determine the current value of a variable state or condition monitored by the remote sensors (e.g., temperature of a remote building zone, humidity within a wall, etc.).

Home monitor 3116 may use information from mobile devices 3068 and/or sensors 3020 to determine the current occupancy of the home or other building. For example, home monitor 3116 may determine whether a mobile device associated with a particular user (e.g., a user's phone) is detected on the home network. If the mobile device is detected, home monitor 3116 may determine that the user is currently in the home or building. In some embodiments, home monitor 3116 interacts with occupancy detector 3110 to determine the current occupancy of the home or building. Home monitor 3116 may check to ensure that all of the expected occupants are home at the end of the day and that other home conditions are as expected. For example, home monitor 3116 may use information from home equipment 3140 and/or home automation system 3130 to determine whether all doors are locked, whether the garage door is closed, whether lights are off, whether blinds are down, and whether all occupants are home at the end of the day.

In some embodiments, home monitor 3116 interacts with home equipment 3140 and/or home automation system 3130 to determine the current status of home equipment 3140. For example, home monitor 3116 may determine whether blinds 3141 are open or closed, whether lights 3142 are on or off, whether HVAC equipment 3143 is active or inactive, and a current operating state for HVAC equipment 3243 (e.g., heating, cooling, inactive, etc.). Home monitor 3116 may determine a current state of security equipment 3144 (e.g., armed, alarm detected, not armed, etc.), a current state of sprinklers 3145, a current state of entertainment equipment 3146 (e.g., equipment on/off, playing music from speakers, AV receiver tuned to input C, etc.), and a current state of appliances 3147 (e.g., refrigerator temperature, refrigerator cooling active or inactive, oven temperature, dish washer active or inactive, etc.). Home monitor 3116 may determine a current state of doors/locks 3148 (e.g., front door locked/unlocked, front door open/closed, garage door open/closed, etc.) and a current state of ICT equipment 3149 (e.g., router connected to WAN, Internet connection active/inactive, telephone systems online/offline, etc.).

Home monitor 3116 may report home conditions via user interface 3010 and/or to mobile devices 3068. Advantageously, this allows a user to monitor home conditions regardless of whether the user is physically present in the home. For example, a user can connect to user control device 100 via a mobile device (e.g., the user's phone, a vehicle system, etc.) while the user is away from home or on vacation to monitor home conditions and ensure that home equipment 3140 is operating as intended. Exemplary home monitoring functions which may be performed by user control device 100 are described in greater detail with reference to FIGS. 13A-13B and 20A-20B.

In an illustrative embodiment, the home monitor 3116 (and/or any other suitable module such as the user control device 100) can control home equipment 3140 and HVAC equipment based on one or more sensors. For example, a user control device 100 can be used to maintain a temperature in a house. If it is summer and an occupancy sensor detects that nobody is in the house, the user control device 100 can cause the blinds in the house to block out the sun, thereby reducing the amount of heat in the house. If it is summer and the occupancy sensor detects that a person is in the kitchen, the user control device 100 can open the blinds, thereby allowing the user to see out of the windows and enjoy the sun. Similarly, a user may wish for the blinds of a bedroom to be closed at night. However, if it is determined that nobody is occupying the bedroom, it is daytime, and the bedroom temperature is below a threshold, the user control device 100 can open the blinds, allowing the sun to heat up the bedroom, thereby reducing the amount of energy consumed by the HVAC system. In alternative embodiments, lights in a room can similarly be turned on or off (or dimmed) based on occupancy to reduce the use of the HVAC system.

Still referring to FIG. 9, home module 3036 is shown to include an equipment communicator 3118 and an equipment controller 3120. Most commercial thermostats available to consumers are only capable of unidirectional communication (i.e., switching on or off connected equipment). Advantageously, equipment communicator 3118 is capable of bidirectional communication with connected equipment in the system. For example, equipment communicator 3118 may be configured to engage in bidirectional communications with home equipment 3140 and/or home automation system 3130.

One advantage of the bidirectional communications conducted by equipment communicator 3118 is that home module 3036 may receive equipment status and performance information from home equipment 3140 (e.g., directly or via home automation system 3140). The equipment status and performance information may be used for various purposes such as home monitoring, fault detection, diagnostics, data analytics, and reporting to external systems and devices. For example, equipment communicator 3118 may provide the equipment status and performance information to analytics module 3124 to calculate metrics such as assumed load and current energy consumption. Equipment communicator 3118 may provide the equipment status to home monitor 3116 and/or personal assistant module 3108 for use in equipment monitoring and status reporting. Equipment communicator 3118 may provide the equipment status to diagnostics module 3122 for use in performing system or equipment diagnostics.

In some embodiments, home module 3036 collects data from home equipment 3140 and/or home automation system 3130 and stores such information within memory 3034 or in remote data storage. In some embodiments, home module 3036 initially stores data in local memory 3034 and exports such data to network storage periodically. For example, home module 3036 may store a predetermined amount or duration of equipment performance data (e.g., 72 hours of operating data) in local memory 3034 and backup the stored data to remote (e.g., cloud or network) storage at the end of a predetermined interval (e.g., at the end of each 72-hour interval).

Equipment controller 3120 may be configured to generate control signals for home equipment 3140 and/or home automation system 3130 based on the information received at home module 3036. In some embodiments, equipment controller 3120 generates control signals to achieve a set point specified by a user or automatically determined by equipment controller 3120. Equipment controller 3120 may be configured to use any of a variety of control methodologies to generate the control signals. For example, equipment controller 3120 may use basic on/off control, proportional control, proportional-integral (PI) control, proportional-integral-derivative (PID) control, model predictive control (MPC), extremum-seeking control (ESC), or any other control methodology.

In some embodiments, equipment controller 3120 is configured to perform an optimization process to optimize the performance of home equipment 3140. The optimization process may use a predicted heating or cooling load and/or predicted utility rates as inputs to an optimization routine. Equipment controller 3120 may use the load and rate predictions to determine an optimal set of control actions for home equipment 3140. In some embodiments, the optimization process performed by equipment controller 3120 is a cascaded optimization process, as described in U.S. patent application Ser. No. 14/634,609 filed Feb. 27, 2015, the entire disclosure of which is incorporated by reference herein. For example, equipment controller 3118 may include a high level optimization module and a low level optimization module.

The high level optimization module may control an outer loop of the cascaded optimization (e.g., a subplant level loop, a subsystem level loop, etc.). The high level optimization module may determine an optimal distribution of energy loads across home equipment 3140 for each time step in the optimization period in order to optimize (e.g., minimize) the cost of energy consumed by home equipment 3140. In some embodiments, the optimal load distribution is based on measurements and availability information received from building subsystems 428.

The low level optimization module may control an inner (e.g., equipment level) loop of the cascaded optimization. The low level optimization module may determine how to best run each type or category of home equipment 3140 at the load set points determined by the high level optimization module. For example, the low level optimization module may determine on/off states and/or operating set points for various devices of home equipment 3140 in order to optimize (e.g., minimize) the energy consumption of each subsystem while meeting the energy load set point for the subsystem. The on/off decisions and/or operating set points may be provided to home automation system 3130 for use in controlling home equipment 3140. Several exemplary equipment control processes which may be performed by equipment controller 3120 are described in greater detail with reference to FIGS. 15A-15B, FIGS. 20A-20B, and FIGS. 21A-21B.

Still referring to FIG. 9, home module 3036 is shown to include a diagnostics module 3122 and an analytics module 3124. Diagnostics module 3122 may be configured to use performance data from home equipment 3140 to perform various diagnostics. In some embodiments, diagnostics module 3122 tracks the performance of home equipment 3140 over time and detects when the performance crosses a predetermined threshold (e.g., energy efficiency below a threshold value, energy consumption above a threshold value, etc.). Diagnostics module 3122 may be configured to detect faults in home equipment 3140 and may diagnose the root causes of such faults. Diagnostics module 3122 may diagnose a component of home equipment 3140 in need of repair or replacement as a result of the diagnostics. In some embodiments, diagnostics module 3122 is configured to initiate a process for ordering a replacement component or schedule a service appointment to repair or replace a faulty component of home equipment 3140. An exemplary process which may be performed by diagnostics module 3122 is described in greater detail with reference to FIGS. 14A-14B.

Analytics module 3124 may be configured to perform various analytics using information from sensors 3020, user interface 3010, mobile devices 3068, network 3062, and/or home equipment 3140. For example, analytics module 3124 may use utility rates from a utility provider in combination with weather forecasts from a weather service and/or performance information from HVAC equipment to generate a utility bill forecast. In some embodiments, analytics module 3124 receives energy consumption data from home equipment 3140 and receives energy consumption data for similar homes or buildings from a remote system. Analytics module 3124 may compare the energy consumption data from home equipment 3140 to the energy consumption of the similar homes or buildings. Analytics module 3124 may present the comparative data via user interface 3010 and/or provide the comparative data to mobile devices 3068.

In some embodiments, analytics module 3124 aggregates data collected by sensors 3020 and provides the data to an external data analytics service. The external data analytics service may perform data analytics and provide results of the analytics to user control device 100. In other embodiments, analytics module 3124 performs the data analytics locally within user control device 100. In some embodiments, analytics module 3124 provides the data to an external entity such as a utility provider, an insurance company, an advertising service, or any other remote system or device. In some embodiments, analytics module 3124 monetizes the data by selling the data to such external entities. For example, analytics module 3124 may provide water leakage information, smoke detection information, or other measured data to an insurance company to allow the insurance company to better understand the source of damage to an insured property. In some embodiments, analytics module 3124 provides accelerometer data to an earthquake monitoring service to provide enhanced earthquake detection and location. An exemplary process which may be performed by analytics module 3124 is described in greater detail with reference to FIGS. 16A-16B.

Figure 9B:
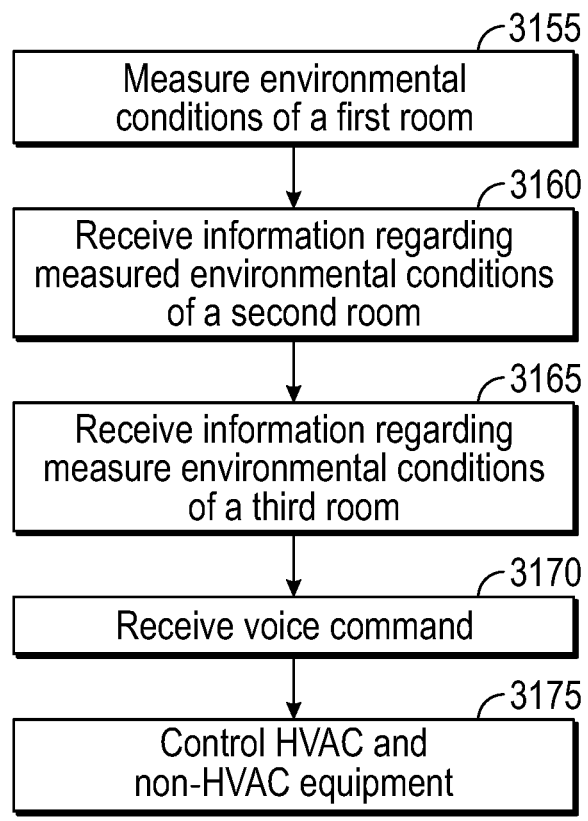
FIG. 9B is a flow diagram of a home control method, according to some embodiments.

Referring now to FIG. 9B, a flow diagram of a home control method is shown, according to some embodiments. In alternative embodiments, additional, fewer, and/or different operations can be performed. The use of a flow diagram and/or arrows is not meant to be limiting with respect to the order or flow of information. For example, in some embodiments, two or more of the operations may be performed simultaneously. In an illustrative embodiment, the method shown in FIG. 9B can be performed by a central control hub and/or a thermostat, such as the user control device 100.

In an operation 3155, environmental conditions of a first room are measured by a sensor unit. In an illustrative embodiment, the user control device 100 measures the environmental conditions of the first room. For example, the user control device 100 can include one or more sensors integrated into the housing of the user control device 100. In alternative embodiments, the environmental conditions of the first room are measured by a sensor remote from the user control device 100, and an indication of the environmental conditions are transmitted to the user control device 100. The measured environmental conditions can be any suitable environmental conditions such as temperature, humidity, occupancy, etc.

In an operation 3160, information regarding measured environmental conditions of a second room are received. In an illustrative embodiment, the measured environmental conditions of the second room are received by the user control device 100. For example, the environmental conditions of the second room can be measured by a remote sensor. The remote sensor can transmit the information regarding the measured environmental conditions of the second room. In an illustrative embodiment, the information regarding the measured environmental conditions can include an indication of the environmental conditions, such as a temperature, a humidity level, whether a room is occupied, etc.

In an operation 3165, information regarding measured environmental conditions of a third room are received. In an illustrative embodiment, the measured environmental conditions of the third room are received by the user control device 100. For example, the environmental conditions of the third room can be measured by a remote sensor. The remote sensor can be a different remote sensor than the remote sensor that transmitted the information of the operation 3160. The remote sensor can transmit the information regarding the measured environmental conditions of the third room. In an illustrative embodiment, the information regarding the measured environmental conditions can include an indication of the environmental conditions, such as a temperature, a humidity level, whether a room is occupied, etc. In some embodiments, the operation 3165 may not be performed.

In an operation 3170, a voice command is received. In an illustrative embodiment, the voice command is received from a remote sensor such as a microphone module. In an illustrative embodiment, the sensor with a microphone senses audio from a voice and transmits an indication of the sensed audio (e.g., an audio data stream or file) to the user control device 100. In an alternative embodiment, the sensor with a microphone detects audio from a voice and deciphers a command from the audio. The sensor transmits the deciphered command to the user control device 100. In an alternative embodiment, the operation 3170 may not be performed.

In an operation 3175, both HVAC equipment and non-HVAC equipment is controlled by the user control device 100. In an illustrative embodiment, the HVAC equipment and the non-HVAC equipment is controlled based on the information regarding the environmental conditions of the first and second rooms. In an illustrative embodiment, the equipment is controlled to maintain or alter the environmental conditions of the first and second rooms independently. For example, if the temperature of the first room is below the setpoint for the first room, the HVAC equipment can be caused to increase the temperature of the first room. But if the temperature of the second room is simultaneously above the setpoint for the second room, the HVAC equipment (or the non-HVAC equipment) can be caused to lower the temperature of the second room. For example, a heater of the HVAC system can be used to increase the temperature of the first room while windows of the second room are opened to allow hot air of the second room to escape and cool air to enter the second room.

In an illustrative embodiment, the remote sensor in the second room includes an electrical outlet and a power relay that controls power to the electrical outlet. Controlling the non-HVAC equipment can include the user control device 100 transmitting a signal to the remote sensor. The remote sensor can operate the power relay to selectively apply power to or remove power from the electrical outlet based on the signal received from the user control device 100. In alternative embodiments, the non-HVAC equipment can include a security system, a sprinkler system, and/or a home entertainment system.

In embodiments in which the operation 3165 is performed, the HVAC equipment and the non-HVAC equipment is also controlled based on the environmental conditions of the third room. For example, the environmental conditions (e.g., lighting, temperature, humidity, etc.) of each of the three rooms are controlled independently from one another. For example, the user control device 100 can cause the lights of the first room to be turned on and cause the lights of the second and third rooms to be turned off. Any suitable environmental condition can be controlled via the HVAC equipment and/or the non-HVAC equipment.

In embodiments in which the operation 3170 is performed and a voice or other audio command is received, the HVAC equipment and the non-HVAC equipment may also be controlled based on the voice or other audio command. For example, a user in the second room can say, "Make it warmer in here." The remote sensor can record or detect the command and transmit the command to the user control device 100. The user control device can increase the setpoint temperature for the second room based on the received command. Accordingly, the HVAC equipment can be operated to increase the temperature of the second room. In some embodiments, non-HVAC equipment is operated to increase the temperature of the second room, such as by opening window blinds to increase the amount of sunlight entering into the second room.

In another example, non-HVAC equipment such as a music system may be controlled by the user control device 100 according to received voice commands. In still another example, the user in the second room can say, "Turn on the lights." In such an embodiment, the remote sensor in the second room can record the command and transmit the command to the user control device 100. The user control device 100 can, in response to receiving the command, cause the lights of the second room to be turned on.

Exemplary Control Processes

Figure 10A:
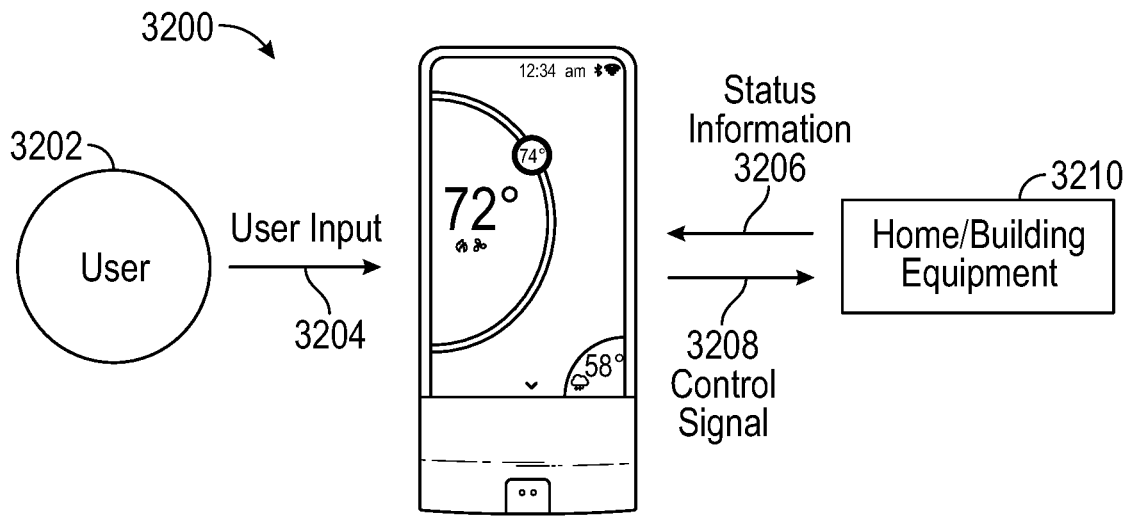
FIGS. 10A-10B are flow diagrams illustrating operations for monitoring and controlling connected equipment via a local interface of the user control device, according to some embodiments.
Figure 10B:
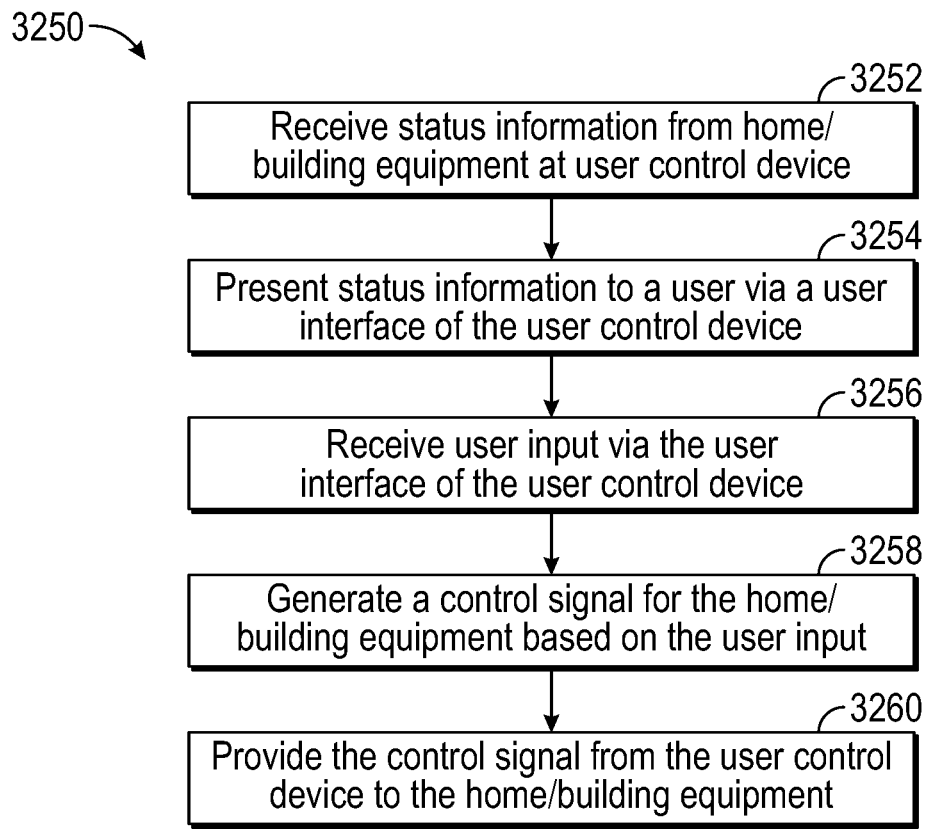

Referring now to FIGS. 10A-10B, a flow diagram 3200 and flowchart 3250 illustrating a control process which may be performed by local interface module 3102 are shown, according to some embodiments. User control device 100 is shown receiving status information 3206 from home/building equipment 3210 (step 3252). User control device 100 may present status information 3206 to a user 3202 via a local user interface 3010 (step 3254). User control device 100 may receive user input 3204 via the local user interface 3010 (step 3256). User control device 100 may use the user input 3204 in combination with status information 3206 to generate a control signal 3208 for home/building equipment 3210 (step 3258). User control device 100 may then provide the control signal 3208 to home/building equipment 3210 (step 3260).

Figure 11A:
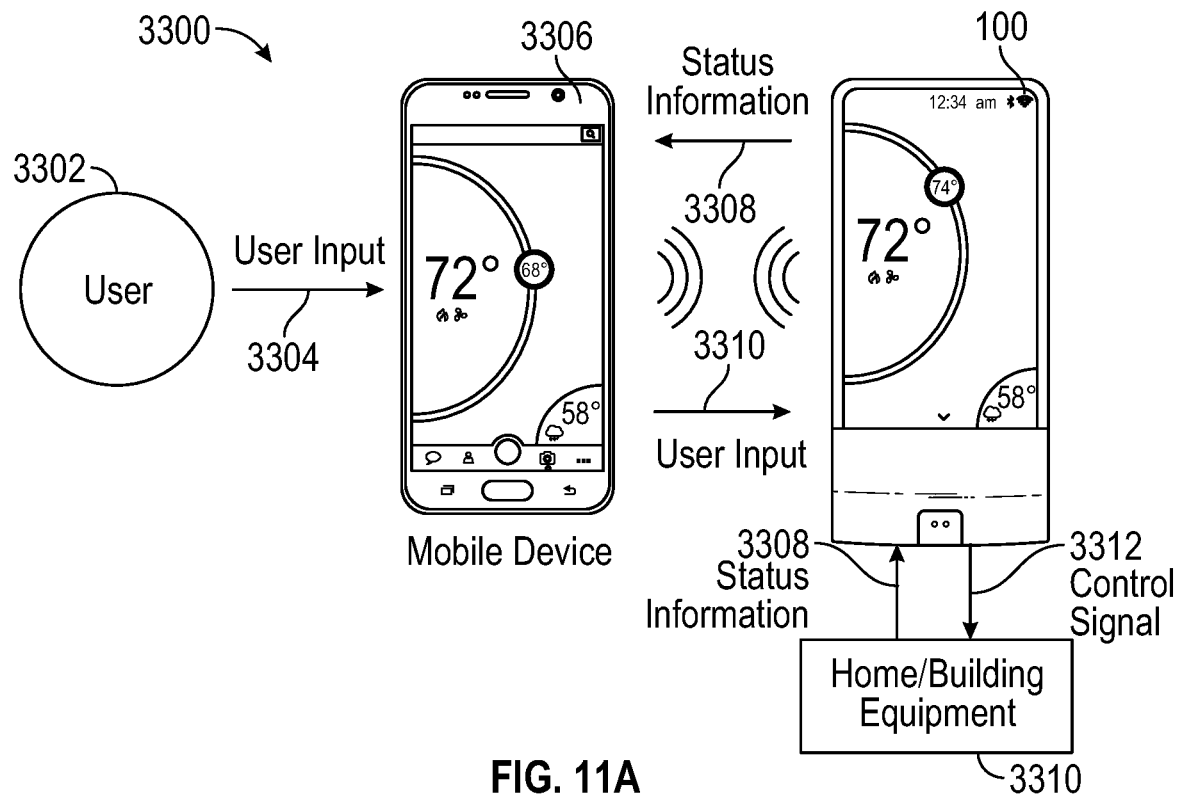
FIGS. 11A-11B are flow diagrams illustrating operations for monitoring and controlling connected equipment via a remote interface presented on a mobile device, according to some embodiments.
Figure 11B:
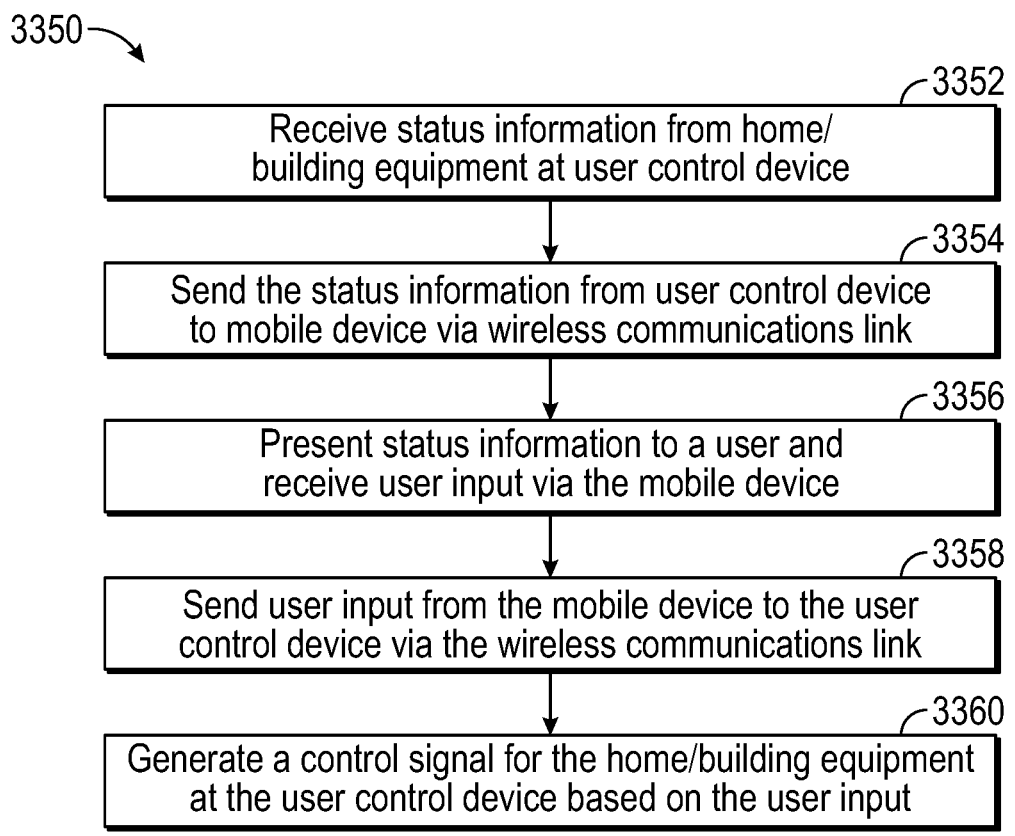

Referring now to FIGS. 11A-11B, a flow diagram 3300 and flowchart 3350 illustrating a control process which may be performed by remote interface module 3104 are shown, according to some embodiments. User control device 100 may receive status information 3308 from home/building equipment 3310 (step 3252). User control device 100 may send the status information 3308 to a mobile device 3306 via a wireless communications link (step 3354). Mobile device 3306 presents the status information 3308 to a user 3302 and receives user input 3304 from user 3302 (step 3356). Mobile device 3306 sends the user input 3304 to user control device 100 via the wireless communications link (step 3358). User control device 100 may use the user input 3304 in combination with status information 3308 and/or other measured variables to generate a control signal 3312 for home/building equipment 3310 (step 3260).

Figure 12A:
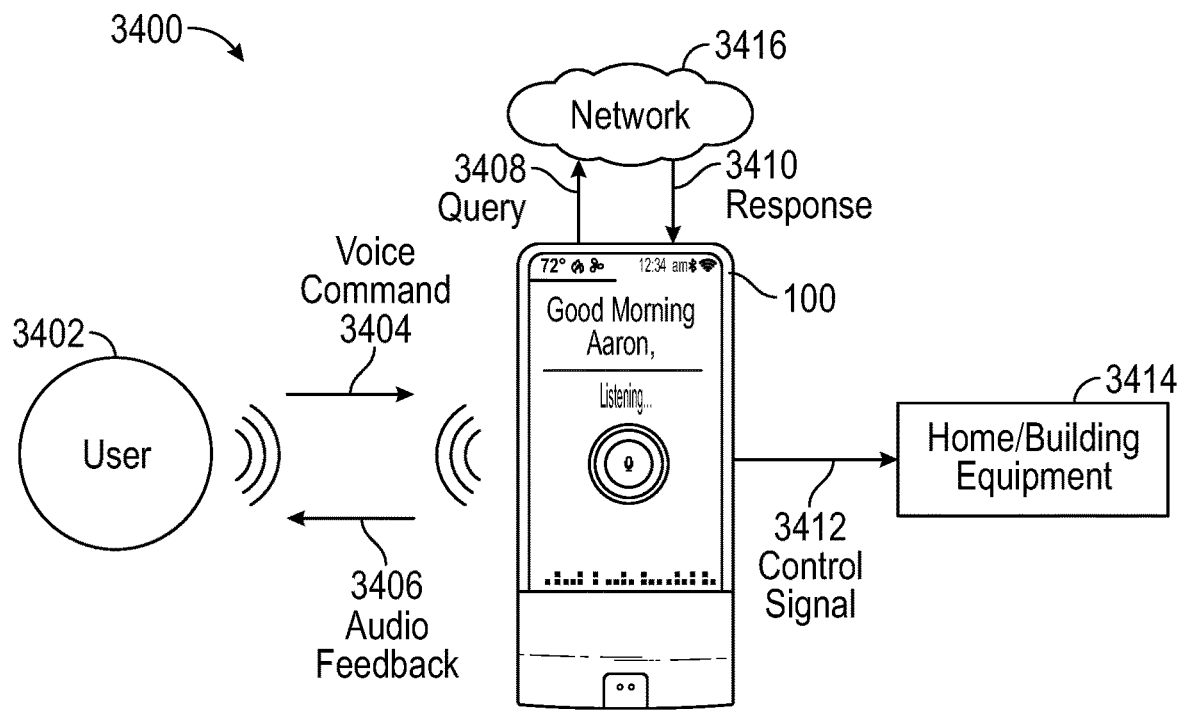
FIGS. 12A-12B are flow diagrams illustrating operations for receiving and handling voice commands at the user control device, according to some embodiments.
Figure 12B:
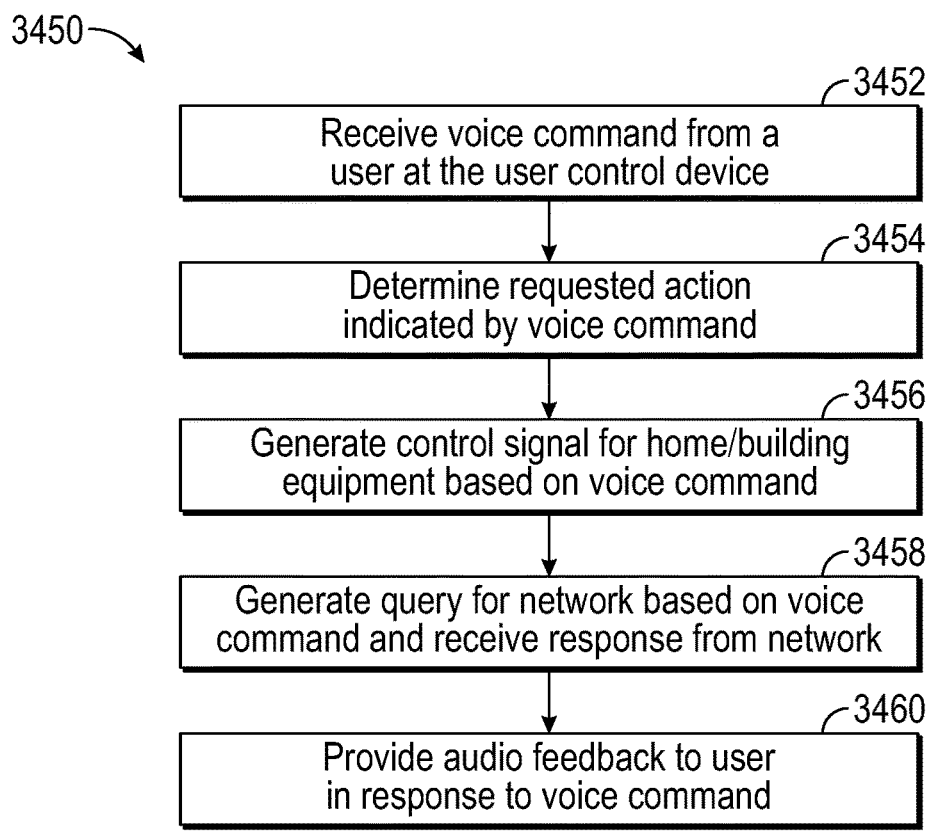

Referring now to FIGS. 12A-12B, a flow diagram 3400 and flowchart 3450 illustrating a control process which may be performed by voice command module 3106 and/or personal assistant module 3108 are shown, according to some embodiments. User control device 100 may receive a voice command 3404 from a user 3402 (step 3452). User control device 100 may determine a requested action indicated by the voice command (step 3454). In some instances, the requested action may require an adjustment to a set point or control signal provided by user control device 100 (e.g., "Set temperature to 72 degrees"). User control device 100 may generate a control signal 3412 for home/building equipment 3414 based on the voice command (step 3456).

In some instances, the requested action may require user control device 100 to receive information from a network service 3416 (e.g., an information service, a weather service, a traffic service, a news service, a calendar service, etc.) in response to a user request for such information (e.g., "Is it going to rain today?," "How's traffic this morning?," etc.). User control device 100 may generate a query 3408 for the network 3416 based on the voice command and may receive a response 3410 from the network 3416 (step 3458). User control device 100 may provide an audio feedback 3406 in response to the voice command (step 3460). The audio feedback may indicate that the requested action has been performed and/or may provide an answer to a question from user 3402.

Figure 13A:
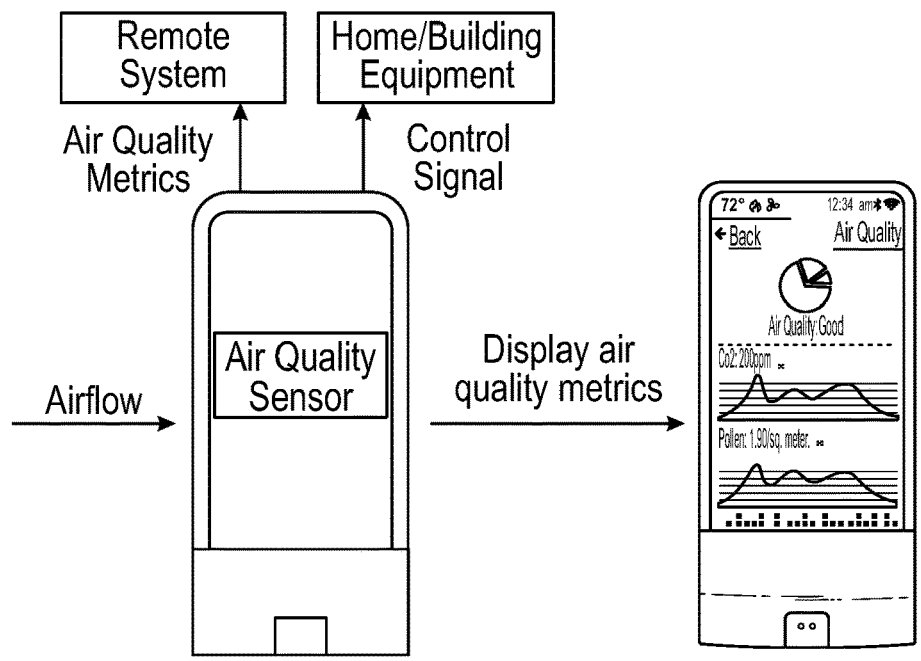
FIGS. 13A-13B are flow diagrams illustrating operations for measuring and reporting air quality metrics and adjusting system operation based on the air quality metrics, according to some embodiments.
Figure 13B:
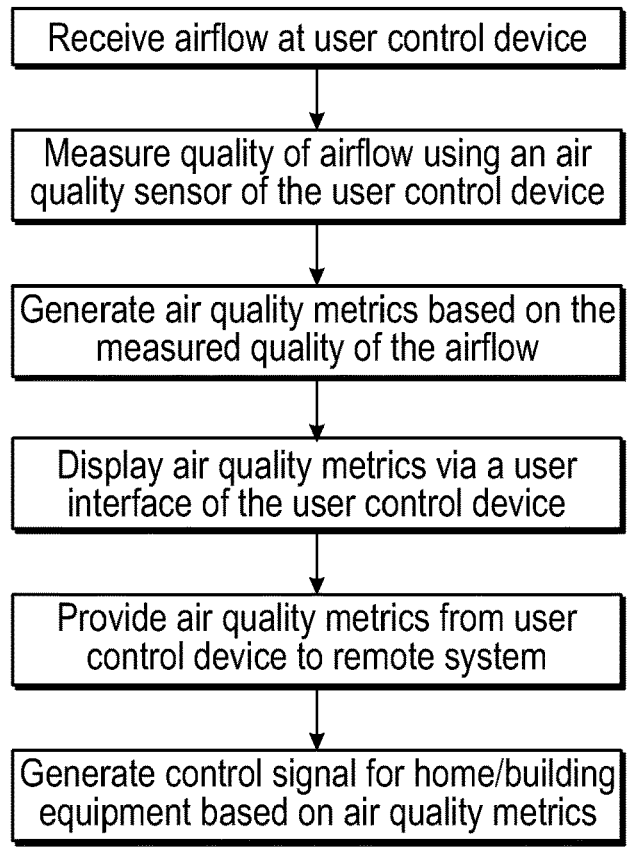

Referring now to FIGS. 13A-13B, a flow diagram 3500 and flowchart 3550 illustrating a control process which may be performed by home monitor 3116 are shown, according to some embodiments. User control device 100 may receive airflow 3502 (step 3552) and may measure a quality of airflow 3502 using an air quality sensor 3023 (step 3554). User control device 100 may generate air quality metrics based on the measured quality of airflow 3502 (step 3556). User control device 100 may display the air quality metrics 3504 via a user interface 3010 of user control device 100 (step 3558) and/or provide the air quality metrics 3506 to a remote system (step 3560). In some embodiments, user control device 100 uses the air quality metrics to generate a control signal 3508 for building equipment 3512 (step 3562). For example, if the air quality metrics indicate that the airflow 3502 has a low oxygen content (e.g., below a predetermined threshold) or a high carbon dioxide content (e.g., above a predetermined threshold), user control device 100 may generate a control signal 3508 which increases the volume of fresh airflow to the building space.

Figure 14A:
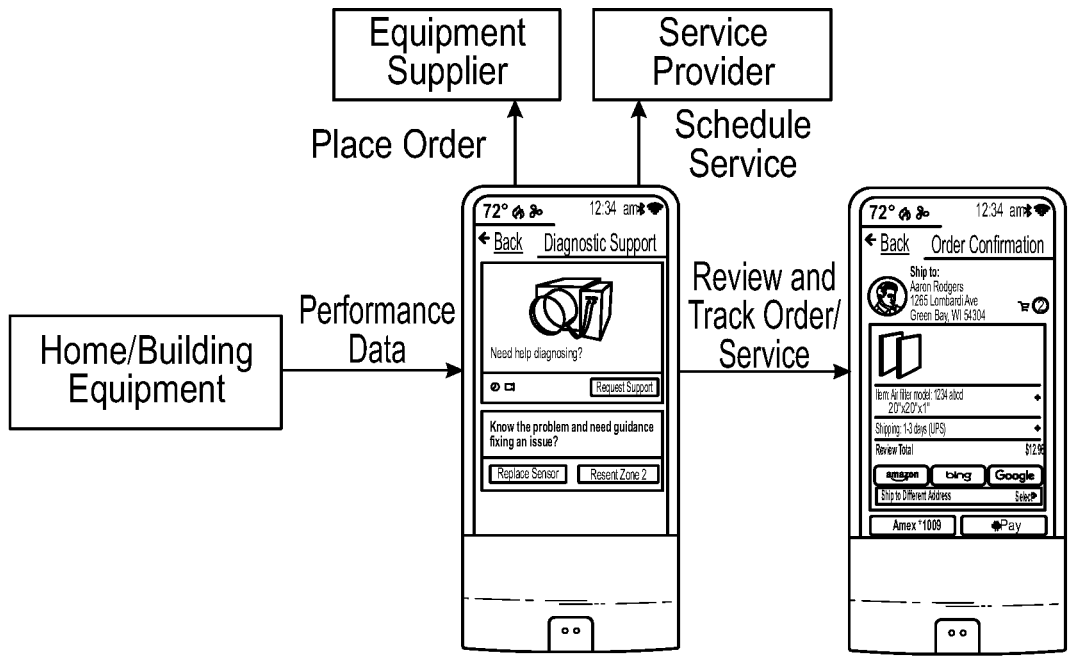
FIGS. 14A-14B are flow diagrams illustrating operations for performing diagnostics based on performance data received from home/building equipment and automatically scheduling service or ordering replacement parts based on the diagnostics, according to some embodiments.
Figure 14B:
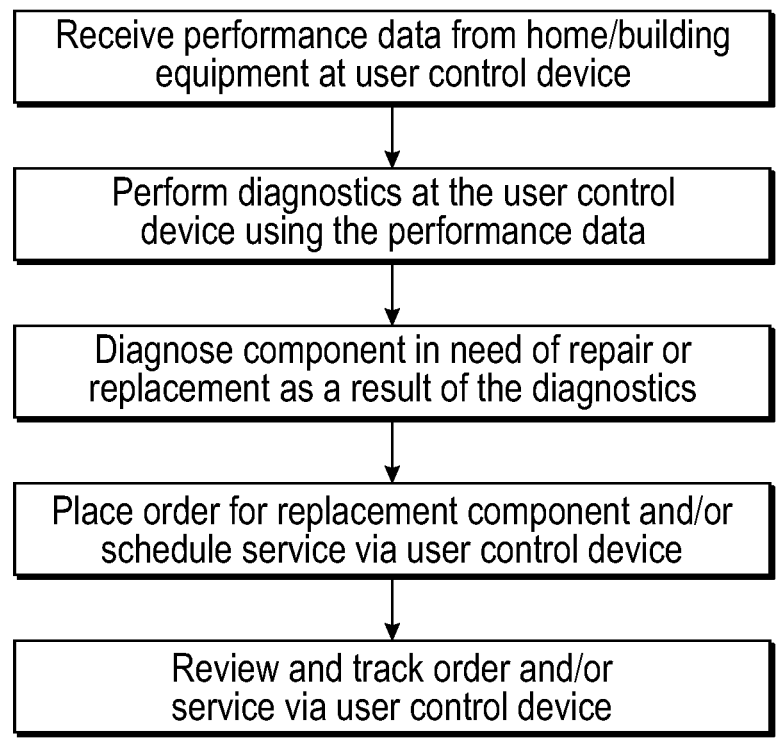

Referring now to FIGS. 14A-14B, a flow diagram 3600 and flowchart 3650 illustrating a control process which may be performed by equipment communicator 3118 and/or diagnostics module 3122 are shown, according to some embodiments. User control device 100 may receive performance data 3604 from home/building equipment 3602 (step 3652). User control device 100 may perform diagnostics based on the performance data (step 3654) and diagnose a component of home/building equipment 3602 in need of repair or replacement as a result of the diagnostics (step 3656). User control device 100 may generate an interface which allows a user to place an order 3606 for a replacement component with an equipment supplier 3608 or schedule service 3610 with a service provider 3612 (step 3658). In some embodiments, the order 3606 and/or service 3610 is purchased automatically without requiring user action. User control device 100 may generate an interface which allows a user to review and track the order or service 3614 (step 3660).

Figure 15A:
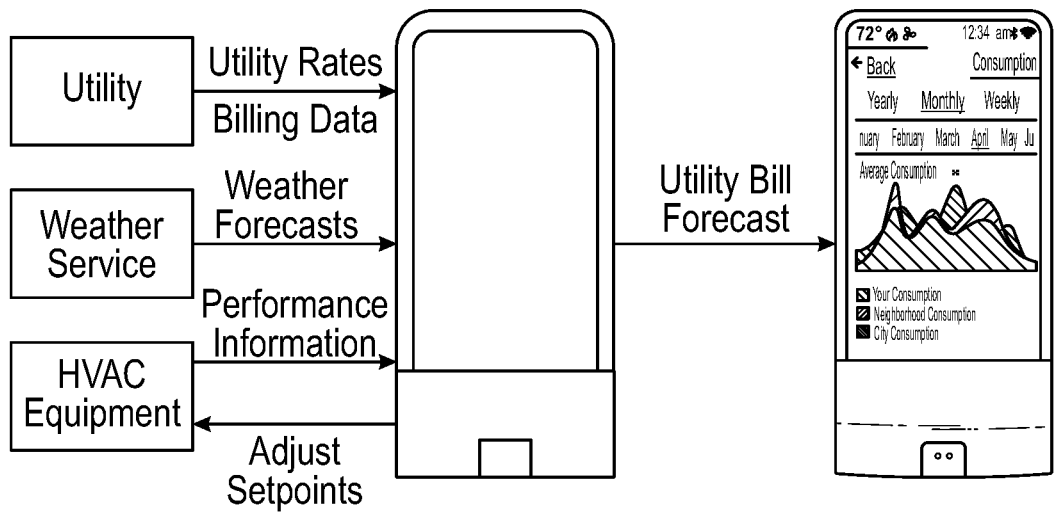
FIGS. 15A-15B are flow diagrams illustrating operations for using utility rate information, weather forecasts, and performance information from HVAC equipment to forecast an energy bill and adjust system operation based on the energy bill forecast, according to some embodiments.
Figure 15B:
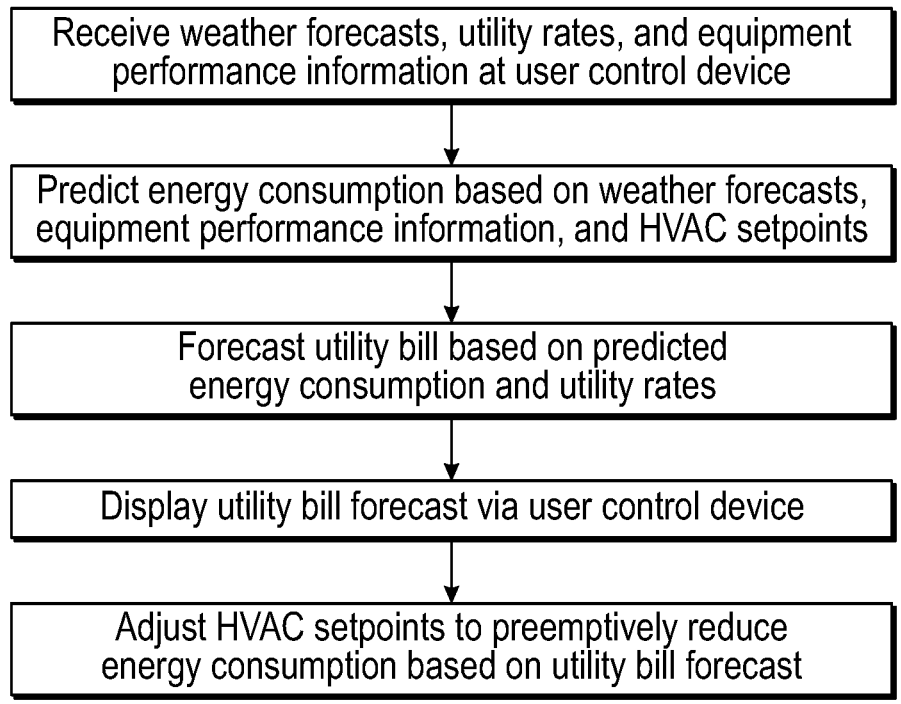

Referring now to FIGS. 15A-15B, a flow diagram 3700 and flowchart 3750 illustrating a control process which may be performed by equipment communicator 3118 and/or analytics module 3124 are shown, according to some embodiments. User control device 100 may receive weather forecasts 3708 from a weather service 3706, utility rates 3704 from a utility provider 3702, and equipment performance information 3712 from HVAC equipment 3710 (step 3752). User control device 100 may predict energy consumption based on the weather forecasts 3708, equipment performance information 3712 and/or HVAC set points (step 3754). User control device 100 may forecast a utility bill based on the predicted energy consumption and the utility rates 3704 (step 3756). In some embodiments, user control device 100 displays a utility bill forecast 3716 via a user interface 3010 of user control device 100 (step 3758). In some embodiments, user control device 100 adjusts HVAC set points 3714 to preemptively reduce energy consumption and/or energy cost based on the utility bill forecast 3716 (step 3760).

Figure 16A:
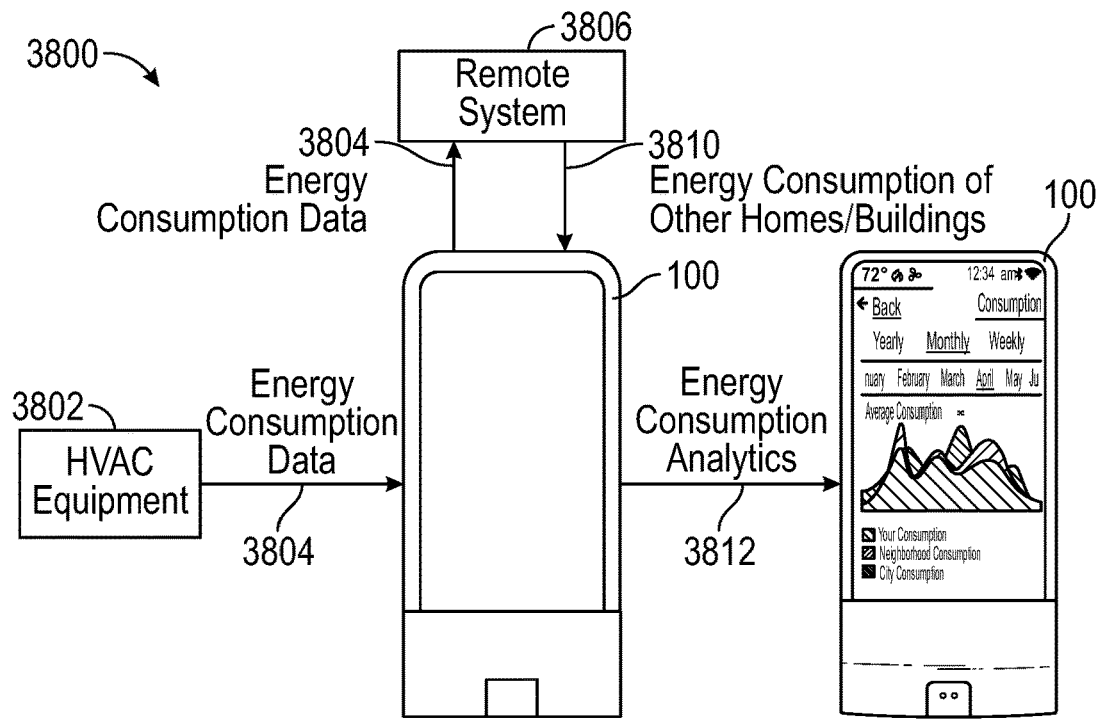
FIGS. 16A-16B are flow diagrams illustrating operations for comparing energy consumption data from local HVAC equipment to energy consumption data from other homes/buildings and generating energy consumption analytics based on the comparison, according to some embodiments.
Figure 16B:
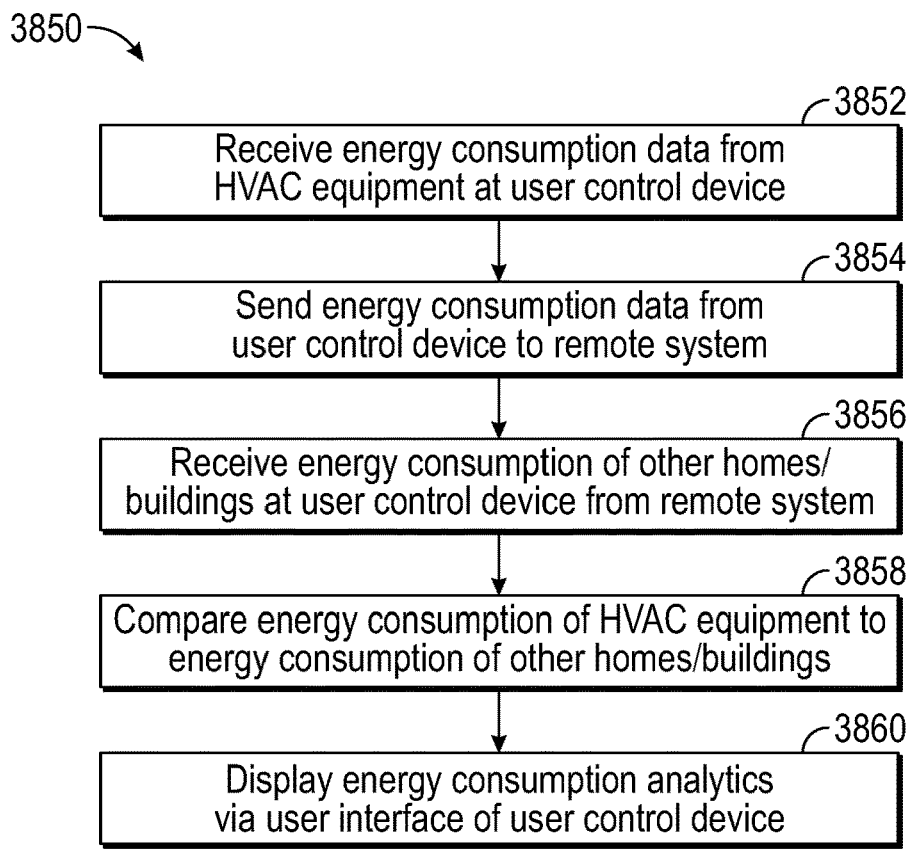

Referring now to FIGS. 16A-16B, a flow diagram 3800 and flowchart 3850 illustrating a control process which may be performed by equipment communicator 3118 and/or analytics module 3124 are shown, according to some embodiments. User control device 100 may receive energy consumption data 3804 from HVAC equipment 3802 (step 3852). User control device 100 may send energy consumption data 3804 to a remote system 3806 (step 3854) and may receive the energy consumption of other similar homes/buildings 3810 from the remote system 3806 (step 3856). User control device 100 may compare the energy consumption 3804 of HVAC equipment 3802 to the energy consumption 3810 of other homes/buildings (step 3858). User control device 100 may generate energy consumption analytics 3812 based on the comparison and may present the energy consumption analytics via a user interface 3010 of user control device 100 (step 3860).

Figure 17A:
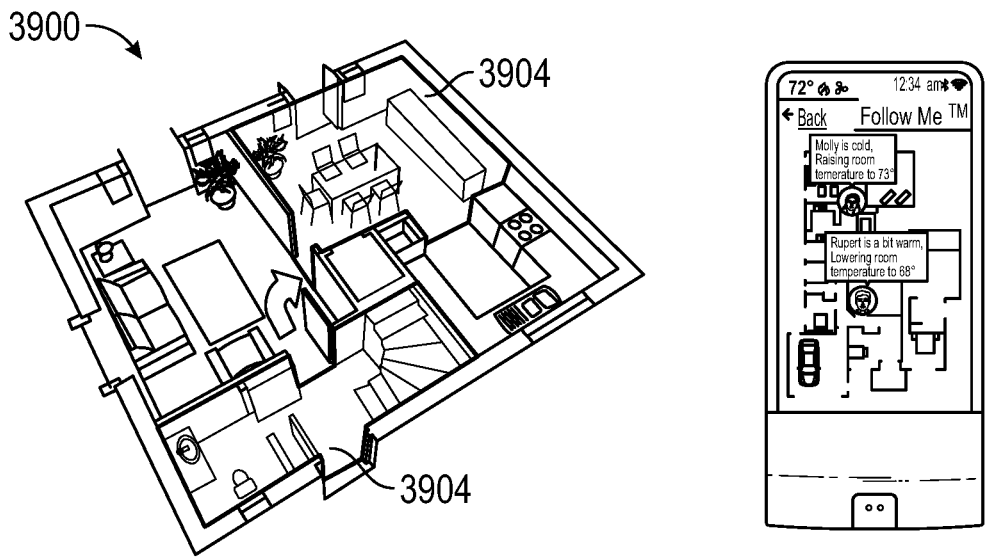
FIGS. 17A-17B are flow diagrams illustrating operations determining the occupancy of a building and adjusting system operation as a user moves between rooms or zones of the building, according to some embodiments.
Figure 17B:
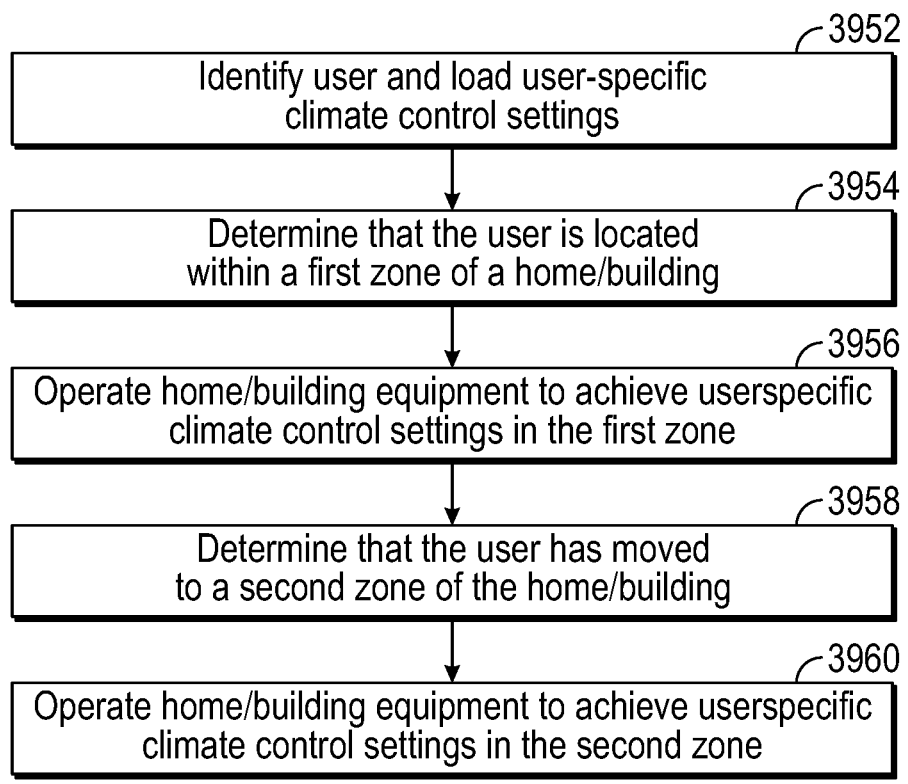

Referring now to FIGS. 17A-17B, a flow diagram 3900 and flowchart 3950 illustrating a control process which may be performed by occupancy detector 3110 and/or equipment controller 3120 are shown, according to some embodiments. User control device 100 may identify a user and load user-specific climate control settings for the identified user (step 3952). In some embodiments, user control device 100 identifies the user by communicating with a portable device carried by the user (e.g., a phone, a RFID card, a NFC tag, etc.). In other embodiments, the user is identified by voice, by appearance, or any other data collected by sensors 3120. User control device 100 may determine that the user is located within a first zone 3902 of a home or building (step 3954) and may operate home/building equipment to achieve the user-specific climate control settings in the first zone 3902 (step 3956). User control device 100 may then determine that the user has moved to a second zone 3904 of the home/building (step 3958) and may operate the home/building equipment to achieve the user-specific climate control settings in the second zone 3904 (step 3960).

Figure 18A:
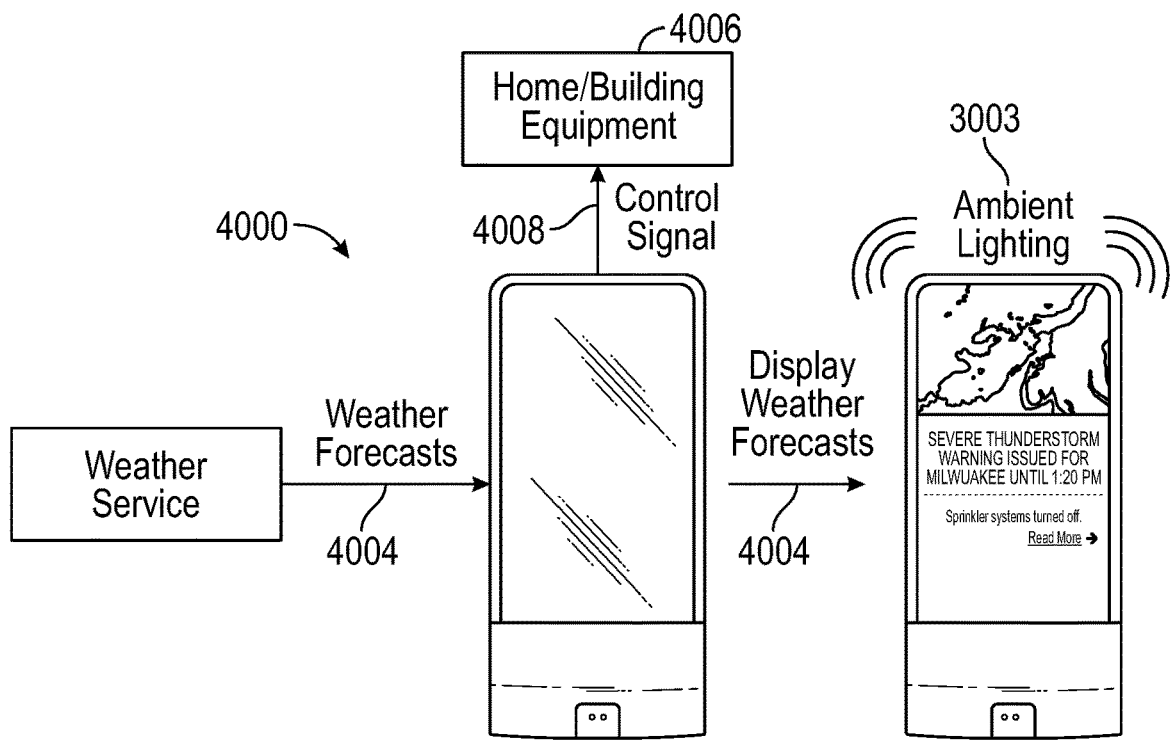
FIGS. 18A-18B are flow diagrams illustrating operations for receiving weather forecasts from a weather service, displaying the weather forecasts on the user control device, and adjusting system operation based on the weather forecasts, according to some embodiments.
Figure 18B:
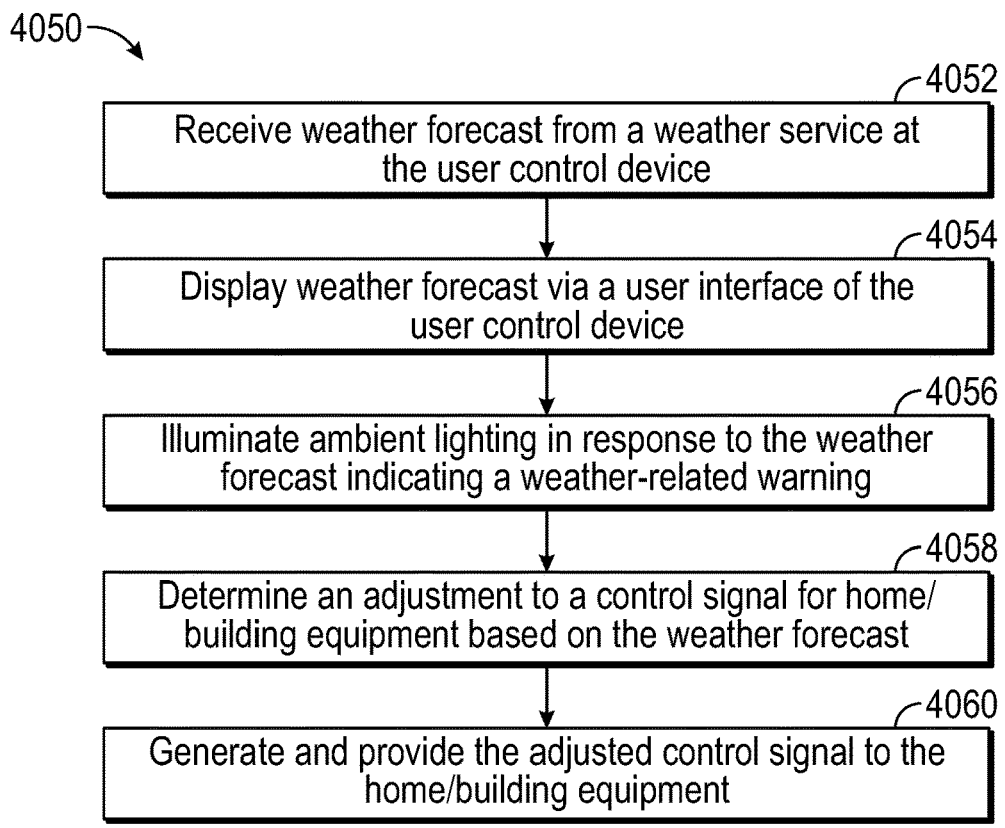

Referring now to FIGS. 18A-18B, a flow diagram 4000 and flowchart 4050 illustrating a control process which may be performed by weather module 3114 and/or equipment controller 3120 are shown, according to some embodiments. User control device may receive a weather forecast 4004 from a weather service 4002 (step 4052) and display the weather forecast 4004 via a user interface 3010 of user control device 100 (step 4054). User control device 100 may illuminate ambient lighting 3003 of user control device in response to the weather forecast 4004 indicating a weather-related warning (step 4056). User control device 100 may determine an adjustment to a control signal 4008 for home/building equipment 4006 based on the weather forecast (step 4058). User control device 100 may generate and provide an adjusted control signal 4008 to the home/building equipment 4006 (step 4060).

Figure 19A:
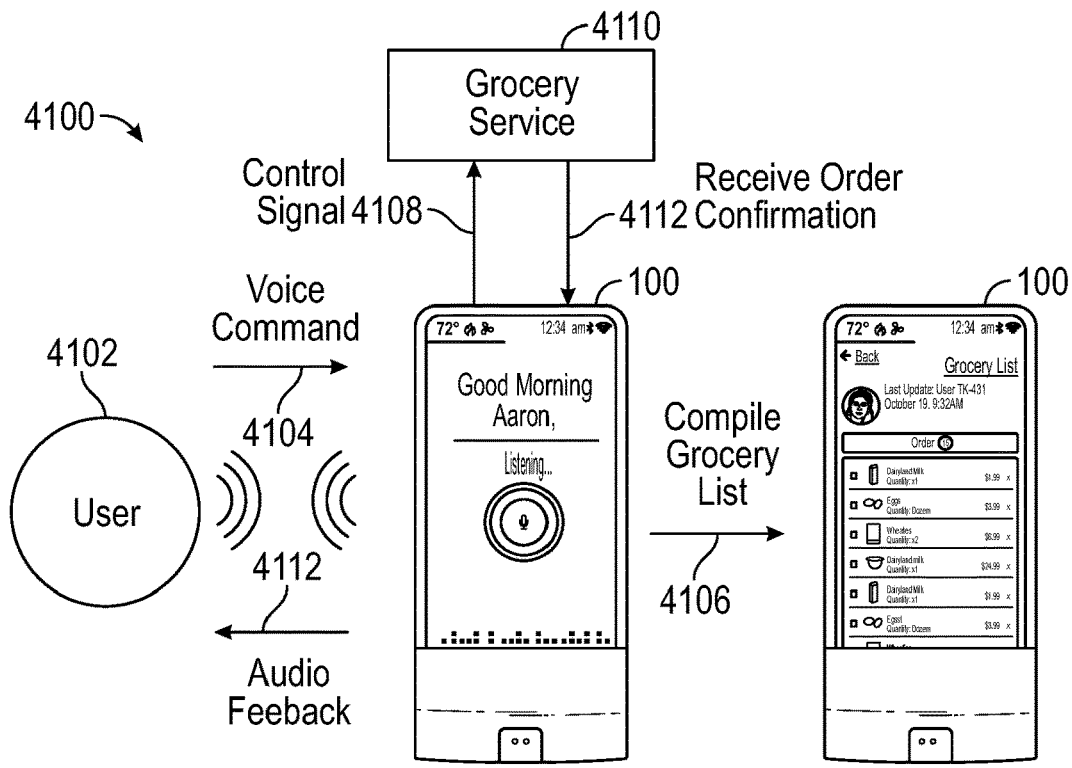
FIGS. 19A-19B are flow diagrams illustrating operations for receiving voice commands from a user and updating a grocery list based on the voice commands, according to some embodiments.
Figure 19B:
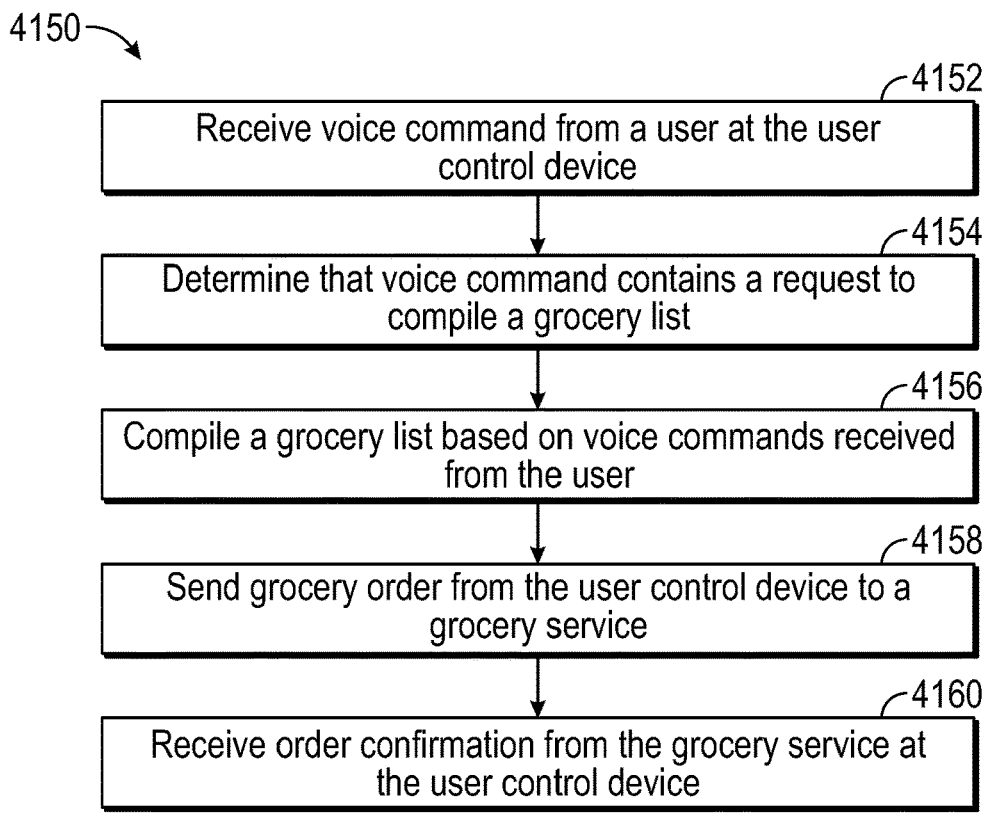

Referring now to FIGS. 19A-19B, a flow diagram 4100 and flowchart 4150 illustrating a control process which may be performed by voice command module 3106 and/or personal assistant module 3108 are shown, according to some embodiments. User control device 100 may receive a voice command 4104 from a user 4102 (step 4152) and may determine that the voice command 4104 contains a request to compile a grocery list (step 4154). User control device 100 may compile a grocery list 4106 based on the voice command 4104 received from the user 4102 (step 4156). In some embodiments, user control device is configured to send a grocery order 4108 to a grocery service 4110 (step 4158) and receive an order confirmation 4112 from the grocery service 4110 (step 4160). User control device 100 may provide an audio feedback 4112 indicating that the grocery list has been updated and/or that the grocery order has been placed.

Figure 20A:
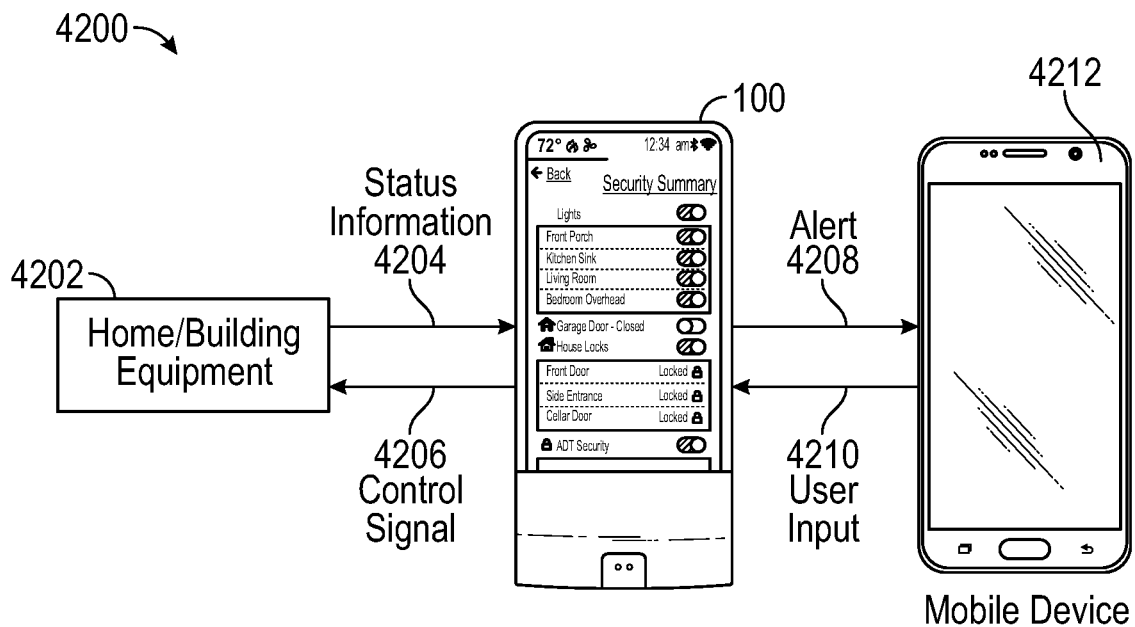
FIGS. 20A-20B are flow diagrams illustrating operations for receiving status information from home/building equipment and sending an alert to a mobile device if the status information does not match a predetermined system status, according to some embodiments.
Figure 20B:
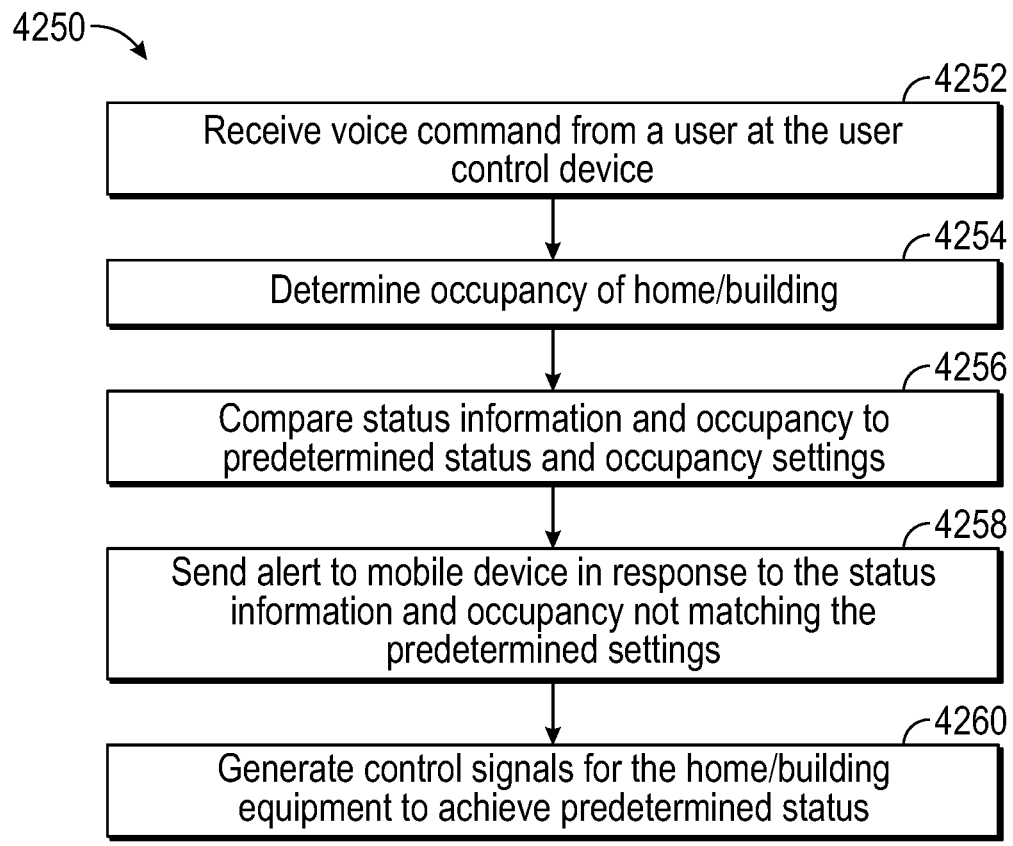

Referring now to FIGS. 20A-20B, a flow diagram 4200 and flowchart 4250 illustrating a control process which may be performed by home monitor 3116 and/or equipment controller 3120 are shown, according to some embodiments. User control device 100 may receive status information 4204 from home/building equipment 4202 (step 4252) and determine an occupancy of the home/building (step 4254). The status information 4204 may include the status of home/building equipment 4202 (e.g., blinds closed, lights off, doors locked, etc.). The occupancy of the home building may be determined based on input from an occupancy sensor and/or occupancy detector 3110.

User control device 100 may compare status information 4204 and occupancy to predetermined status and occupancy settings (step 4256). In some embodiments, the predetermined status and occupancy settings are stored in a memory of user control device and may indicate desired status and occupancy settings at a predetermined time (e.g., an end of the day). User control device 100 may determine whether the actual status information 42040 and the occupancy of the home/building match the predetermined settings and may send an alert 4208 to a mobile device 4212 in response to the status information 4204 and/or occupancy not matching the predetermined settings (step 4258). In some embodiments, user control device generates control signals 4206 for the home building equipment 4202 to achieve the predetermined status (step 4260). The control signals may be generated automatically by user control device or in response to a user input 4210 received from mobile device 4212.

Figure 21A:
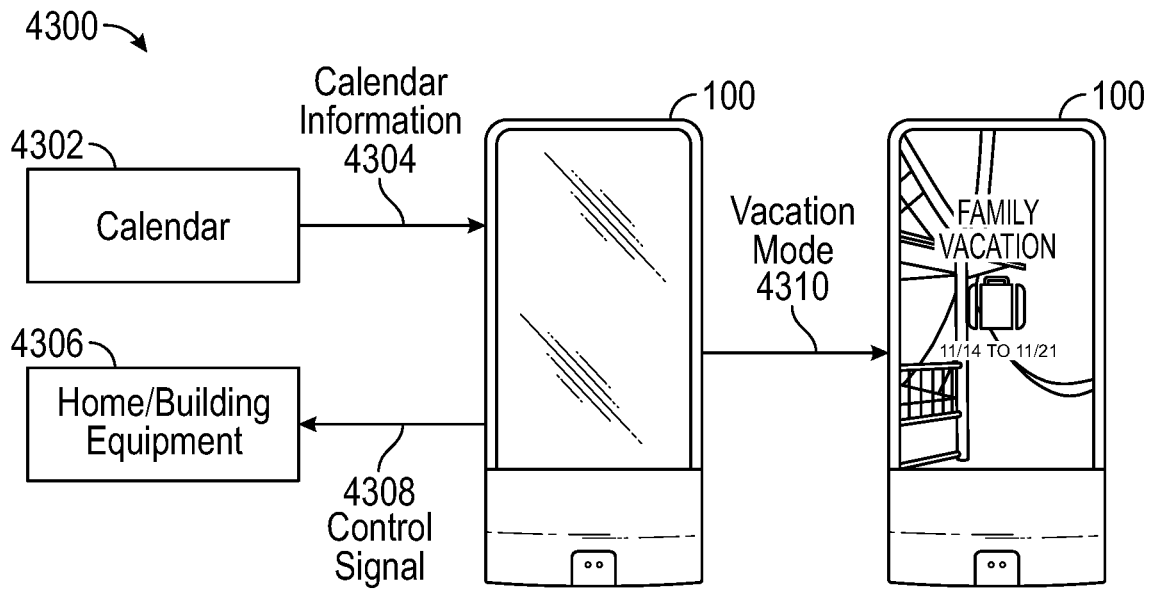
FIGS. 21A-21B illustrate a process for using calendar information to automatically detect prolonged periods of no occupancy and adjust system operation during the periods of no occupancy, according to some embodiments.
Figure 21B:
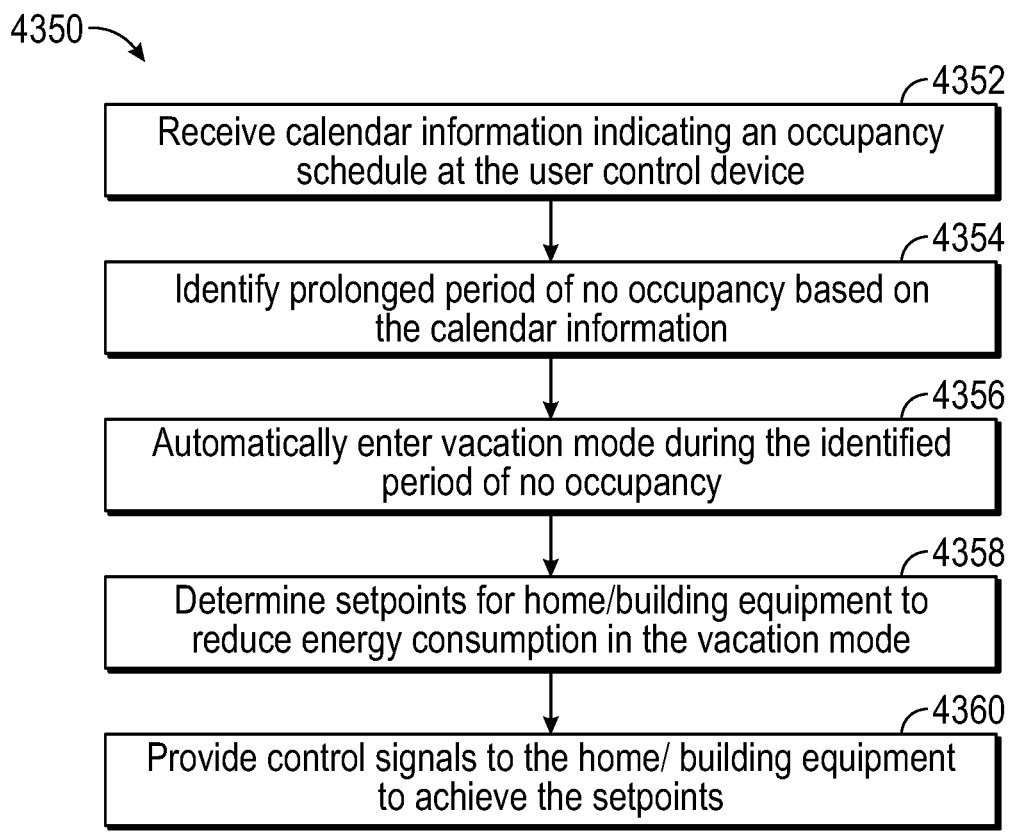

Referring now to FIGS. 21A-21B, a flow diagram 4300 and flowchart 4350 illustrating a control process which may be performed by occupancy predictor 3112 and/or equipment controller 3120 are shown, according to some embodiments. User control device 100 may receive calendar information 4304 from a user's personal calendar 4302 (step 4352). The calendar information may indicate an occupancy schedule for a controlled home or other building. User control device 100 may identify a prolonged period of no occupancy based on the calendar information 4304 (step 4354). In some embodiments, a prolonged period of no occupancy is a period of no occupancy having a duration exceeding a time threshold. User control device 100 may automatically enter a vacation mode 4310 during the identified period of no occupancy (step 4356). In some embodiments, user control device determines set points for home/building equipment 4306 to reduce energy consumption in the vacation mode (step 4358). User control device 100 may provide control signals 3408 to the home/building equipment 4306 to achieve the set points (step 4360).

Figure 22A:
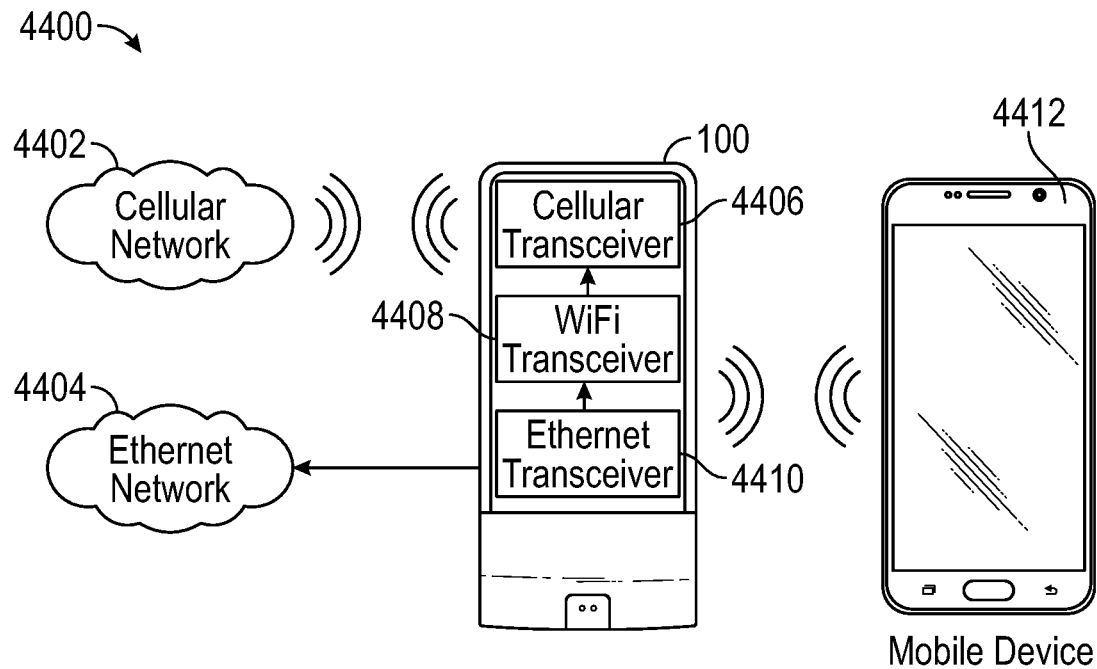
FIGS. 22A-22B are flow diagrams illustrating operations for bridging communications between a cellular network, an Ethernet network, and a WiFi network via the user control device, according to some embodiments.
Figure 22B:
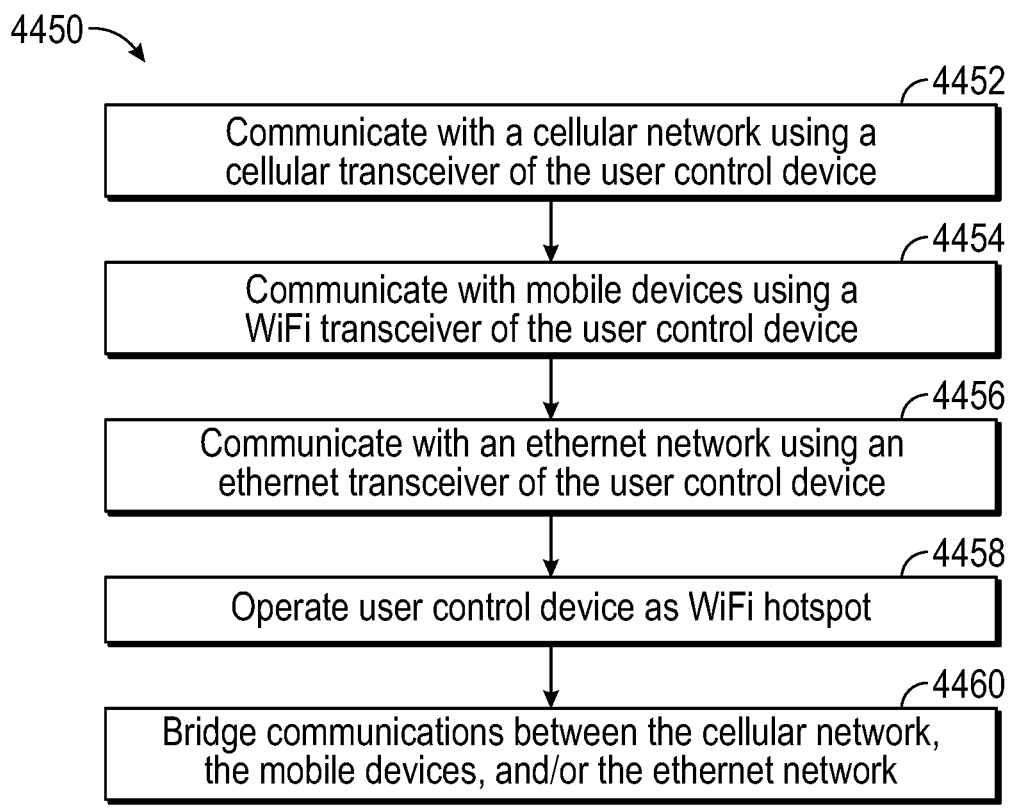

Referring now to FIGS. 22A-22B, a flow diagram 4400 and flowchart 4450 illustrating a process which may be performed by user control device 100 are shown, according to some embodiments. User control device 100 may communicate with a cellular network 4402 using a cellular module or transceiver 4406 of user control device 100 (step 4452). User control device 100 may communicate with mobile devices 4412 using a WiFi transceiver 4408 of user control device 100 (step 4454). User control device 100 may communicate with an Ethernet network 4404 using an Ethernet transceiver 4410 of user control device 100 (step 4456). User control device 100 may operate as a WiFi hotspot (step 4458) or small cell and may bridge communications between the cellular network 4402, the mobile devices 4412, and/or the Ethernet network 4404 (step 4460).

Building Control Features

Figure 23:
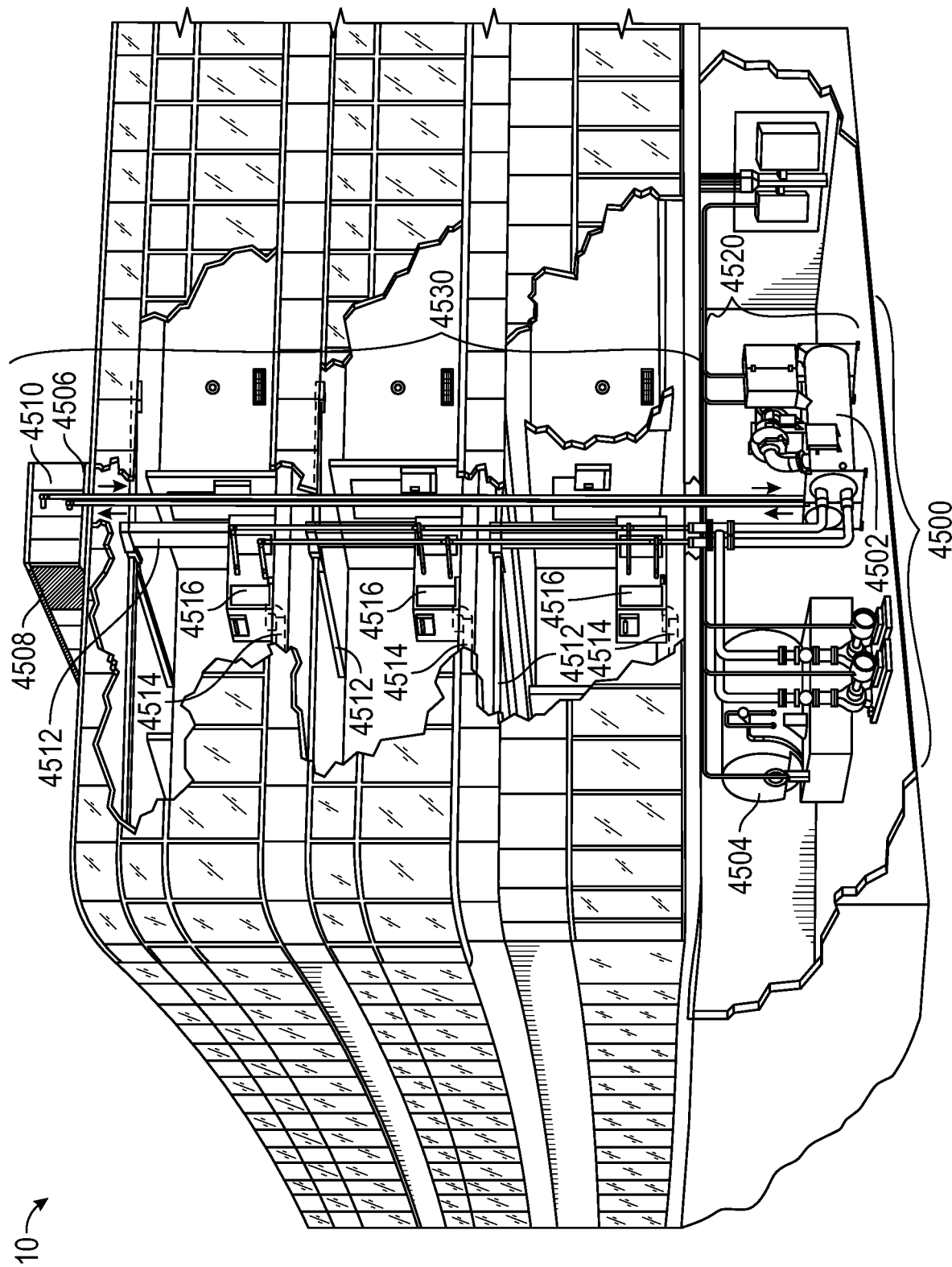
FIG. 23 is a perspective view of a building equipped with a building management system (BMS) and HVAC system, according to some embodiments.

Referring now to FIGS. 23-26, an exemplary building management system (BMS) and HVAC system in which user control device 100 may be implemented are shown, according to some embodiments. Referring particularly to FIG. 23, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 4500. HVAC system 4500 may include a plurality of HVAC devices (e.g., heaters, chillers, air handling units, pumps, fans, thermal energy storage, etc.) configured to provide heating, cooling, ventilation, or other services for building 10. For example, HVAC system 4500 is shown to include a waterside system 4520 and an airside system 4530. Waterside system 4520 may provide a heated or chilled fluid to an air handling unit of airside system 4530. Airside system 4530 may use the heated or chilled fluid to heat or cool an airflow provided to building 10.

HVAC system 4500 is shown to include a chiller 4502, a boiler 4504, and a rooftop air handling unit (AHU) 4506. Waterside system 4520 may use boiler 4504 and chiller 4502 to heat or cool a working fluid (e.g., water, glycol, etc.) and may circulate the working fluid to AHU 4506. In various embodiments, the HVAC devices of waterside system 4520 may be located in or around building 10 (as shown in FIG. 23) or at an offsite location such as a central plant (e.g., a chiller plant, a steam plant, a heat plant, etc.). The working fluid may be heated in boiler 4504 or cooled in chiller 4502, depending on whether heating or cooling is required in building 10. Boiler 4504 may add heat to the circulated fluid, for example, by burning a combustible material (e.g., natural gas) or using an electric heating element. Chiller 4502 may place the circulated fluid in a heat exchange relationship with another fluid (e.g., a refrigerant) in a heat exchanger (e.g., an evaporator) to absorb heat from the circulated fluid. The working fluid from chiller 4502 and/or boiler 4504 may be transported to AHU 4506 via piping 4508.

AHU 4506 may place the working fluid in a heat exchange relationship with an airflow passing through AHU 4506 (e.g., via one or more stages of cooling coils and/or heating coils). The airflow may be, for example, outside air, return air from within building 10, or a combination of both. AHU 4506 may transfer heat between the airflow and the working fluid to provide heating or cooling for the airflow. For example, AHU 4506 may include one or more fans or blowers configured to pass the airflow over or through a heat exchanger containing the working fluid. The working fluid may then return to chiller 4502 or boiler 4504 via piping 4510.

Airside system 4530 may deliver the airflow supplied by AHU 4506 (i.e., the supply airflow) to building 10 via air supply ducts 4512 and may provide return air from building 10 to AHU 4506 via air return ducts 4514. In some embodiments, airside system 4530 includes multiple variable air volume (VAV) units 4516. For example, airside system 4530 is shown to include a separate VAV unit 4516 on each floor or zone of building 10. VAV units 4516 may include dampers or other flow control elements that can be operated to control an amount of the supply airflow provided to individual zones of building 10. In other embodiments, airside system 4530 delivers the supply airflow into one or more zones of building 10 (e.g., via supply ducts 4512) without using intermediate VAV units 4516 or other flow control elements. AHU 4506 may include various sensors (e.g., temperature sensors, pressure sensors, etc.) configured to measure attributes of the supply airflow. AHU 4506 may receive input from sensors located within AHU 4506 and/or within the building zone and may adjust the flow rate, temperature, or other attributes of the supply airflow through AHU 4506 to achieve set point conditions for the building zone.

Figure 24:
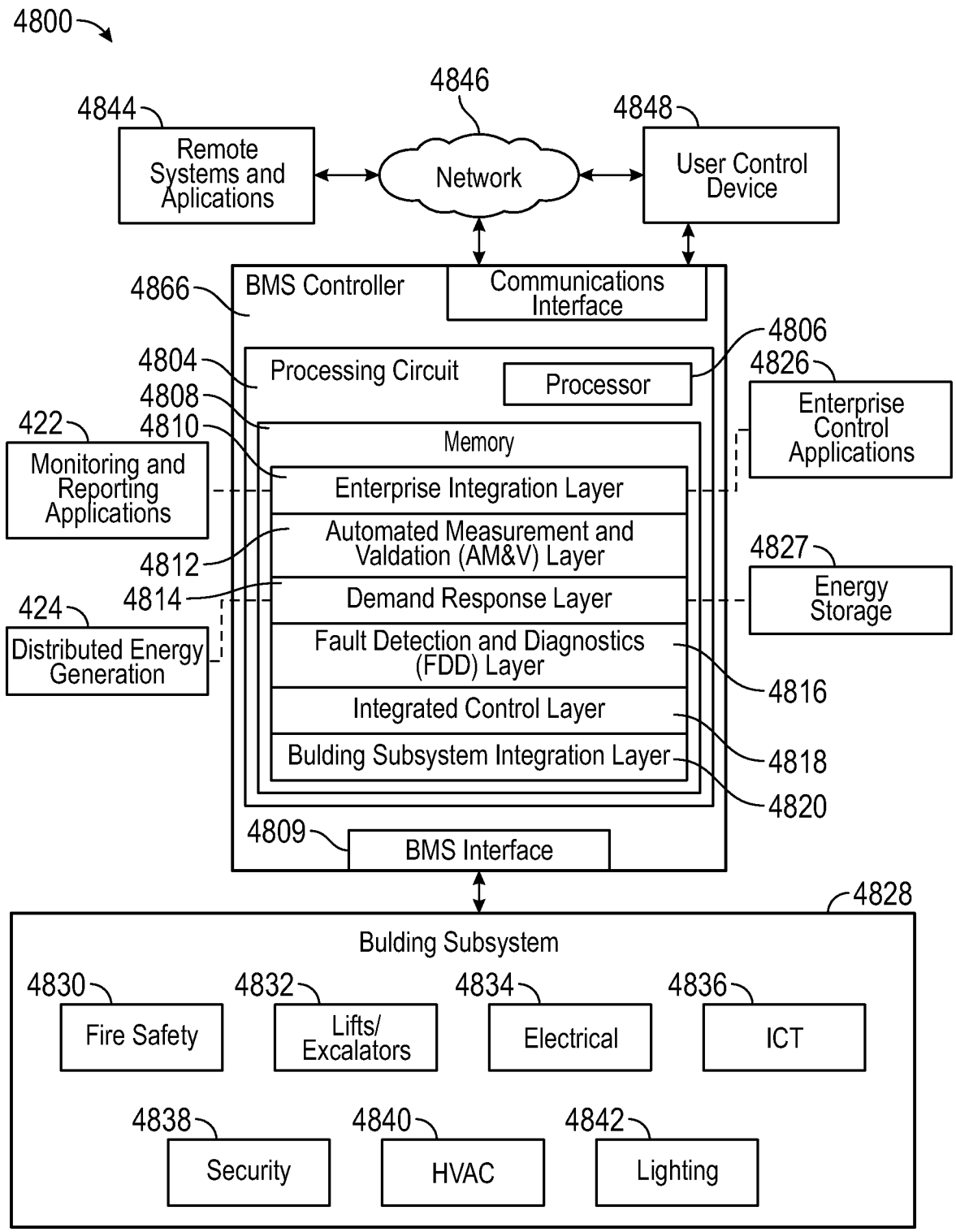
FIG. 24 is a block diagram illustrating the BMS of FIG. 23 in greater detail, according to some embodiments.

Referring now to FIG. 24, a block diagram of a building management system (BMS) 4800 is shown, according to some embodiments. BMS 4800 may be implemented in building 10 to automatically monitor and control various building functions. BMS 4800 is shown to include BMS controller 4866 and a plurality of building subsystems 4828. Building subsystems 4828 are shown to include a building electrical subsystem 4834, an information communication technology (ICT) subsystem 4836, a security subsystem 4838, an HVAC subsystem 4840, a lighting subsystem 4842, a lift/escalators subsystem 4832, and a fire safety subsystem 4830. In various embodiments, building subsystems 4828 can include fewer, additional, or alternative subsystems. For example, building subsystems 4828 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 4828 include a waterside system and/or airside system of an HVAC system.

Each of building subsystems 4828 may include any number of devices, controllers, and connections for completing its individual functions and control activities. HVAC subsystem 4840 may include many of the same components as HVAC system 4500, as described with reference to FIG. 23. For example, HVAC subsystem 4840 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 4842 may include any number of light fixtures, ballasts, lighting sensors, dimmers, or other devices configured to controllably adjust the amount of light provided to a building space. Security subsystem 4838 may include occupancy sensors, video surveillance cameras, digital video recorders, video processing servers, intrusion detection devices, access control devices and servers, or other security-related devices.

Still referring to FIG. 24, BMS controller 4866 is shown to include a communications interface 4807 and a BMS interface 4809. Interface 4807 may facilitate communications between BMS controller 4866 and external applications (e.g., monitoring and reporting applications 4822, enterprise control applications 4826, remote systems and applications 4844, applications residing on user control device 4848, etc.) for allowing user control, monitoring, and adjustment to BMS controller 4866 and/or subsystems 4828. Interface 4807 may also facilitate communications between BMS controller 4866 and user control device 4848. BMS interface 4809 may facilitate communications between BMS controller 4866 and building subsystems 4828 (e.g., HVAC, lighting security, lifts, power distribution, business, etc.). User control device 4848 may include any of the embodiments of the user control device 100-2800 as described with reference to FIGS. 1-44B.

Interfaces 4807, 4809 can be or include wired or wireless communications interfaces (e.g., jacks, antennas, transmitters, receivers, transceivers, wire terminals, etc.) for conducting data communications with building subsystems 4828 or other external systems or devices. In various embodiments, communications via interfaces 4807, 4809 may be direct (e.g., local wired or wireless communications) or via a communications network 4846 (e.g., a WAN, the Internet, a cellular network, etc.). For example, interfaces 4807, 4809 can include an Ethernet card and port for sending and receiving data via an Ethernet-based communications link or network. In another example, interfaces 4807, 4809 can include a WiFi transceiver for communicating via a wireless communications network. In another example, one or both of interfaces 4807, 4809 may include cellular or mobile phone communications transceivers. In one embodiment, communications interface 4807 is a power line communications interface and BMS interface 4809 is an Ethernet interface. In other embodiments, both communications interface 4807 and BMS interface 4809 are Ethernet interfaces or are the same Ethernet interface.

Still referring to FIG. 24, BMS controller 4866 is shown to include a processing circuit 4804 including a processor 4806 and memory 4808. Processing circuit 4804 may be communicably connected to BMS interface 4809 and/or communications interface 4807 such that processing circuit 4804 and the various components thereof can send and receive data via interfaces 4807, 4809. Processor 4806 can be implemented as a general purpose processor, an application specific integrated circuit (ASIC), one or more field programmable gate arrays (FPGAs), a group of processing components, or other suitable electronic processing components.

Memory 4808 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 4808 may be or include volatile memory or non-volatile memory. Memory 4808 may include database components, object code components, script components, or any other type of information structure for supporting the various activities and information structures described in the present application. According to some embodiments, memory 4808 is communicably connected to processor 4806 via processing circuit 4804 and includes computer code for executing (e.g., by processing circuit 4804 and/or processor 4806) one or more processes described herein.

In some embodiments, BMS controller 4866 is implemented within a single computer (e.g., one server, one housing, etc.). In various other embodiments BMS controller 4866 may be distributed across multiple servers or computers (e.g., that can exist in distributed locations). Further, while FIG. 24 shows applications 4822 and 4826 as existing outside of BMS controller 4866, in some embodiments, applications 4822 and 4826 may be hosted within BMS controller 4866 (e.g., within memory 4808).

Still referring to FIG. 24, memory 4808 is shown to include an enterprise integration layer 4810, an automated measurement and validation (AM&V) layer 4812, a demand response (DR) layer 4814, a fault detection and diagnostics (FDD) layer 4816, an integrated control layer 4818, and a building subsystem integration later 4820. Layers 4810-4820 may be configured to receive inputs from building subsystems 4828 and other data sources, determine optimal control actions for building subsystems 4828 based on the inputs, generate control signals based on the optimal control actions, and provide the generated control signals to building subsystems 4828. The following paragraphs describe some of the general functions performed by each of layers 4810-4820 in BMS 4800.

Enterprise integration layer 4810 may be configured to serve clients or local applications with information and services to support a variety of enterprise-level applications. For example, enterprise control applications 4826 may be configured to provide subsystem-spanning control to a graphical user interface (GUI) or to any number of enterprise-level business applications (e.g., accounting systems, user identification systems, etc.). Enterprise control applications 4826 may also or alternatively be configured to provide configuration GUIs for configuring BMS controller 4866. In yet other embodiments, enterprise control applications 4826 can work with layers 4810-4820 to optimize building performance (e.g., efficiency, energy use, comfort, or safety) based on inputs received at interface 4807 and/or BMS interface 4809.

Building subsystem integration layer 4820 may be configured to manage communications between BMS controller 4866 and building subsystems 4828. For example, building subsystem integration layer 4820 may receive sensor data and input signals from building subsystems 4828 and provide output data and control signals to building subsystems 4828. Building subsystem integration layer 4820 may also be configured to manage communications between building subsystems 4828. Building subsystem integration layer 4820 translate communications (e.g., sensor data, input signals, output signals, etc.) across a plurality of multi-vendor/multi-protocol systems.

Demand response layer 4814 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 4824, from energy storage 4827, or from other sources. Demand response layer 4814 may receive inputs from other layers of BMS controller 4866 (e.g., building subsystem integration layer 4820, integrated control layer 4818, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 4814 includes control logic for responding to the data and signals it receives. These responses can include communicating with the control algorithms in integrated control layer 4818, changing control strategies, changing set points, or activating/deactivating building equipment or subsystems in a controlled manner. Demand response layer 4814 may also include control logic configured to determine when to utilize stored energy. For example, demand response layer 4814 may determine to begin using energy from energy storage 4827 just prior to the beginning of a peak use hour.

In some embodiments, demand response layer 4814 includes a control module configured to actively initiate control actions (e.g., automatically changing set points) which minimize energy costs based on one or more inputs representative of or based on demand (e.g., price, a curtailment signal, a demand level, etc.). In some embodiments, demand response layer 4814 uses equipment models to determine an optimal set of control actions. The equipment functions performed by various sets of building equipment. Equipment models may represent collections of building equipment (e.g., subplants, chiller arrays, etc.) or individual devices (e.g., individual chillers, heaters, pumps, etc.).

Demand response layer 4814 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what set points can be changed, what the allowable set point adjustment range is, how long to hold a high demand set point before returning to a normally scheduled set point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 4818 may be configured to use the data input or output of building subsystem integration layer 4820 and/or demand response later 4814 to make control decisions. Due to the subsystem integration provided by building subsystem integration layer 4820, integrated control layer 4818 can integrate control activities of the subsystems 4828 such that the subsystems 4828 behave as a single integrated supersystem. In an exemplary embodiment, integrated control layer 4818 includes control logic that uses inputs and outputs from a plurality of building subsystems to provide greater comfort and energy savings relative to the comfort and energy savings that separate subsystems could provide alone. For example, integrated control layer 4818 may be configured to use an input from a first subsystem to make an energy-saving control decision for a second subsystem. Results of these decisions can be communicated back to building subsystem integration layer 4820.

Integrated control layer 4818 is shown to be logically below demand response layer 4814. Integrated control layer 4818 may be configured to enhance the effectiveness of demand response layer 4814 by enabling building subsystems 4828 and their respective control loops to be controlled in coordination with demand response layer 4814. This configuration may advantageously reduce disruptive demand response behavior relative to conventional systems. For example, integrated control layer 4818 may be configured to assure that a demand response-driven upward adjustment to the set point for chilled water temperature (or another component that directly or indirectly affects temperature) does not result in an increase in fan energy (or other energy used to cool a space) that would result in greater total building energy use than was saved at the chiller.

Integrated control layer 4818 may be configured to provide feedback to demand response layer 4814 so that demand response layer 4814 checks that constraints (e.g., temperature, lighting levels, etc.) are properly maintained even while demanded load shedding is in progress. The constraints may also include set point or sensed boundaries relating to safety, equipment operating limits and performance, comfort, fire codes, electrical codes, energy codes, and the like. Integrated control layer 4818 is also logically below fault detection and diagnostics layer 4816 and automated measurement and validation layer 4812. Integrated control layer 4818 may be configured to provide calculated inputs (e.g., aggregations) to these higher levels based on outputs from more than one building subsystem.

Automated measurement and validation (AM&V) layer 4812 may be configured to verify that control strategies commanded by integrated control layer 4818 or demand response layer 4814 are working properly (e.g., using data aggregated by AM&V layer 4812, integrated control layer 4818, building subsystem integration layer 4820, FDD layer 4816, or otherwise). The calculations made by AM&V layer 4812 may be based on building system energy models and/or equipment models for individual BMS devices or subsystems. For example, AM&V layer 4812 may compare a model-predicted output with an actual output from building subsystems 4828 to determine an accuracy of the model.

Fault detection and diagnostics (FDD) layer 4816 may be configured to provide on-going fault detection for building subsystems 4828, building subsystem devices (i.e., building equipment), and control algorithms used by demand response layer 4814 and integrated control layer 4818. FDD layer 4816 may receive data inputs from integrated control layer 4818, directly from one or more building subsystems or devices, or from another data source. FDD layer 4816 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 4816 may be configured to output a specific identification of the faulty component or cause of the fault (e.g., loose damper linkage) using detailed subsystem inputs available at building subsystem integration layer 4820. In other exemplary embodiments, FDD layer 4816 is configured to provide "fault" events to integrated control layer 4818 which executes control strategies and policies in response to the received fault events. According to some embodiments, FDD layer 4816 (or a policy executed by an integrated control engine or business rules engine) may shut-down systems or direct control activities around faulty devices or systems to reduce energy waste, extend equipment life, or assure proper control response.

FDD layer 4816 may be configured to store or access a variety of different system data stores (or data points for live data). FDD layer 4816 may use some content of the data stores to identify faults at the equipment level (e.g., specific chiller, specific AHU, specific terminal unit, etc.) and other content to identify faults at component or subsystem levels. For example, building subsystems 4828 may generate temporal (i.e., time-series) data indicating the performance of BMS 4800 and the various components thereof. The data generated by building subsystems 4828 may include measured or calculated values that exhibit statistical characteristics and provide information about how the corresponding system or process (e.g., a temperature control process, a flow control process, etc.) is performing in terms of error from its set point. These processes can be examined by FDD layer 4816 to expose when the system begins to degrade in performance and alert a user to repair the fault before it becomes more severe.

Figure 25:
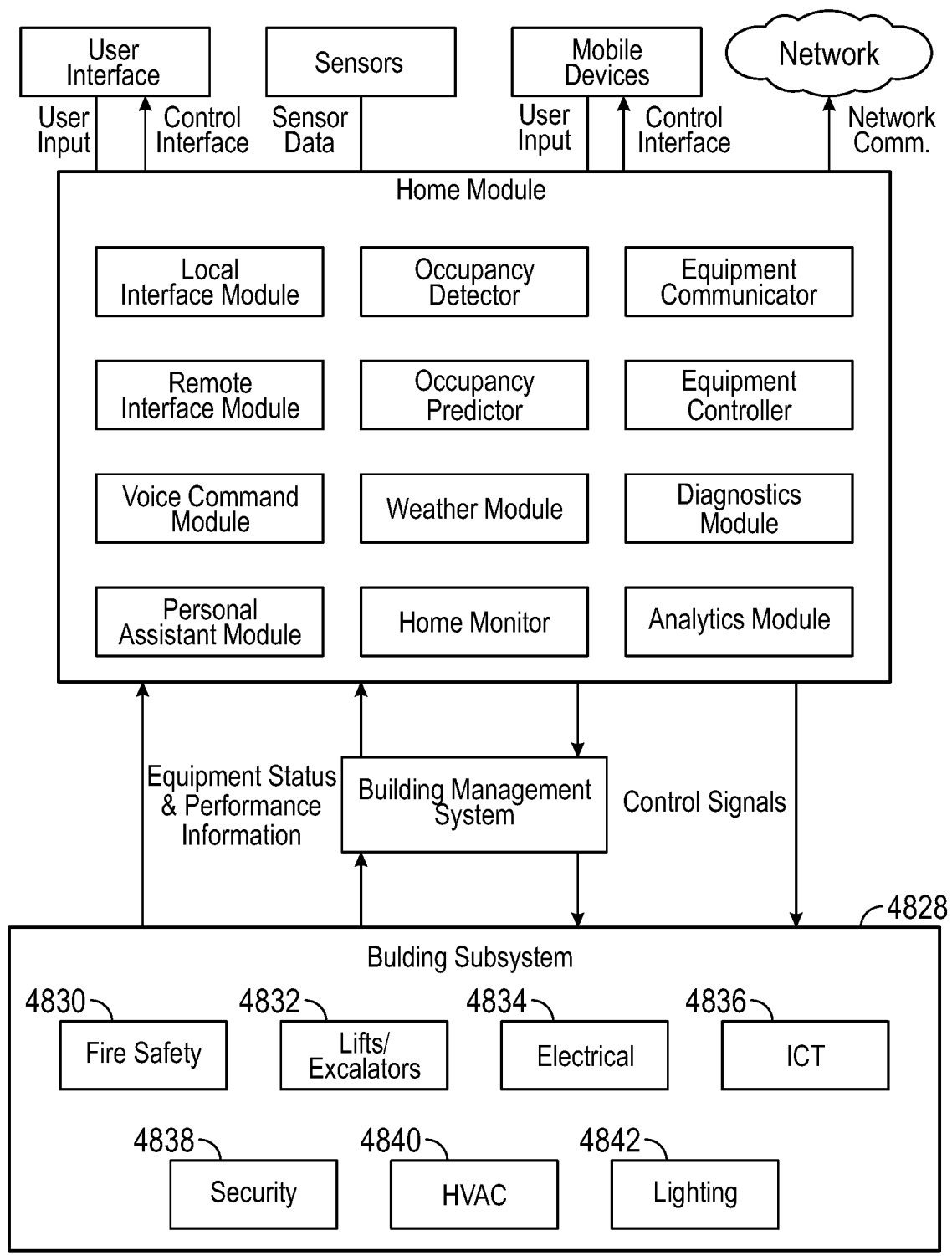
FIG. 25 is a block diagram illustrating the building module of the user control device in greater detail, according to some embodiments.

Referring now to FIG. 25, a block diagram illustrating building module 3038 in greater detail is shown, according to some embodiments. Building module 3038 may be configured to function as a central control hub for a building management system 4930. Building module 3038 may present various monitoring and control interfaces via user interface 3010 and/or mobile devices 3068 and may receive user input via user interface 3010 and/or mobile devices 3068. Building module 3038 may receive sensor data from sensors 3020 and may engage in network communications via network 3062 (e.g., a LAN, WAN, the Internet, etc.).

Building module 3038 may communicate with building subsystems equipment 4828 (e.g., directly or via building management system 4930) and may receive equipment status and performance information from building equipment 4830-4832. For example, building module 3038 may receive equipment status and performance information for fire safety equipment 4830, lifts/escalators 4832, electrical equipment 4834, information and communications technology (ICT) equipment 4836, security equipment 4838, HVAC equipment 4840, lighting equipment 4832, or any other type of equipment which may be installed in a building or used as part of a building management system. Building module 3038 may use the equipment status and performance information in combination with other types of input (e.g., input from user interface 3010, sensors 3020, mobile devices 3068, network 3062, etc.) to generate control signals for building subsystems 4828. Building module 3038 may provide the control signals to building subsystems 4828 (e.g., directly or via building management system 4930).

Still referring to FIG. 25, building module 3038 is shown to include a local interface module 4902, a remote interface module 4904, a voice command module 4906, a personal assistant module 4908, an occupancy detector 4910, an occupancy predictor 4912, a weather module 4914, a home monitor 4916, an equipment communicator 4918, an equipment controller 4920, a diagnostics module 4922, and an analytics module 4924. Each of these components of building module 3038 may be the same or similar to corresponding components of home module 3036, as described with reference to FIG. 9. The functions of these modules may be the same or similar to the functions described with reference to FIGS. 9-22.

In some embodiments, user control device 100 is configured to communicate with an energy grid to plan energy usage based on real-time energy pricing information and/or predicted building loads. In some embodiments, user control device 100 is configured to manage an electrical energy storage system that stores energy from the energy grid. User control device 100 may use the energy storage system to participate in incentive programs (e.g., load curtailment, frequency regulation, etc.) by adding or removing energy from the energy grid. User control device 100 may include some or all of the features described in U.S. Provisional Applications Nos. 62/239,131, 62/239,231, 62/239,233, 62/239,245, 62/239,246, and 62/239,249 filed Oct. 8, 2015. The entire disclosure of each of these provisional applications is incorporated by reference herein.

Occupancy-Based Control

Referring now to FIGS. 26A-19, several occupancy-based control functions which may be performed by user control device 100 are shown, according to some embodiments. Referring particularly to FIG. 26A, an exemplary situation 5000 in which user control device 100 detects occupancy of a home is shown. User control device 100 may detect occupancy through sensor 5002, which may be an embodiment of sensors 3020. The sensor 5002 is shown as being integrated into the user control device 100. In alternative embodiments, the sensor 5002 can be remote from the user control device 100 and can communicate detected occupancy to the user control device 100. For example, the sensor 5002 can communicate via a wired connection or can communicate wirelessly through Wi-Fi, Bluetooth, Zigbee, or any other suitable communication protocol.

In some embodiments, user control device 100 may detect occupancy through communication with external object

5004. Object 5004 may be any device. In some embodiments, object 5004 is an electronic device capable of communicating with user control device 100. In various embodiments, object 5004 may be a user's cellphone, laptop, tablet, or any portable electronic device. In some embodiments, object 5004 is a dongle which may be compatible with user control device 100 or any other objects which may communicate with user control device 100. In some embodiments, object 5004 is a wearable object such as a necklace, a watch, or a fitness tracker. Object 5004 may be a business card or an RFID card. User control device 100 may detect the time at which occupancy is detected. In some embodiments, user control device 100 time-stamps logged data to be used in later analysis.

FIG. 26B describes an exemplary process 5050 in which user control device 100 may detect occupancy and alter operations of a connected system. User control device 100 waits for an input to be received at sensor 5002 (step 5052). In step 5054, an input is received. The input may be a noise, a movement, a heat signature, or a communication signal. Once the input is received, it must be processed by occupancy detector 3110 or occupancy detector 4910 in step 5056. In step 5058, a determination is made whether occupancy has been detected. If occupancy has been detected, an operation command is issued from user control device 100 to the connected system (step 5060). If occupancy has not been detected, the process repeats, and user control device 100 waits for an input to be received in step 5052. In some embodiments, user control device 100 may receive a communication signal from object 5004, which may be through NFC, WiFi, Bluetooth, or any other communication protocol.

Referring now to FIG. 27A, user control device 100 may determine occupancy based on a schedule or calendar. In some embodiments, a user is able to input a schedule directly to user control device 100. In other embodiments, user control device 100 may support integration with existing calendar applications. In step 5102, user control device 100 receives calendar data or a schedule from a user. User control device 100 then determines when the user does not have any events scheduled in step 5104. In some embodiments, user control device 100 may allow a user to input a schedule of times when she expects to be home. The periods of time identified in step 5104 are then stored as predicted periods of occupancy (step 5106). In some embodiments, user control device 100 may store the predicted occupancy periods in remote data storage. In other embodiments, user control device 100 may store the predicted occupancy periods in local memory. In step 5108, operation commands are issued from user control device 100 to the connected system based on the occupancy periods stored and the associated user's preferences.

Figure 27B:
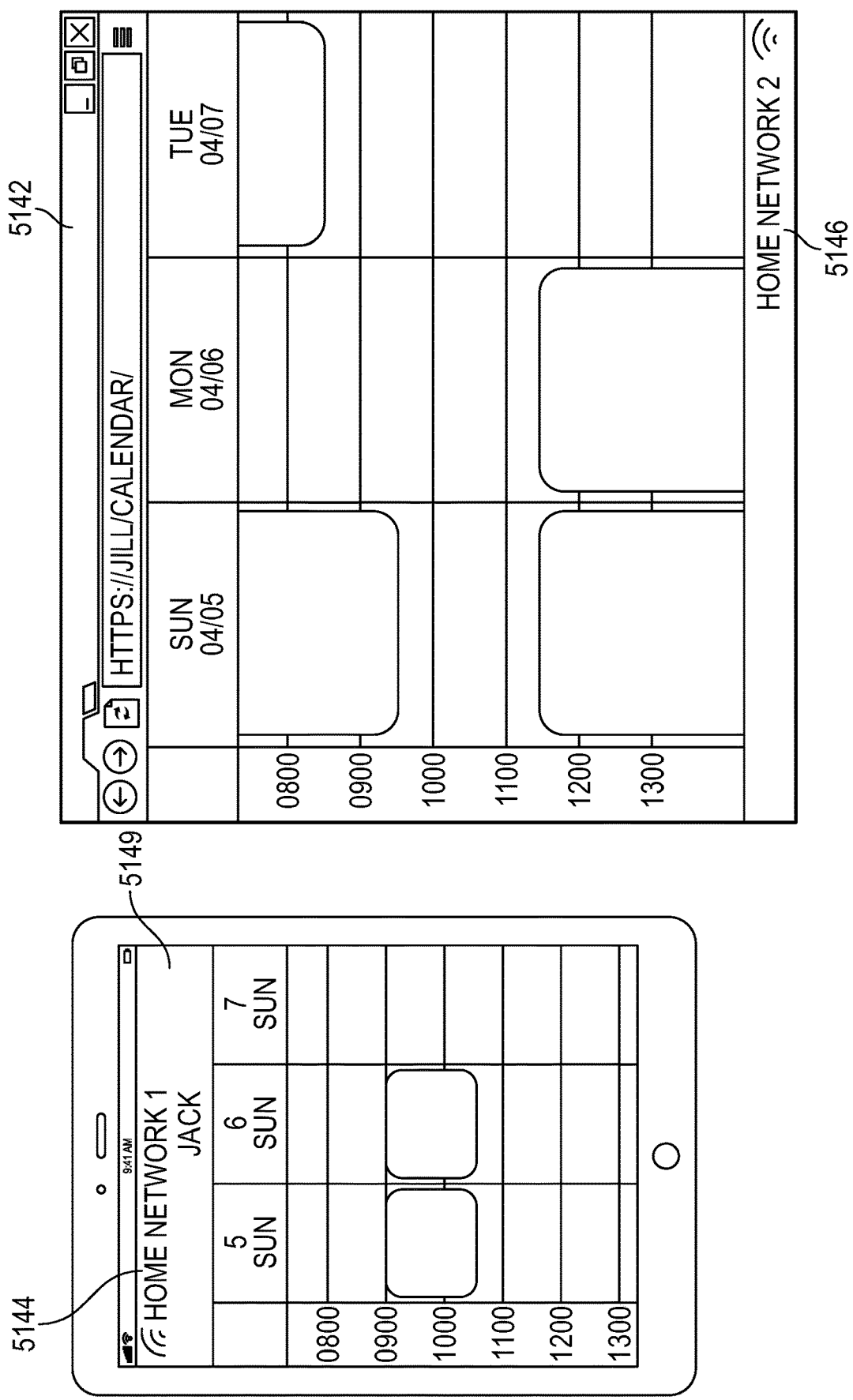
FIG. 27B is a schematic drawing of various applications and their user interfaces through which the user control device may obtain schedule data and determine occupancy, according to some embodiments.

In FIG. 27B, an exemplary embodiment of methods with which users may input calendar data is shown. Existing calendar application 5140 accessed on a mobile device with user Jack's schedule is shown. Existing calendar application 5142 accessed via a browser with user Jill's schedule is shown. In some embodiments, user control device 100 may communicate with Jack or Jill's Google, iOS, or Outlook calendar and determine when he or she will be home based upon the appointment and event information obtained. User control device 100 may decide that a user will be home whenever he does not have an appointment scheduled. In some embodiments, user control device 100 may be programmed to assume that a user will not be home on weekdays during the work day, in addition to appointments and engagements outside of those hours.

User control device 100 may be able to determine when a user will be home based upon location information associated with events in his calendar. In some embodiments, user control device 100 may be able to detect the network connectivity of a user's personal device—whether it is connected—to determine occupancy. In some embodiments, user control device 100 may be able to detect the network connectivity of a user's personal device to determine what area of the home the user is in. User control device 100 may be able to control conditioning to different areas, or zones, of a home depending on the duct and flow work. The network 5144, to which Jack is connected, may be identified and used to determine that he is in zone 1 of the home. The network 5146, to which Jill is connected, may be identified and used to determine that she is in zone 2 of the home.

In a multiple occupancy home, user control device 100 may be able to make operating decisions based on occupancy. User control device 100 may be able to operate on different schedules for different detected users. In one embodiment, users may each enter their own schedule to user control device 100 directly. In other embodiments, user control device 100 may be able to communicate with external calendars and applications to determine a user's schedule. User control device 100 may be able to detect which user is home and adjust the operating schedule to accommodate that user's preferences. For example, in a home with multiple occupants and different schedules to keep to, thermostat may detect which user is home, and make operating decisions based on that user's settings and schedule. It is possible that user control device 100 may have a different setting for guests or periodic visitors such as a housekeeper or a nanny. For example, user control device 100 may operate at lower capacity when only the housekeeper is in the home, as opposed to when the entire family residing in the home is present.

In a multiple occupancy home, it is common for users to have different schedules. Referring now to FIG. 27C, user control device 100 is shown making operating decisions based on the intersection of schedules of the occupants. User control device 100 may use calendar information to determine how many users are home and adjust operation accordingly. User control device 100 may make decisions on operating procedure when more than one user is home. In one embodiment, user control device 100 may compromise when users with different preferences are home.

The process described in FIG. 27A may be adapted for situations in which conflicting preferences exist for multiple occupancy homes. User control device 100 may receive the schedule of two occupants of the home. User control device 100 compares the calendars detect occupancy based on when either occupant does not have an event scheduled. User control device 100 could create a merged calendar of the free times of the users. If only one user is home, his settings are applied, as shown in user control device 100 schedule block 5174. User control device 100 determines an overlap in occupancy has been detected. For example, if one user prefers the home to be at 72° F. while another user prefers the home to be at 68° F., and both users are home, user control device 100 may compromise and set the temperature to 70° F. as shown in user control device 100 schedule block 5172.

In another embodiment, there may be a master user whose settings will override other users' settings. For example, one user prefers the home to be at 72° F. while another user prefers the home to be at 68° F.; however, the first user is the master user, so her settings are conveyed to the equipment as shown in user control device 100 schedule block 5176. In another embodiment, if a user is already at home but the master user is detected afterward, her settings may be applied automatically upon her detection. In yet another embodiment, user control device 100 may keep an existing user's preferences until the master user commands an update.

Figure 28:
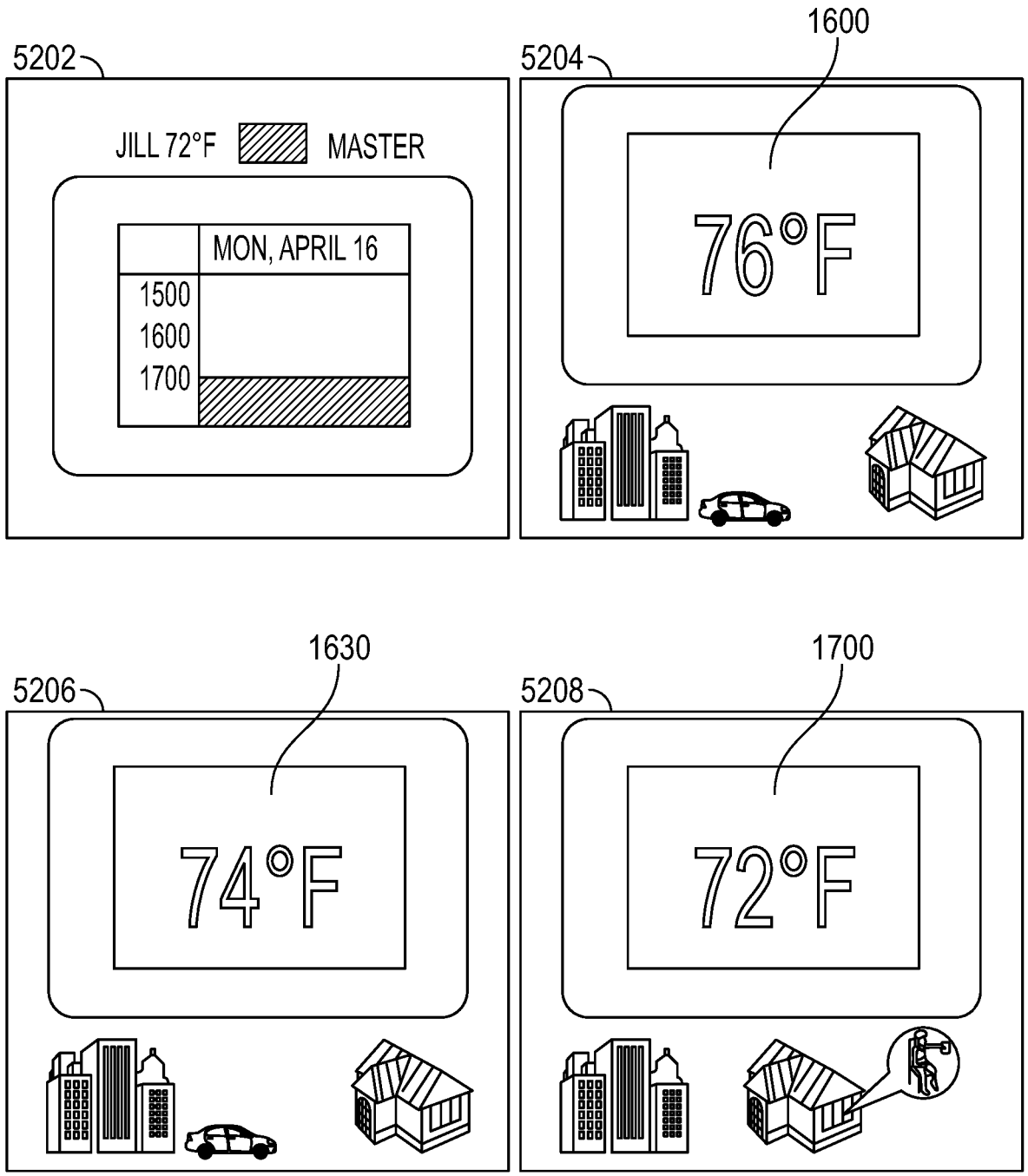
FIG. 28 is a drawing of operations in which the user control device adjusts the temperature of a home to a user's preferences prior to her arrival at home, according to some embodiments.

Referring now to FIG. 28, user control device 100 may be able to determine the operating conditions needed to reach a user's desired settings by the time they arrive. In one embodiment, user control device 100 allows a user to program directly into user control device 100 when she expects to be home and what settings she would like it to be. In another embodiment, user control device 100 may access a user's external calendar and determine when she will be home as shown in user control device 100 schedule block 5202. For example, if Jill is scheduled to be home at 1700 and would like her home to be at 72° F. when she arrives, user control device 100 may begin to cool her home from a starting point of 76° F. at 1600, as shown in situational snapshot 5204. By 1630, as Jill is travelling, user control device 100 has already cooled her home to 74° F. as shown in situational snapshot 5206. When Jill arrives home at 1700, her home is already at 72° F., as shown in situational snapshot 5208. In another embodiment, user control device 100 may be able to receive communication from a user while they are away to set their home at a certain temperature, which user control device 100 may immediately command.

User control device 100 may be able to determine what kind of activities are occurring in the home and change operation based on occupancy level. In some embodiments, user control device 100 is able to detect separate occupants of the home. In other embodiments, user control device 100 determines occupancy level based on communication with connected equipment. For example, user control device 100 may be able to estimate occupancy based on assumed load seen by the AC unit. In another embodiment, user control device 100 may obtain activity information from a fitness tracker to determine the amount of activity related to a specific user. In yet another embodiment, user control device 100 may use sensor 5002 to detect the amount of movement or activity occurring. For example, user control device 100 may determine that a user is currently occupying a room, but that there is a low level of activity. User control device 100 may determine that the user is sleeping, and adjust conditioning accordingly. User control device 100 may determine that many people are in one room, and that there is a high level of activity, and increase conditioning accordingly.

Referring now to FIG. 29, user control device 100 may adjust compressor staging in a connected AC unit based on occupancy. In one embodiment, user control device 100 may detect a change in occupancy and adjust compressor staging accordingly. For example, user control device 100 may detect that more motion is occurring, and increase staging to maintain temperature. In another embodiment, user control device 100 may analyze the occupancy and activity level of the home and determine an appropriate staging progression. For example, there may currently be one person detected by user control device 100, as shown in snapshot 5302. The compressor is currently operating in stage 1, as there is low occupancy. In snapshot 5304, user control device 100 may detect from the home network that there are five people in the home, and command the compressor, currently at stage 1, to go through stages 2, 3, and 4 to stage 5. User control device 100 may then detect that there are ten people in the home, and command the compressor, currently at stage 1, to go directly to stage 5.

User control device 100 may be able to determine with some granularity where in the home a user is. In some embodiments, user control device 100 communicates with a user's personal device 5004 and obtains GPS data to determine whether a user is home, and if so, where he is. In some embodiments, user control device 100 uses a geofencing to determine what zone or room of the home a user is in and adjusts operation accordingly. Geofencing allows a boundary to be defined based on locational information. User control device 100 may adjust operation based on detected occupancy and location. For example, if a user is detected on the upper floor of a home, user control device 100 may increase conditioning on the upper floor. User control device 100 could detect that there are no occupants on the lower floor and decrease conditioning to the lower floor.

User control device 100 may allow users to set their occupancy status through an application or as an input to user control device 100. In some embodiments, a user may input their occupancy status through an object 1104 such as a cellphone. For example, Jill may set her status as "away." In some embodiments, different users may have different settings, and user control device 100 may determine the level of occupancy from the status information received. In some embodiments, user control device 100 is able to automatically update a user's status based on the connectivity of an object 5004 which, in some embodiments, is a cellphone.

In some embodiments, user control device 100 may send push notifications to a user's cellphone 5004 depending on their detected location. For example, if Jill is detected to have left her home, user control device 100 may display a prompt asking if she would like to set her status as "away." In some embodiments, when a user is away, the system associated with user control device 100 goes into an energy efficient state which may not be comfortable to occupants remaining in the home. User control device 100 may allow a master user to override all commands given to user control device 100 from other users. In some embodiments, if a master user is away, the system will go into an energy efficient state despite the occupancy of the home by other users. User control device 100 may display a warning to the master user that another user is still home, and ask whether she would still like to set her status as "away." For example, if Jill is the master user and is detected leaving her home, user control device 100 may ask whether she would like to set her status to "away." If she chooses "Yes," user control device 100 may warn her that Jack is still home, and that the system will go into an energy efficient state despite his occupancy. User control device 100 may ask whether a user is sure she wishes to change her status. If a user selects "Yes," the system may execute whatever command is associated with no occupancy.

User control device 100 may detect a user's location based on a zone sensor which may communicate through any communications protocol. For example, the zone sensor may use Bluetooth, NFC, WiFi, or any other communications protocol. In some embodiments, user control device 100 may indicate the success or failure of detection of a user through the playing of a sound. In some embodiments, the sound may be unique for success or for failure. In some embodiments, an accompanying indicator may be displayed. For example, a message may be displayed, warning the user that they were not authenticated. The indicator may be as simple as a flashing LED.

User control device 100 may adjust its communication behavior based on detected occupancy. In one embodiment, user control device 100 may determine that a user is in the kitchen while user control device 100 is in the living room. User control device 100 may attempt to communicate any changes in operation to the user through a speaker in the kitchen, or through the user's portable electronic device since the user cannot see the screen of user control device 100.

User control device 100 may be able to learn from user behavior, and store data to adapt operation and better serve users. In one embodiment, user control device 100 may analyze the location data obtained and determine the location in which a user spends a majority of his time in. User control device 100 may set that location as a priority to condition over all locations in the home. In another embodiment, user control device 100 may allow users to set their preferred priority space.

User control device 100 may be able to learn from outside sources how to adjust operation. In some embodiments, user control device 100 stores the date and time at which occupancy is being detected. User control device 100 may determine, based on the season, what an appropriate conditioning command might be. User control device 100 may be able to learn what an appropriate adjustment to standard operating conditions might be based on historical data collected from the home.

User control device 100 may make adjustments to standard operating condition based on the frequency at which occupancy is detected. For example, a user is detected at one time. Some amount of time later, the user is detected again. User control device 100 makes an operating decision based on the time in between detections. In one embodiment, sensors 3020 include a motion sensor and user control device 100 detects occupancy purely on motion. For example, a pet cat may walk past the sensor several times a minute, causing user control device 100 to detect "high occupancy." However, user control device 100 may have a threshold frequency past which it decides that it should not be considering each detection as a separate event. In another embodiment, user control device 100 may detect a user's device connecting to the home network at a high frequency, possibly due to faulty components. User control device 100 may decide that the high level of activity is not genuine, and cancel adjustments accordingly.

User control device 100 may receive identifying information when detecting occupancy. In one embodiment, user control device 100 may use sensors 3020, in one embodiment, a plurality of cameras, to detect and identify separate users. In another embodiment, user control device 100 may receive user information from the user's portable electronic device. In yet another embodiment, user control device 100 may communicate with the network to receive user information from devices connected to the network. User control device 100 may store personalized settings and control configurations for each associated device. User control device 100 may load settings from the network to adjust the user interface in accordance with the user detected. For example, a user may prefer to have a user interface with only temperature adjustment, whereas another user may prefer to have a user interface which allows her to access every option available. User control device 100 may allow users to create a personalized home screen which displays information the user is most interested in.

User control device 100 may display different information based on the user detected. In some embodiments, user control device 100 is able to distinguish between occupants based on information received from sensors 3020. One of sensors 3020 may be a camera, an IR sensor, a microphone, or any other conceivable sensor which could be used to detect occupancy. User control device 100 may only display the current temperature if a child or a pet is detected. In some embodiments, user control device 100 may detect the user based on their identifiable personal device, and display a screen of her choice. For example, if a user prefers to see how long it will take to reach her settings, she can select that screen as the default screen when she is detected in the home. In another embodiment, user control device 100 may display the most used screen. For example, if the temperature screen is used the most out of all screens available, user control device 100 may display the temperature screen whenever occupancy is detected.

Data Analytics

Figure 30:
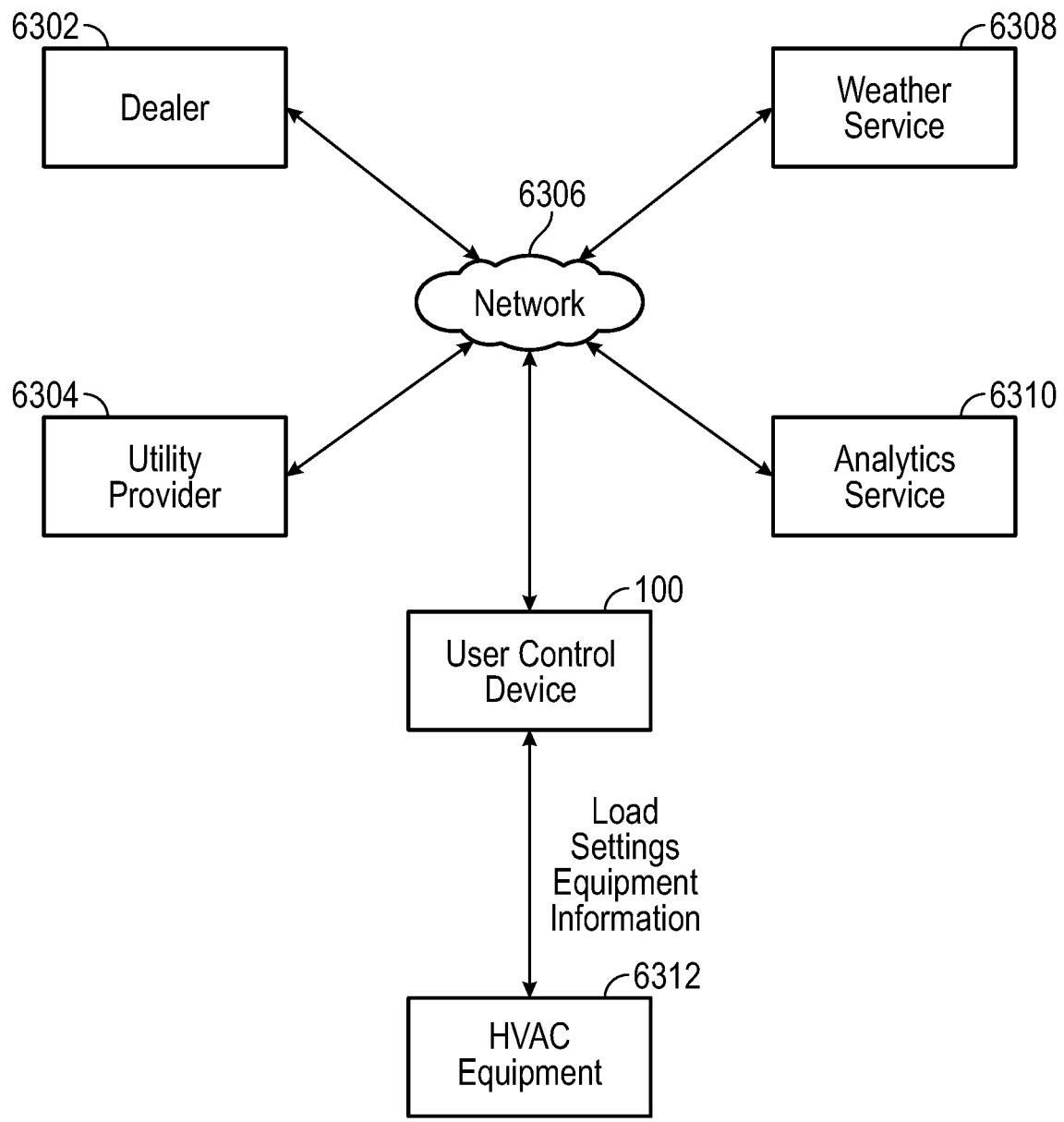
FIG. 30 is a flow diagram illustrating the flow of information between the user control device, HVAC equipment, a network, and network-connected devices and services, according to some embodiments.

Referring now to FIG. 30, user control device 100 is able to receive information used to calculate metrics such as assumed load and current energy consumption due to its bi-directional communication abilities. User control device 100 is shown to be connected with network 6306, through which user control device 100 may communicate with a dealer 6302, a weather service 6308, an analytics service 6310, and/or a utility provider 6304. User control device 100 is shown to be communicating directly with HVAC equipment 2420. It is understood that the resources with which user control device 100 is shown to be connected are not meant to be limiting, and that user control device 100 may be connected with any number of devices, services, and systems. The history of the system, including equipment operating performance, can be stored either in memory integrated with user control device 100 or in network 6306 for later access.

User control device 100 may analyze the data through analytics service 6310. Analytics service 6310 may be an embodiment of analytics module 3124 or analytics module 4924 (i.e., a component of user control device 100) or may be a remote service in communication with user control device 100. User control device 100 and analytics service 6310 may be able to use historical data from the system as well as other systems connected to the network which are similar in size and equipment configuration. User control device 100 may be able to use local equipment history or history stored in network 6306 of similar equipment to educate a user on the capabilities of his system. Analytics service 6310 may have algorithms available to it, as well as a store of historical calculations and analysis from which it may provide informed estimates.

User control device 100 may receive basic operational data from connected equipment which it then transmits to analytics service 6310. Analytics service 6310 may use feedback from connected equipment to make accurate estimates and to detect faults. For example, analytics service 6310 may determine that despite the AC unit operating at maximum settings for the past 20 minutes, no change in temperature has been detected. Analytics service 6310 may then generate an error message for user control device 100 to communicate to a user. Analytics service 6310 may also be able to detect problems such as capacity incongruences and staging malfunctions. It is understood that analytics service 6310 is not limited to detecting problems explicitly enumerated.

User control device 100 may connect with a commercial energy management software which provides tools to users. These tools may allow users to create reports using variables in which they are interested. In some embodiments, user control device 100 may transmit all data received to the commercial energy management software for processing and presentation to a user. User control device 100 may receive results and reports from the energy management software for display to a user on a portable device or on display 3002. Advantages of not processing data locally include reduced cost of units for consumers and simplicity of updating or patching functionality. User control device 100 may be compatible with a plug in which communicates with user control device 100 and a standalone program. The plug in may detect parameters such as current draw, and may be able to detect actions of the system early through monitoring current draw or other such parameters.

Analytics service 6310 may combine a user's energy usage data with their energy bill to report on the fiscal effects of a user's behavior. User control device 100 is able to communicate with a user's device which may authorize user control device 100 to receive billing information. In some embodiments, user control device 100 may help a user reduce their energy bill by integrating demand-response information into the report. In some embodiments, user control device 100 is able to develop a cost analysis of a user's energy behavior. For example, user control device 100 may be able to receive demand-response feedback from a utility provider or smart meter which can be analyzed along with a user's energy usage to inform the user of the effects of their usage behavior.

Figure 31A:
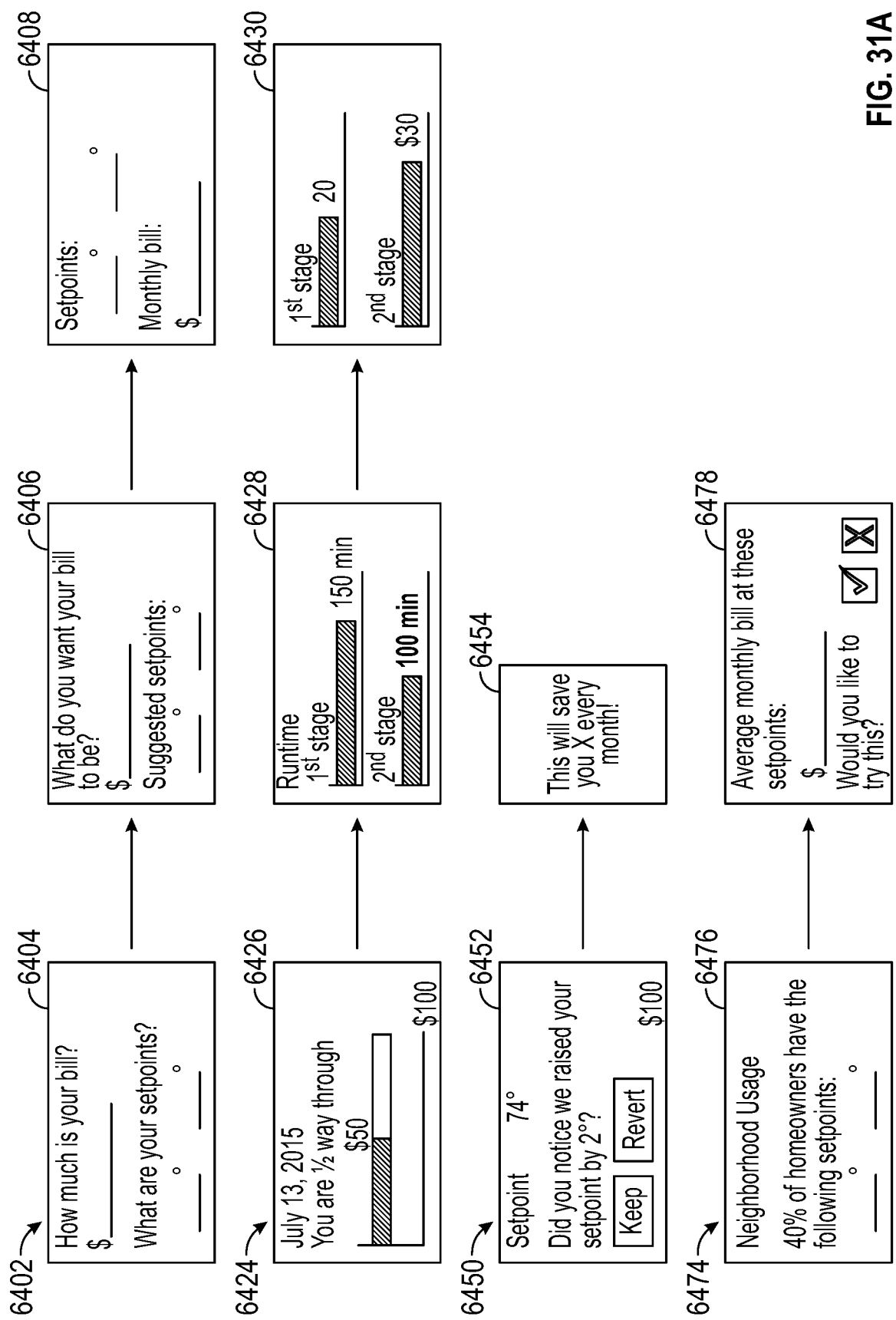
FIG. 31A is a drawing of operations through which the user control device may interact with a user to affect the energy consumption and energy bill of a building space, according to some embodiments.

Referring now to FIG. 31A, several processes through which a user can control his or her energy usage and resulting energy bill are shown. In process 6402, display 3002 of user control device 100 is shown. User control device 100 may suggest set points to help a user reach his or her target bill amount. In step 6404, a user is asked to input his or her current monthly energy bill and their current set points. For example, Jill may currently be paying $350 a month in energy bills by keeping her set points at 68° F. in the summer and 76° F. in the winter. In step 6406, the user is asked to input his or her target bill amount. Jill may input an amount of $250 if she wishes to reduce her bill to $250 a month.

In some situations, the target bill amount is not possible. If the target bill amount is not achievable, user control device 100 may display a warning to the user that his or her target is unachievable under the current operating conditions. For example, if external temperatures (e.g., actual or predicted) are too extreme to reduce the bill to $250 without violating livable temperature constraints, user control device 100 may display a message that the target bill amount is not achievable. User control device 100 may flash a message which reads "Current operating temperatures prevent me from reaching your target bill amount. We are on track to having a bill of $300 this month." When the target bill amount is possible, user control device 100 may change the set points to the set points suggested to the user.

In one embodiment, a user may input his or her own preferred set points to see what his or her monthly bill would be if he or she does not make changes to his or her energy usage. In step 6408, for example, Jill may input her preference for 70° F. and 74° F. User control device 100 may determine that based on local historical equipment data, Jill's monthly bill with her current settings will be $230. In some embodiments, user control device 100 may use data from the history stored in network 6306. User control device 100 may communicate the need to have the data analyzed by data analytics service 6310. User control device 100 may communicate with other devices connected to network 6306 and display information on connected devices. In some embodiments, user control device 100 may display all data and communications on a user device 5402.

Still referring to FIG. 31A, in process 6424, user control device 100 may allow a user to track their usage relative to their target. In step 6426, user control device 100 shows on display 3002 a user's energy usage relative to their goal payment for the month. For example, Jill would like to pay $100 for the month of July. It is the 13th, and she is already halfway through her target payment (e.g., current monthly expenses have exceeded $50). This allows Jill to make an informed decision on whether she would like to adjust her usage habits or receive a larger bill. In some embodiments, user control device 100 may provide a report of different operating parameters and their respective energy usage.

In step 6428, the runtime of each stage of the compressor is shown. In step 6430, the calculated cost associated with the runtimes of each stage is shown. This comparison informs users of their usage habits and allows users to decide whether and how to make adjustments to affect their monthly bill. In some embodiments, user control device 100 may use historical performance data stored in network 6306. User control device 100 may communicate the need to have the data analyzed by data analytics service 6310. User control device 100 may communicate with other devices connected to network 6306 and display information on connected devices. In some embodiments, user control device 100 may display all data and communications on a user device 5402.

Still referring to FIG. 31A, user control device 100 may make changes to set points automatically (process 6450). In step 6452, display 3002 of user control device 100 is shown to inform a user that his or her set point has been raised by 2° F. For example, Jack may have had his setting at 72° F. and over the course of a few hours, user control device 100 may have raised the temperature to 74° F. User control device 100 may inform Jack that his set point was increased, and ask whether he had noticed a difference in comfort or whether he would like to keep the change made. If a user chooses to accept the change, user control device 100 may display the projected savings resulting from the change (step 6454). In some embodiments, this is a monthly savings. User control device 100 may be able to estimate the savings for any time period (e.g., a day, a week, a month, a year, six hours, twelve days, etc.).

Advantageously, the feature illustrated in process 6450 may help users save energy by making adjustments and showing them how even a small change can result in savings. In some embodiments, user control device 100 may use data from the history stored in network 6306. User control device 100 may communicate the need to have the data analyzed by data analytics service 6310. User control device 100 may communicate with other devices connected to network 6306 and display information on connected devices. In some embodiments, user control device 100 may display all data and communications on a user device 5402.

Still referring to FIG. 31A, user control device 100 may compare a home's system with systems in the surrounding area or neighborhood (process 6474). In some embodiments, only homes with similar settings and equipment will be shown. In other embodiments, all homes within an area will be shown regardless of their settings and equipment. In step 6476, user control device 100 may show on display 3002 statistics on set points being used by neighbors. This allows users to compare their usage habits with users in similar environmental conditions. For example, Jack and Jill live in Mr. Roger's Neighborhood. User control device 100 shows that 40% of homes have set points at 72° F. and 72° F. (meaning that they keep 72° F. as the set point year round).

In step 6478, user control device 100 may show the average monthly bill for the set of homes included in the report. User control device 100 may ask users if they would like to try the settings, allowing users to make budget and energy conscious decisions without undue effort. In some embodiments, user control device 100 may use data from the history stored in network 6306. User control device 100 may communicate the need to have the data analyzed by data analytics service 6310. User control device 100 may communicate with other devices connected to network 6306 and display information on connected devices. In some embodiments, user control device 100 may display all data and communications on a user device 5402.

User control device 100 may make comparisons of the connected system to similar systems connected to network 6306. Such systems may include other homes and/or other buildings operated by another instance of user control device 100 or different home/building management systems. User control device 100 may find a subset of systems connected to the network which are similar to the system connected to user control device 100. Similar systems may be determined based on equipment configurations, size of home, location, climate, and various other factors or any combination of the previously mentioned factors. User control device 100 may send a request for a report to be generated by analytics service 6310, which may retrieve data for the identified subset of similar systems (e.g., from a remote system, from an energy utility, etc.).

Figure 31B:
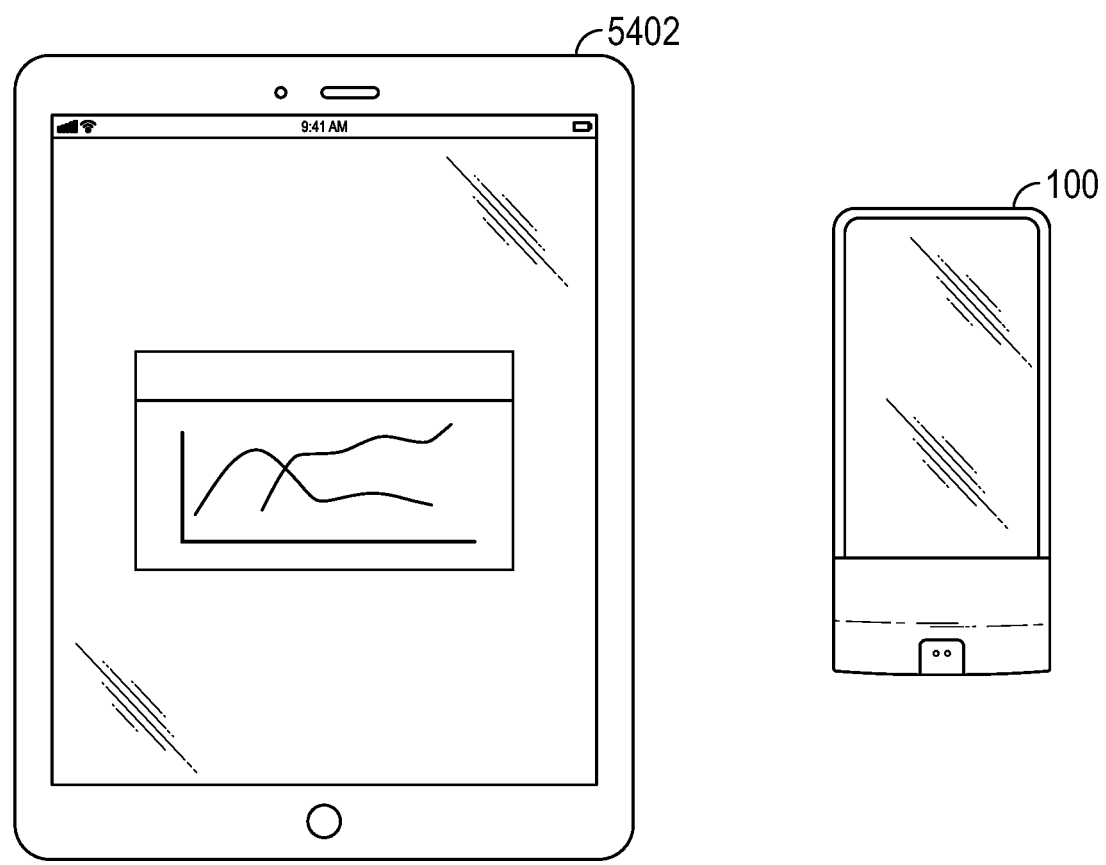
FIG. 31B is a drawing of user interfaces through which the user control device may display reports which compare and contrast a user's energy consumption and behavior with other similar systems, according to some embodiments.

Referring now to FIG. 31B, user control device 100 may generate reports which analyze the energy usage of a home or building. User control device 100 may display reports on a user's device 5402 to compare and contrast a user's energy consumption and behavior with other similar systems. User control device 100 may also show comparison reports on display 3002. For example, user control device 100 may display reports comparing John's energy usage with his neighbors—Jack and Jill's—usage. In some embodiments, energy consumption data from other homes and buildings is anonymized and/or aggregated to protect user privacy.

In some embodiments, user control device 100 may find systems which are similar with respect to many parameters, although not necessarily geographically close. User control device 100 may be able to notify a user of their ranking in terms of energy usage. For example, user control device 100 may inform a user that their energy usage is above average among similar systems. This allows users to evaluate their energy usage behavior and decide whether they value efficiency, comfort, or a compromise. In some embodiments, number ranks could be given, encouraging users to experiment with user control device 100 and its settings in order to be more efficient.

It is contemplated that users can post their rank and their settings on social media to share with others and to create a sense of competition. For example, a user may post their settings on a social media website with the message "My conditioning system is running 10% more efficiently this month and saved $15 on my electricity bill! Thanks Johnson Controls Inc.!" User control device 100 may allow a user to easily export energy savings to social media to facilitate sharing.

Figure 31C:
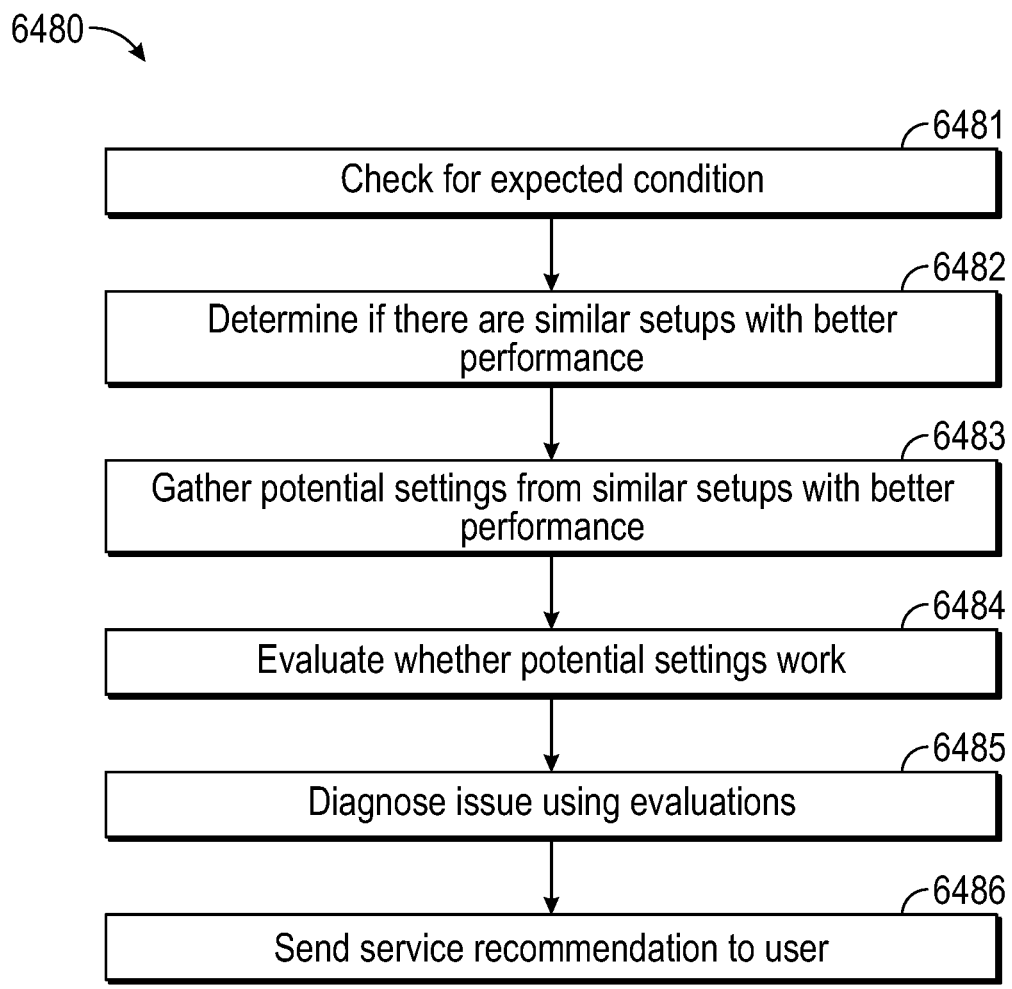
FIG. 31C is a flow diagram of operations for testing new settings automatically, according to some embodiments.

Referring now to FIG. 31C, users may be able to indicate their preference to user control device 100, which may use the preference to make operation decisions. When comparing systems according to process 6480, user control device 100 may determine whether settings of other systems can impact a user's energy usage. In step 6481, user control device 100 may find a subset of systems connected to the network which are similar to the system connected to user control device 100. Similar systems may be determined based on equipment configurations, size of home, location, climate, and various other factors or any combination of the previously mentioned factors.

User control device 100 may find that a neighboring home of a similar size with a similar system is using much less energy (step 6482). If the user has indicated that they value energy efficiency, user control device 100 may notify the user that potentially more efficient settings have been found (step 6483). In some embodiments, user control device 100 may automatically test-run settings which have been identified as potentially impacting a user's energy usage. For example, user control device 100 may run settings of a potentially more efficient system while a user is not home and report the results of the test when the user returns (step 6484).

In some embodiments, user control device 100 may display a prompt with the identified potentially impactful settings and allow a user to decide whether and which settings to test. For example: a system identical in equipment and area serviced is identified as operating 10% more efficiently than Jill's system. User control device 100 may display "According to information stored in the cloud, you may be able to increase efficiency by increasing your fan speed to HIGH. Would you like to increase your fan speed from MEDIUM to HIGH? To accept this change, please select Yes. To reject this claim, please select No." Depending on Jill's selection, user control device 100 would either adjust fan speed or dismiss the prompt.

In some embodiments, an issue may occur when a setting does not produce expected results. For example, the blower of a system may be too small to operate any more efficiently at higher speeds. A compressor may be broken and consequently produces no better results when staging is altered. User control device 100 may identify the source of these issues and evaluate what the most likely problem is (step 6485). User control device 100 may then display a prompt to the user asking whether she would like to call her dealer or a technician to repair the identified source of the problem.

User control device 100 is able to provide a clear and up-to-date report of a home's energy usage. User control device 100 is able to communicate with a wide variety of devices, and the communication allows greater detail when creating a usage report. Whereas a monthly bill from a utility provider merely shows the total usage, analytics service 6310 offers key information such as the time of use and the piece of equipment associated with the usage. For example, user control device 100 may display an energy usage report which shows that for the past two days, the dishwasher has been using more than twice the amount of energy is has been using for the three years it has been in the home. User control device 100 may detect the discrepancy and notify a user that the dishwasher may be malfunctioning.

User control device 100 may display an energy report which shows that the AC system is using less energy than a user had previously thought. User control device 100 may display an energy report that shows that the washing machine is using energy even when it is not being used. This information may help a user decide that it is time to replace old, inefficient appliances. User control device 100 may connect to older, existing equipment in a home to improve efficiency over previous performance using a conventional thermostat. In some embodiments, user control device 100 applies changes to the equipment operating parameters using metering over time.

User control device 100 may be able to use analytics service 6310 to calculate the time needed to reach the set point commanded by the user. In some embodiments, this calculation is done locally. In other embodiments, user control device 100 may transmit the data to analytics service 6310 which may transmit the results back to user control device 100 or a user device 5402 for display. For example, user control device 100 may receive a command to condition a home to 72° F. when the outside temperature is 80° F. and there is low humidity. User control device 100 transmits the current operating conditions and the command to analytics service 6310.

Analytics service 6310 may determine, from current operation conditions, feedback from the equipment, and historical data, that the system will be able to reach the set point specified in half an hour. Analytics service 6310 may transmit this information to user control device 100, which may display a message to the user notifying his or her that the system will reach the set point in half an hour. In some embodiments, based on certain outside conditions, the system may be under an unusual amount of load. Analytics service 6310 may recognize this when comparing system performance with similar systems and may adjust the time estimate. In some embodiments, analytics service 6310 adds an offset to the standard time estimate. It is contemplated that analytics service 6310 is able to perform this function for more optimal conditions as well, and subtract an offset from the standard time estimate.

Figure 31D:
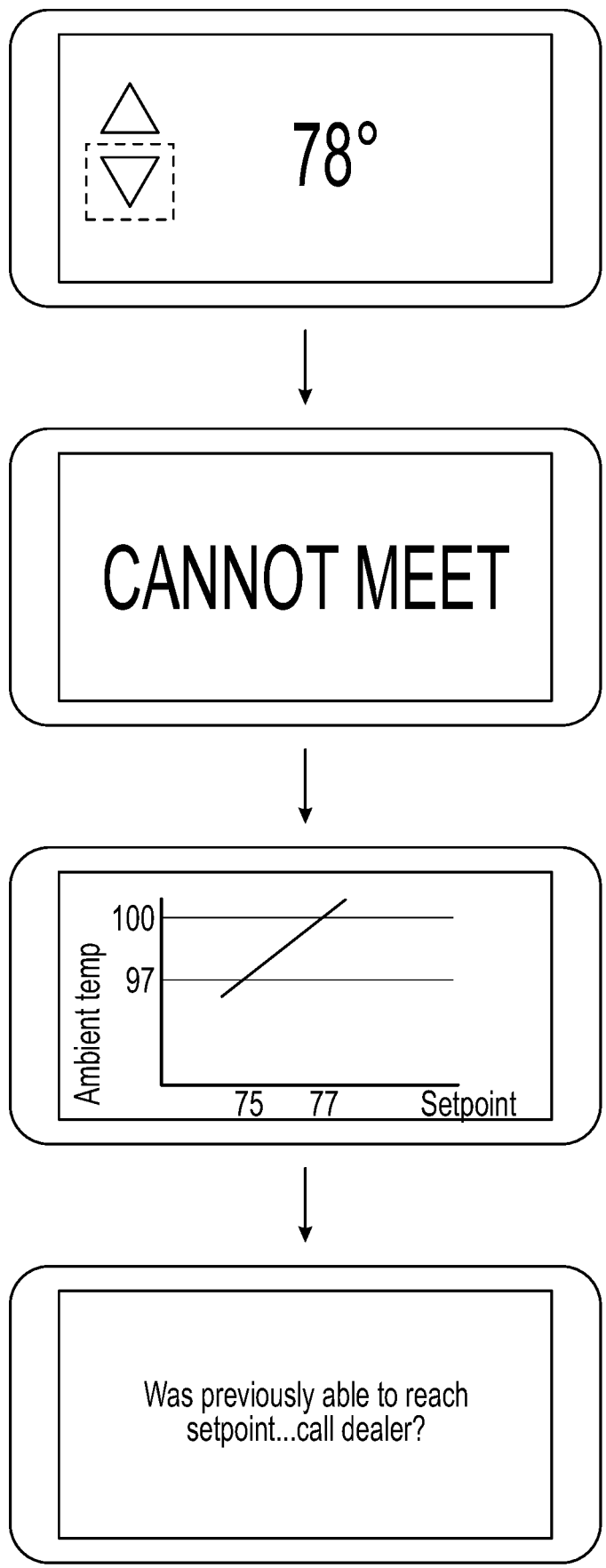
FIG. 31D is a drawing of operations in which the user control device alerts users that it is unable to reach a set point, according to some embodiments.

Referring now to FIG. 31D, user control device 100 may be able to notify a user of the ability of the system to reach the set point specified by the user. For example, user control device 100 may receive a command to condition a large home to 77° F. when the outside temperature is 105° F. User control device 100 sends the current operating conditions and the command to analytics service 6310. Analytics service 6310 may determine, from current operation conditions, feedback from the equipment, and historical data, that due to the high humidity and the size of the AC unit installed relative to the size of the home, the system is unable to reach the set point. Analytics service 6310 may determine this by using data points from current operation to extrapolate future temperatures. Analytics service 6310 may use historical data points to determine set point limits under the current operating conditions. Analytics service 6310 may transmit this information to user control device 100, which then displays a message to the user notifying her that the system is unable to reach a set point.

When this situation arises, user control device 100 may be able to notify the user in any number of different ways. User control device 100 may display an indicator such as a flashing message on display 3002, transmit a message to user device 5402 to vibrate and alert the user that the set point is unattainable, play a sound, or any number of other methods of notifying the user. User control device 100 may display a message with more information about the situation, such as the factors contributing to the inability of the system to reach the set point. It is contemplated that user control device 100 may notify users of any condition and provide additional information, and that this feature is not limited to when the system cannot reach the specified set point.

In some embodiments, user control device 100 may be able to calculate the maximum or minimum set point which can be achieved based on the current operating conditions, feedback from equipment, and historical performance data. In some embodiments, user control device 100 uses historical data to determine that a system was previously able to reach a set point, but is now unable to do so. This decrease in performance may be due to degradation of components in the system, and user control device 100 may display a prompt telling the user that a piece of equipment may be broken or damaged. User control device 100 may ask a user if they would like to call their dealer or a technician to have the system repaired.

User control device 100 may be able to offer an alternative when the set point cannot be reached. In some embodiments, analytics service 6310 may be able to find a solution in which the system can sacrifice certain parameters in order to achieve the user's desired setting. For example, user control device 100 may be able to achieve the specified setting, if the user is willing to pay more in electricity, decrease the lifespan of components, wait for a longer period of time, or turn off another appliance. It is understood that there are other tradeoffs which could be made to achieve a desired thermostat setting. The choice is offered to the user, who will then be able to decide between energy saved and time lost.

User control device 100 may display the appropriate set point limit depending on whether a user is decreasing the set point (the minimum) or increasing the set point (the maximum). In some embodiments, user control device 100 is able to detect when to show the set point limit, depending the user's commands. For example, if a user is repeatedly inputting commands at user interface 3010 of user control device 100, user control device 100 may display the set point limit. In other embodiments, user control device 100 may go directly to the limit after predetermined conditions have been met. For example, if a user is inputting commands at user interface 3010 of user control device 100 and holds down a button for a certain amount of time, user control device 100 may interpret the input as a command to set the system to the respective limit. In some embodiments, if a system is already at its limit when a user tries to command the system to move further in the direction of the extreme, user control device 100 may display a notification on display 3002 to inform the user that the system is already at its limit, and that their request cannot be fulfilled under the current conditions.

User control device 100 may be able to show a user the efficiency or comfort consequences of their commands. User control device 100 may receive a command on a hot day to condition a home to 2° F. lower than it currently is. User control device 100 may transmit the current operating conditions and the command to analytics service 6310. Analytics service 6310 may determine, from current operation conditions, feedback from the equipment, and historical data, the additional costs associated with the 2° F. decrease as well as the additional energy used based on billing history associated with the home, billing data of similar systems connected to the network, and algorithms for determining energy consumption. User control device 100 may be able to perform these calculations for any increase, decrease, or lack of change in the set point.

The calculated energy consumption and additional costs may be used by analytics service 6310 to provide suggestions to users about their usage behavior. For example, user control device 100 may display a message explaining that turning up the set point on a hot day by 2° F. may save a user as much as $3.00 that day. User control device 100 may provide tips for conserving energy such as reducing load by turning off high-energy devices such as dryers, or by better insulating the home by closing windows. User control device 100 may provide suggestions of energy or money saving features not recently used.

Analytics service 6310 may be able to determine from comparing current performance with historical performance whether a piece of equipment is functioning correctly. For example, analytics service 6310 may determine that if a connected unit is malfunctioning, analytics service 6310 may transmit an error code to user control device 100, which then displays an error code to the user. In some embodiments, user control device 100 may display the error code on display 3002. In other embodiments, user control device 100 may display the error code on a user's device 5402 or in a web-based application connected to the system.

If a fault is detected, standard staging progressions or operating procedures may be altered to provide the best experience for the user. For example, an AC unit may normally transition from stage to stage without skipping stages. If user control device 100 has detected that a fault has occurred somewhere within the system, user control device 100 may command the compressor to skip the lower stages and go straight to the upper stages in order to maintain performance. In another example, user control device 100 may receive information from the flow system that a pipe has been clogged somewhere in the system, and that airflow has been greatly diminished. In order to maintain performance, user control device 100 may command an increase in airflow to compensate for the blockage.

User control device 100 may alter staging, airflow, or other system parameters based on historical performance. In some embodiments, analytics service 6310 may search through historical data to find periods of operation with match conditions and select the settings and commands which produced the most desirable result according to the user's preferences.

User control device 100 may alter staging progressions or other operating parameters based on other factors, such as weather conditions and forecasts. User control device 100 may be able to receive weather information from a weather service, the network, or a device with which user control device 100 can directly or indirectly communicate. In some embodiments, user control device 100 is able to receive a weather forecast and make operating decisions based on that forecast. For example, user control device 100 may receive information one balmy night that the next morning will be below freezing. User control device 100 may command the system to go to 100% operating power without transitioning through lower stages. In some embodiments, user control device 100 may change the set point from the user defined set point using the weather information received.

User control device 100 may alter staging progressions or other operating parameters based on factors such as user demand or level of activity. In some embodiments, user control device 100 adjusts operating parameters when a user commands a sudden and significant change in temperature. For example: it is below freezing outside and a user has returned home after vacation; the HVAC system is suddenly powered on and commanded to heat the home to 72° F.; user control device 100 commands all equipment to operate at maximum capacity in order to reach the set point as soon as possible.

In other embodiments, user control device 100 detects the level of occupancy and activity, and adjusts operating parameters accordingly. For example: there is a party in the home and there are many people dancing; user control device 100 detects the high level of occupancy and activity and commands all equipment to operate at maximum capacity in order to maintain the set point. It is understood that user control device 100 may detect that there is low or no occupancy or activity and adjust operating conditions accordingly. For example, user control device 100 may detect that there is little activity and command equipment to operate at low capacity and as efficiently as possible. In some embodiments, user control device 100 may detect that there is no occupancy and that the outside conditions are acceptable and turn off all equipment in order to save energy.

Referring now to FIG. 32, user control device 100 is able to graph power usage of a home. User control device 100 may process data periodically in order to display results instantaneously when requested by a user. User control device 100 may filter data based on user inputs, or user control device 100 may offer several predetermined filters. In one embodiment, user control device 100 is able to determine and display system energy usage per compressor stage, fan speed, or any quantifiable metric, allowing a user to make informed decisions regarding her energy usage habits. For example, user control device 100 may analyze data from the past month and report that Jill has been using 20% more energy by setting the compressor to run in stage 3 instead of stage 2. This increase in energy over the 10 days the system has been at stage 3 has resulted in a net increase of $5 over Jill's standard energy bill. With this information, Jill may decide whether she prefers efficiency or comfort, and adjust (or not) her usage accordingly.

User control device 100 may be configured to compare one home's energy usage with another home of similar size and setup. For example, user control device 100 may identify homes of similar square footage and equipment configuration which are located in a similar climate for comparison with the home it belongs to. In some embodiments, users may elect to view comparisons of their usage with that of a dissimilar home. For example, users may wish to estimate their energy usage with an addition to their current home or in a new home they plan to buy.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A home control system comprising:
  a thermostat configured to be installed in a first room of a building and configured to measure environmental conditions in the first room of the building, wherein the thermostat is configured to control heating, ventilation, and air condition (HVAC) equipment within the building, wherein the thermostat comprises:
    an air quality sensor configured to measure a quality of airflow in the first room of the building;
    a multi-function display;
    a processing circuit configured to:
      generate air quality metrics based on the quality of airflow measured by the air quality sensor and display the air quality metrics on the display;
      analyze the air quality metrics;
      assign one or more scores to the air quality metrics based on air quality standard references;
      determine a composite air quality score based on one or more individual air quality scores;
      generate display data of the one or more individual air quality scores in numeric and graphical formats;
      generate display data of the composite air quality score in numeric and graphical formats;
      generate display data of a combined presentation of one or more individual air quality scores and the composite air quality score in numeric and graphical formats using the multi-function display;
      generate a control signal to the HVAC equipment in response to the air quality metrics; and
    wherein the thermostat controls the HVAC equipment within the building to control environmental conditions.

2. The home control system of claim 1, wherein a first remote sensor unit is configured to measure and transmit environmental conditions in a second room of the building and wirelessly communicate information associated with the measured environmental conditions to a central control hub, the first remote sensor unit comprises a microphone configured to receive a voice command, wherein the first remote sensor unit is configured to communicate the voice command to the central control hub, and wherein the thermostat is further configured to control both the HVAC equipment and non-HVAC equipment based on the voice command.

3. The home control system of claim 2, wherein the first remote sensor unit comprises an occupancy sensor configured to detect presence of a user within the second room, wherein the first remote sensor unit is configured to communicate occupancy information to the central control hub, and wherein the thermostat is further configured to control both the HVAC equipment and the non-HVAC equipment based on the occupancy information.

4. The home control system of claim 2, further comprising a second remote sensor unit located within a third room of the building, wherein the first remote sensor unit and the second remote sensor unit are configured to communicate temperature information associated with the second room and the third room, respectively, to the central control hub, and wherein the thermostat is configured to:
  calculate an average temperature from temperature information of the first room, temperature information of the second room, and temperature information of the third room, and
  control the HVAC equipment based on the calculated average temperature.

5. The home control system of claim 2, further comprising a second remote sensor unit configured to monitor building equipment and communicate status information for the building equipment to the central control hub, wherein the thermostat is configured to present the status information to a user, wherein the central control hub is configured to receive user input, and wherein the thermostat is configured to modify operation of the building equipment based on the status information for the building equipment in combination with the user input.

6. The home control system of claim 2, wherein the first remote sensor unit comprises at least one of a proximity sensor, an ambient light sensor, a vibration sensor, or a motion sensor.

7. The home control system of claim 2, wherein the first remote sensor unit comprises an electrical outlet and a power relay configured to selectively provide power to the electrical outlet, and wherein the first remote sensor unit is configured to operate the power relay in accordance with a command from the thermostat.

8. The home control system of claim 2, wherein the first remote sensor unit comprises an electrical outlet and a power relay configured to selectively provide power to the electrical outlet, and wherein the first remote sensor unit is configured to operate the power relay based on the measured environmental conditions of the second room without a command from the thermostat.

9. The home control system of claim 2, wherein the thermostat is configured to control both the HVAC equipment and the non-HVAC equipment within the building to control environmental conditions in both the first room and the second room based on a combination of information received from the first remote sensor unit and the thermostat.

10. The home control system of claim 2, wherein the air quality sensor is configured to measure at least one of a plurality air quality variables including oxygen level; and
  wherein the processing circuit is further configured to:
    generate an air quality metric indicating a low oxygen content below a predetermined threshold; and
    generate the control signal to the HVAC equipment to increase volume of fresh airflow to at least one of the first room and the second room.

11. The home control system of claim 1, wherein the air quality sensor is configured to measure at least one of a plurality air quality variables including carbon dioxide content; and
  wherein the processing circuit is further configured to:

generate an air quality metric indicating a high carbon dioxide content above a predetermined threshold; and
generate the control signal to the HVAC equipment to increase volume of fresh airflow to at least one of the first room and a second room.

12. The home control system of claim 1, wherein the air quality sensor is configured to measure at least one of a plurality air quality variables.

13. The home control system of claim 12, wherein the plurality of air quality variables includes oxygen level, carbon dioxide level, carbon monoxide level, allergens, pollutants, and smoke.

14. A home control system, comprising:
a thermostat configured to be installed in a first room of a building and configured to measure environmental conditions in the first room of the building, wherein the thermostat is configured to control heating, ventilation, and air condition (HVAC) equipment within the building, wherein the thermostat comprises:
a central control hub configured to communicate with a plurality of remote sensor units via a data communications interface;
an air quality sensor configured to measure a quality of airflow in the first room of the building;
a multi-function display;
a processing circuit configured to:
generate air quality metrics based on the quality of airflow measured by the air quality sensor and display the air quality metrics on the display;
analyze the air quality metrics;
assign one or more scores to the air quality metrics based on air quality standard references;
determine a composite air quality score based on one or more individual air quality scores;
generate display data of the one or more individual air quality scores in numeric and graphical formats;
generate display data of the composite air quality score in numeric and graphical formats;
generate display data of a combined presentation of one or more individual air quality scores and the composite air quality score in numeric and graphical formats using the multi-function display;
generate a control signal to the HVAC equipment in response to the air quality metrics;
monitor and control non-HVAC equipment within the building; and
a first remote sensor unit of the plurality of remote sensor units, wherein the first remote sensor unit is configured to measure and transmit environmental conditions in a second room of the building and wirelessly communicate information associated with the measured environmental conditions to the central control hub; and
wherein the thermostat is further configured to control both the HVAC equipment and the non-HVAC equipment, wherein the thermostat controls the HVAC equipment within the building to control environmental conditions in at least one of the first room and the second room based on the information received from the first remote sensor unit.

15. A thermostat to be installed in a first room of a building and configured to measure environmental conditions in the first room of the building, wherein the thermostat is configured to control heating, ventilation, and air condition (HVAC) equipment within the building, the thermostat comprising:
an air quality sensor configured to measure a quality of airflow in the first room of the building;
a multi-function display;
a processing circuit configured to:
generate air quality metrics based on the quality of airflow measured by the air quality sensor and display the air quality metrics on the display;
analyze the air quality metrics;
assign one or more scores to the air quality metrics based on air quality standard references;
determine a composite air quality score based on one or more individual air quality scores;
generate display data of the one or more individual air quality scores in numeric or graphical formats;
generate display data of the composite air quality score in numeric or graphical formats;
generate display data of a combined presentation of one or more individual air quality scores and the composite air quality score in numeric or graphical formats using the multi-function display;
generate a control signal to the HVAC equipment in response to the air quality metrics; and
wherein the thermostat controls the HVAC equipment within the building to control environmental conditions.

16. The thermostat of claim 15, wherein a first remote sensor unit is configured to measure and transmit environmental conditions in a second room of the building and wirelessly communicate information associated with the measured environmental conditions to a central control hub, the first remote sensor unit comprises a microphone configured to receive a voice command, wherein the first remote sensor unit is configured to communicate the voice command to the central control hub, and wherein the thermostat is further configured to control both the HVAC equipment and the non-HVAC equipment based on the voice command.

17. The thermostat of claim 16, wherein the first remote sensor unit comprises an occupancy sensor configured to detect presence of a user within the second room, wherein the first remote sensor unit is configured to communicate occupancy information to the central control hub, and wherein the thermostat is further configured to control both the HVAC equipment and non-HVAC equipment based on the occupancy information.

18. The thermostat of claim 16, further comprising a second remote sensor unit located within a third room of the building, wherein the first remote sensor unit and the second remote sensor unit are configured to communicate temperature information associated with the second room and the third room, respectively, to the central control hub, and wherein the thermostat is configured to:
calculate an average temperature from temperature information of the first room, temperature information of the second room, and temperature information of the third room, and
control the HVAC equipment based on the calculated average temperature.

19. The thermostat of claim 16, further comprising a second remote sensor unit configured to monitor building equipment and communicate status information for the building equipment to the central control hub, wherein the thermostat is configured to present the status information to a user, wherein the central control hub is configured to receive user input, and wherein the thermostat is configured to modify operation of the building equipment based on the status information for the building equipment in combination with the user input.

20. The thermostat of claim 16, wherein the first remote sensor unit comprises at least one of a proximity sensor, an ambient light sensor, a vibration sensor, or a motion sensor.

\* \* \* \* \*